United States Patent
Ohira et al.

(10) Patent No.: US 10,035,535 B2
(45) Date of Patent: Jul. 31, 2018

(54) RELATIVE ANGLE DETECTION DEVICE, TORQUE SENSOR, ELECTRIC POWER STEERING DEVICE AND VEHICLE

(71) Applicant: NSK Ltd., Shinagawa-ku, Tokyo (JP)

(72) Inventors: Kazuhiro Ohira, Fujisawa (JP); Masaki Kuwahara, Fujisawa (JP); Sumio Sugita, Fujisawa (JP); Shigeyuki Uematsu, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 15/578,064

(22) PCT Filed: Jun. 24, 2016

(86) PCT No.: PCT/JP2016/068801
§ 371 (c)(1),
(2) Date: Nov. 29, 2017

(87) PCT Pub. No.: WO2016/208712
PCT Pub. Date: Dec. 29, 2016

(65) Prior Publication Data
US 2018/0154926 A1 Jun. 7, 2018

(30) Foreign Application Priority Data

Jun. 26, 2015 (JP) .................................. 2015-129165
Aug. 26, 2015 (JP) .................................. 2015-167193
(Continued)

(51) Int. Cl.
*G01L 3/00* (2006.01)
*B62D 5/04* (2006.01)
(Continued)

(52) U.S. Cl.
CPC ............ *B62D 5/0406* (2013.01); *B62D 15/02* (2013.01); *G01B 7/30* (2013.01); *G01D 5/244* (2013.01); *G01L 3/10* (2013.01)

(58) Field of Classification Search
CPC ......... B62D 5/0406; B62D 15/02; G01L 3/10; G01L 3/00; G01L 3/14; G01L 3/02;
(Continued)

(56) References Cited

U.S. PATENT DOCUMENTS 5,644,127 A * 7/1997 Ohmae .............. G01D 5/24476
250/231.16
6,837,116 B2 1/2005 Desbiolles
(Continued)

FOREIGN PATENT DOCUMENTS

JP 7-191805 A 7/1995
JP 2002-350251 A 12/2002
(Continued)

OTHER PUBLICATIONS

International Preliminary Report on Patentability (PCT/IB/338 & PCT/IB/373) issued in PCT Application No. PCT/JP2016/068801 dated Jan. 4, 2018, including English translation of document C2 (Japanese-language Written Opinion (PCT/ISA/237)) previously filed on Nov. 29, 2017 (13 pages).
(Continued)

*Primary Examiner* — Manish S Shah
*Assistant Examiner* — Nigel Plumb
(74) *Attorney, Agent, or Firm* — Crowell & Moring LLP

(57) ABSTRACT

There are provided a relative angle detection device suitable for expanding a torque detection range, and a torque sensor, an electric power steering device and a vehicle including the relative angle detection device. Based on a first sine signal representing $\sin(\theta os+\Delta\theta)$ and a first cosine signal representing $\cos(\theta os+\Delta\theta)$ in accordance with a rotation angle ($\theta is$) of
(Continued)

a first multipolar ring magnet that synchronously rotates with an input shaft from between the coaxially arranged input shaft and an output shaft, and based on a second sine signal representing sin θos and a second cosine signal representing cos θos in accordance with a rotation angle (θos) of a second multipolar ring magnet that synchronously rotates with the output shaft, sin Δθ and cos Δθ are calculated in accordance with a relative angle(Δθ) between the input shaft and the output shaft, and from Δθ=arctan(sin Δθ/cos Δθ), the relative angle(Δθ) is calculated.

17 Claims, 33 Drawing Sheets

(30) Foreign Application Priority Data

Jun. 7, 2016 (JP) .................................. 2016-113839
Jun. 7, 2016 (JP) .................................. 2016-113840

(51) Int. Cl.
*G01B 7/30* (2006.01)
*B62D 15/02* (2006.01)
*G01L 3/10* (2006.01)
*G01D 5/244* (2006.01)

(58) Field of Classification Search
CPC . G01L 1/22; G01D 5/244; G01D 7/00; G01B 7/30
See application file for complete search history.

(56) References Cited

U.S. PATENT DOCUMENTS 8,421,446 B2 4/2013 Straubinger et al.
8,868,297 B2 10/2014 Yoshitake et al.
2002/0166389 A1* 11/2002 Desbiolles .............. G01L 3/109
  73/862.325
2010/0156402 A1* 6/2010 Straubinger ........... G01D 5/202
  324/207.25
2013/0289827 A1* 10/2013 Yoshitake ............ B62D 5/0463
  701/42

FOREIGN PATENT DOCUMENTS

| JP | 2003-329524 A | 11/2003 |
| JP | 2003-344190 A | 12/2003 |
| JP | 2005-351848 A | 12/2005 |
| JP | 2007-327940 A | 12/2007 |
| JP | 2013-24638 A | 2/2013 |
| JP | 2013-185923 A | 9/2013 |
| JP | 2013-226944 A | 11/2013 |

OTHER PUBLICATIONS

International Search Report (PCT/ISA/210) issued in PCT Application No. PCT/JP2016/068801 dated Sep. 13, 2016 with English translation (7 pages).
Japanese-language Written Opinion (PCT/ISA/237) issued in PCT Application No. PCT/JP2016/068801 dated Sep. 13, 2016 (6 pages).
Japanese-language Decision to Grant a Patent issued in counterpart Japanese Application No. 2016-113840 dated Feb. 7, 2017 with English translation (6 pages).
Japanese-language Office Action issued in counterpart Japanese Application No. 2016-113839 dated Sep. 6, 2016 with English translation (10 pages).
Japanese-language Office Action issued in counterpart Japanese Application No. 2016-113840 dated Sep. 6, 2016 with English translation (10 pages).
Japanese-language Office Action issued in counterpart Japanese Application No. 2016-113840 dated Nov. 29, 2016 with English translation (10 pages).
Japanese-language Office Action issued in counterpart Japanese Application No. 2016-113839 dated Dec. 6, 2016 with English translation (10 pages).
Japanese-language Office Action issued in counterpart Japanese Application No. 2016-113839 dated Feb. 21, 2017 with English translation (6 pages).

* cited by examiner

A-A CROSS SECTION

B-B CROSS SECTION

HORIZONTAL AXIS : Δθ (ELECTRICAL ANGLE deg)

HORIZONTAL AXIS : Δθ (ELECTRICAL ANGLE deg)

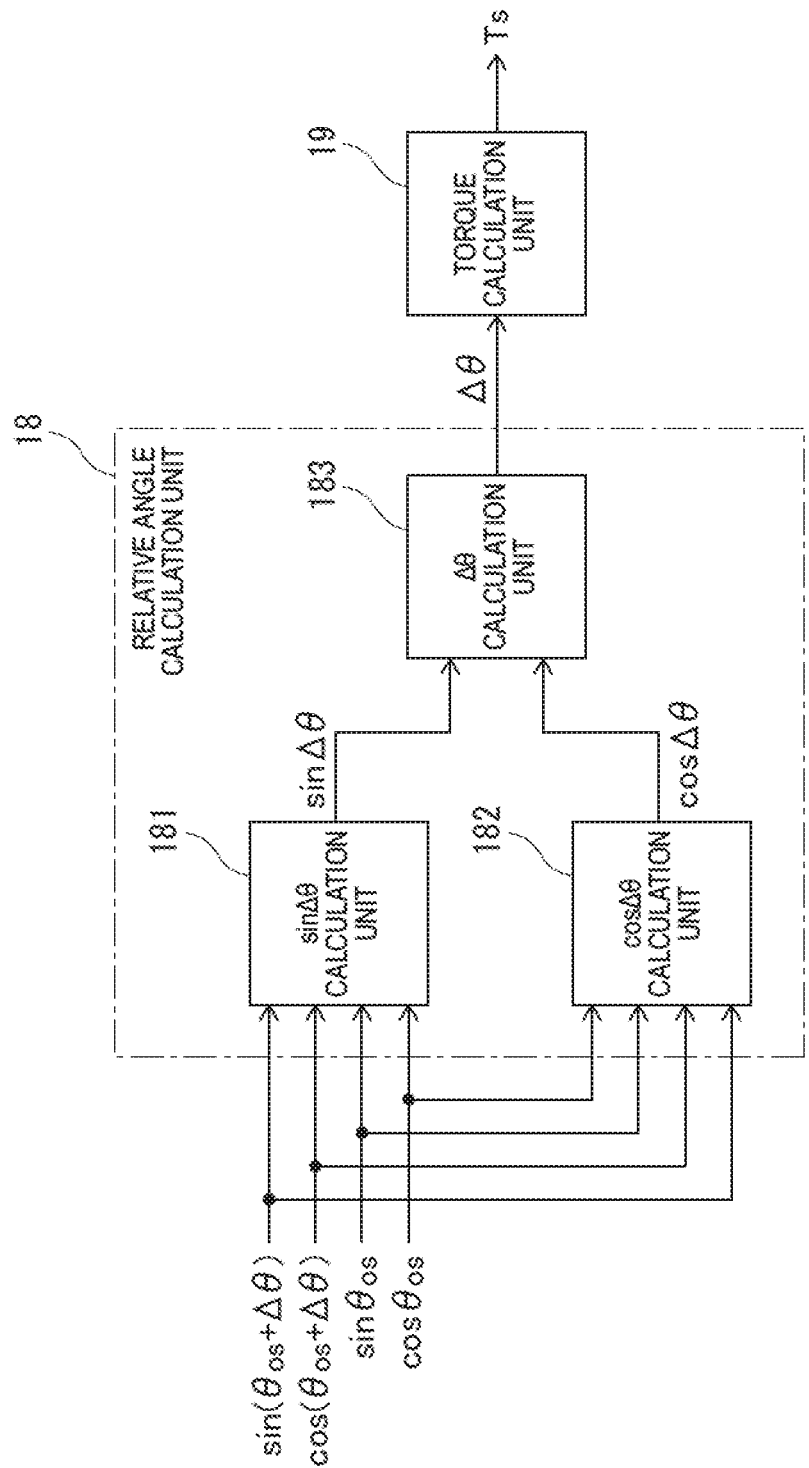

C-C CROSS SECTION

D-D CROSS SECTION

RELATIVE ANGLE DETECTION DEVICE, TORQUE SENSOR, ELECTRIC POWER STEERING DEVICE AND VEHICLE

TECHNICAL FIELD

The present invention relates to a relative angle detection device, a torque sensor, an electric power steering device, and a vehicle.

BACKGROUND ART

For example, PTL 1 discloses a conventional technique of arranging a multipolar ring magnet to each of both ends of a torsion bar, detecting, with magnetic sensor, a magnetic flux in accordance with a rotational displacement of a multipolar ring magnet, calculating a helix angle generated to the torsion bar based on the detected magnetic flux, and detecting a torque value from the helix angle. In this technique, to each of the multipolar ring magnets, two magnetic sensors having 90° phase difference of an electrical angle are provided, sin Δθ (square value addition value Z) relative to the helix angle is calculated based on outputs from total four magnetic sensors, and the torque value is detected based on sin Δθ.

CITATION LIST

Patent Literature

PTL 1: Japanese Unexamined Patent Publication (Kokai) No. 2013-24638

SUMMARY OF INVENTION

Technical Problem

However, in the prior art disclosed in above PTL 1, only sin Δθ (square value addition value Z) is calculated and a linear portion thereof is used as a torque value. This is because, the helix angle may not be uniquely calculated in a helix angle region exceeding a linear portion of sin Δθ. Therefore, there has been a problem that a region exceeding the linear portion may not be used as a torque detection range. The present invention is made by focusing on the unsolved problem of the prior art, and an object of the present invention is to provide a relative angle detection device which is suitable for expanding a torque detection range and a torque sensor, an electric power steering device and a vehicle having the relative angle detection device.

Solution to Problem

To achieve the above object, the relative angle detection device according to a first aspect of the present invention includes a first multipolar ring magnet having different magnetic poles alternately and equally distributed in the circumferential direction and configured to rotate synchronously with a first rotation axis from between coaxially arranged first rotation axis and a second rotation axis; a second multipolar ring magnet having different magnetic poles alternately and equally distributed in the circumferential direction and configured to rotate synchronously with the second rotation axis from between the first rotation axis and the second rotation axis; a first rotation angle sensor configured to detect a magnetic flux in accordance with a rotation angle $\theta_1$ of the first multipolar ring magnet and output the first sin signal representing sin $\theta_1$ and the first cos signal representing cos $\theta_1$; a second rotation angle sensor configured to detect a magnetic flux in accordance with a rotation angle $\theta_2$ of the second multipolar ring magnet and output a second sin signal representing sin $\theta_2$ and a second cos signal representing cos $\theta_2$; and a relative angle calculation unit configured to, based on the first sin signal and the first cos signal, and the second sin signal and the second cos signal, calculate sin Δθ and cos Δθ in accordance with a relative angle Δθb between the first rotation axis and the second rotation axis, and based on Δθ=arctan(sin Δθ/cos Δθ), calculate a relative angle Δθ.

Further, to achieve the above object, a relative angle detection device according to a second aspect of the present invention includes a first multipolar ring magnet having different magnetic poles alternately and equally distributed in the circumferential direction and configured to rotate synchronously with a first rotation axis from between coaxially arranged first rotation axis and a second rotation axis; a second multipolar ring magnet having different magnetic poles alternately and equally distributed in the circumferential direction and configured to rotate synchronously with the second rotation axis from between the first rotation axis and the second rotation axis; a first rotation angle sensor configured to detect a magnetic flux in accordance with a rotation angle $\theta_1$ of the first multipolar ring magnet and output a first sin signal representing sin $\theta_1$ and a first cos signal representing cos $\theta_1$; a second rotation angle sensor configured to detect a magnetic flux in accordance with a rotation angle $\theta_2$ of the second multipolar ring magnet and output the second sin signal representing sin $\theta_2$ and the second cos signal representing cos $\theta_2$, and a plurality of relative angle calculation units configured to, based on the first sin signal and the first cos signal, and the second sin signal and the second cos signal, calculate a relative angle Δθ between the first rotation axis and the second rotation axis; in which the plurality of relative angle calculation units include one or more first relative angle calculation unit configured to, based on the first sin signal and the first cos signal, calculate the rotation angle $\theta_1$, based on the second sin signal and the second cos signal, calculate the rotation angle $\theta_2$, and based on a difference value between the rotation angle $\theta_1$ and the rotation angle $\theta_2$, and calculate a first relative angle Δθ1 between the first rotation axis and the second rotation axis; and one or more second relative angle calculation unit configured to, based on the first sin signal, the first cos signal, the second sin signal, and the second cos signal, calculate sin Δθ and cos Δθ in accordance with the relative angle Δθ between the first rotation axis and the second rotation axis and based on Δθ$_2$=arctan(sin Δθ/cos Δθ), calculate a second relative angle Δθ2 between the first rotation axis and the second rotation axis and the relative angle detection device further includes an abnormality determination unit configured to regard either one of the first relative angle Δθ1 calculated by the first relative angle calculation unit and the second relative angle Δθ2 calculated by the second relative angle calculation unit as a third relative angle Δθref, and based on a difference value between the third relative angle Δθref and a remaining relative angle of the first relative angle Δθ1 and the second relative angle Δθ2, determine an abnormality.

To achieve the above object, the relative angle detection device according to a third aspect of the present invention includes the first multipolar ring magnet having different magnetic poles alternately and equally distributed in the circumferential direction and configured to rotate synchronously with the first rotation axis from between the coaxially arranged first rotation axis and second rotation axis; the second multipolar ring magnet having different magnetic poles alternately and equally distributed in the circumferential direction and configured to rotate synchronously with the second rotation axis from between the first rotation axis and the second rotation axis; the first rotation angle sensor configured to detect the magnetic flux in accordance with the rotation angle $\theta_1$ of the first multipolar ring magnet and output the first sin signal representing sin $\theta_1$ and the first cos signal representing cos $\theta_1$; the second rotation angle sensor configured to detect the magnetic flux in accordance with the rotation angle $\theta_2$ of the second multipolar ring magnet and output the second sin signal representing sin $\theta_2$ and the second cos signal representing cos $\theta_2$; and the plurality of relative angle calculation units configured to, based on the first sin signal, the first cos signal, the second sin signal, and the second cos signal, calculate the relative angle $\Delta\theta$ between the first rotation axis and the second rotation axis, in which the plurality of relative angle calculation units include a plurality of second relative angle calculation units configured to, based on the first sin signal, the first cos signal, the second sin signal, and the second cos signal, calculate sin $\Delta\theta$ and cos $\Delta\theta$ in accordance with the relative angle $\Delta\theta$ between the first rotation axis and the second rotation axis and based on $\Delta\theta_2$=arctan(sin $\Delta\theta$/cos $\Delta\theta$), calculate the second relative angle $\Delta\theta2$ between the first rotation axis and the second rotation axis, and the relative angle detection device further includes the abnormality determination unit configured to regard any one of the plurality of second relative angles $\Delta\theta2$ calculated by the plurality of second relative angle calculation units as the third relative angle $\Delta\theta$ref and based on the difference value between the third relative angle $\Delta\theta$ref and at least one of the remaining second relative angle $\Delta\theta2$, determine the abnormality.

A torque sensor according to a fourth aspect of the present invention includes the relative angle detection device according to any one of first to third aspects configured to detect the relative angle $\Delta\theta$ between an input shaft and an output shaft connected via a torsion bar and a torque calculation unit configured to, based on the relative angle $\Delta\theta$, calculate a torque generated to the input shaft and the output shaft.

An electric power steering device according to a fifth aspect of the present invention includes the torque sensor according to the fourth aspect.

A vehicle according to a sixth aspect of the present invention includes the electric power steering device according to the fifth aspect.

Advantageous Effects of Invention

The present invention allows expanding a detection range of the torque and calculating a highly accurate torque value.

BRIEF DESCRIPTION OF DRAWINGS

FIG. 6 is a block diagram illustrating a configuration example of the relative angle calculation unit according to the first embodiment of the present invention;

DESCRIPTION OF EMBODIMENTS

Figure 1:
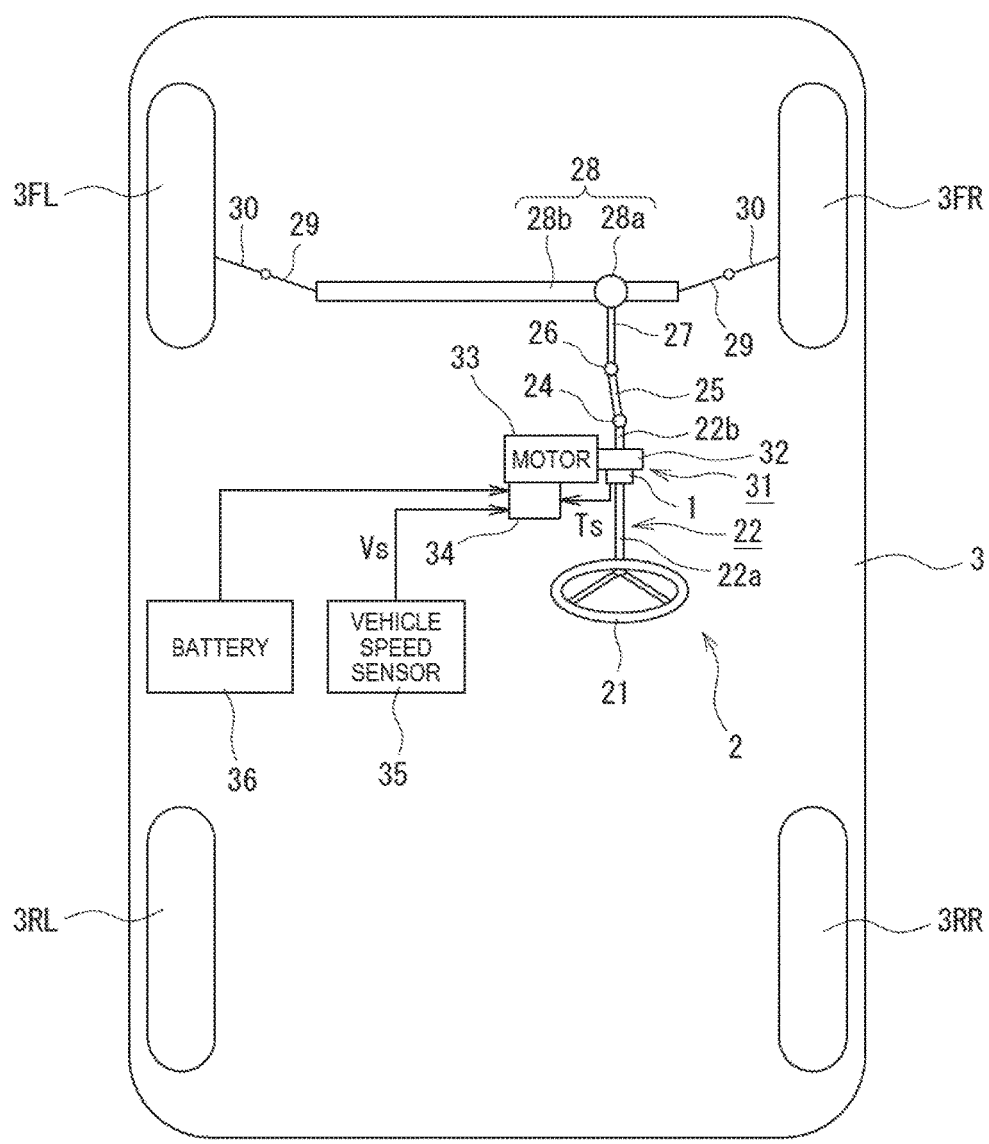
FIG. 1 is a block diagram illustrating a configuration example of a vehicle according to a first embodiment of the present invention.

Next, with reference to the drawings, the first to nineteenth embodiments of the present invention are described. In the below descriptions of the drawings, identical or similar components are denoted by identical or similar reference numerals. Please note that the drawings are schematic, and length and breadth dimensions or scale sizes of members or components are different from actual one. Therefore, the specific dimensions or scale sizes need to be determined based on the following descriptions. It is matter of course that components having different dimensional relationships and ratios are included among the drawings.

The first to nineteenth embodiments below exemplify a device and a method for embodying the technical idea of the present invention, and the technical idea of the present invention does not limit the quality of material, the shape, the structure, the arrangement and the like of components to below. The technical idea of the present invention can be changed in various ways within a technical scope defined by claims.

First Embodiment (Configuration)

As illustrated in FIG. 1, a vehicle 3 according to the first embodiment includes left and right turning wheels, i.e., front wheels 3FR and 3FL, and rear wheels 3RR and 3RL. The front wheels 3FR and 3FL are steered by an electric power steering device 2.

As illustrated in FIG. 1, the electric power steering device 2 includes a steering wheel 21, a steering shaft 22, a first torque sensor 1, a first universal joint 24, a lower shaft 25, and a second universal joint 26.

The electric power steering device 2 further includes a pinion shaft 27, a steering gear 28, a tie rod 29, and a knuckle arm 30.

The steering force applied by a driver to the steering wheel 21 is transmitted to the steering shaft 22. The steering shaft 22 includes an input shaft 22a and an output shaft 22b. The input shaft 22a has one end connected to the steering wheel 21, and the other end connected to one end of the output shaft 22b via the first torque sensor 1.

Then, the steering force transmitted to the output shaft 22b is transmitted, via the first universal joint 24, to the lower shaft 25 and transmitted, via the second universal joint 26, to the pinion shaft 27. The steering force transmitted to the pinion shaft 27 is transmitted, via the steering gear 28, to the tie rod 29. Further, the steering force transmitted to the tie rod 29 is transmitted to the knuckle arm 30 to cause the front wheels 3FR and 3FL to be steered.

The rack and pinion type steering gear 28 includes a pinion 28a connected with the pinion shaft 27 and a rack 28b meshed with the pinion 28a. Accordingly, the steering gear 28 transforms a rotary movement transmitted to the pinion 28a to a linear movement in a vehicle width direction using the rack 28b.

Further, to the output shaft 22b of the steering shaft 22, a steering assist mechanism 31 for transmitting the steering assist force to the output shaft 22b is connected.

The steering assist mechanism 31 includes a reduction gear 32 that is connected with the output shaft 22b and for example, configured from a worm gear mechanism, an electric motor 33 that is connected with the reduction gear 32 and generates the steering assist force, and an EPS control unit 34 that is fixed/supported to/by a housing of the electric motor 33.

The electric motor 33 is a three-phase brushless motor and includes unillustrated ring-like motor rotor and ring-like motor stator. The motor stator includes a plurality of pole teeth projecting at inside in a diameter direction and arranged in the circumferential direction at regular intervals and, to each of pole teeth, an excitation coil is wounded. The motor rotor is coaxially provided at the inside of the motor stator. The motor rotor faces with the pole teeth of the motor stator with a slight gap (air gap) therebetween and includes a plurality of magnets provided to the circumference surface in the circumferential direction at regular intervals.

The motor rotor is fixed to the motor rotation axis and the three-phase alternating current is caused to flow to the coil of the motor stator via the EPS control unit 34, so that each tooth of the motor stator is excited in a predetermined order to rotate the motor, and in accordance with the rotation, the motor rotation axis rotate.

The EPS control unit 34 includes unillustrated current command calculation circuit and motor drive circuit. As illustrated in FIG. 1, the EPS control unit 34 receives the vehicle speed V detected by a vehicle speed sensor 35 and the direct current from a battery 36 as the DC voltage source.

The current command calculation circuit calculates the current command value for driving the electric motor 33 based on the vehicle speed V from the vehicle speed sensor 35, the steering torque Ts from the first torque sensor 1, and the motor rotation angle θm from the electric motor 33.

The motor drive circuit is configured from, for example, the three-phase inverter circuit, and based on the current command value from the current command calculation circuit, drives the electric motor 33.

The first torque sensor 1 detects the steering torque Ts that is applied to the steering wheel 21 and transmitted to the input shaft 22a.

Figure 2:
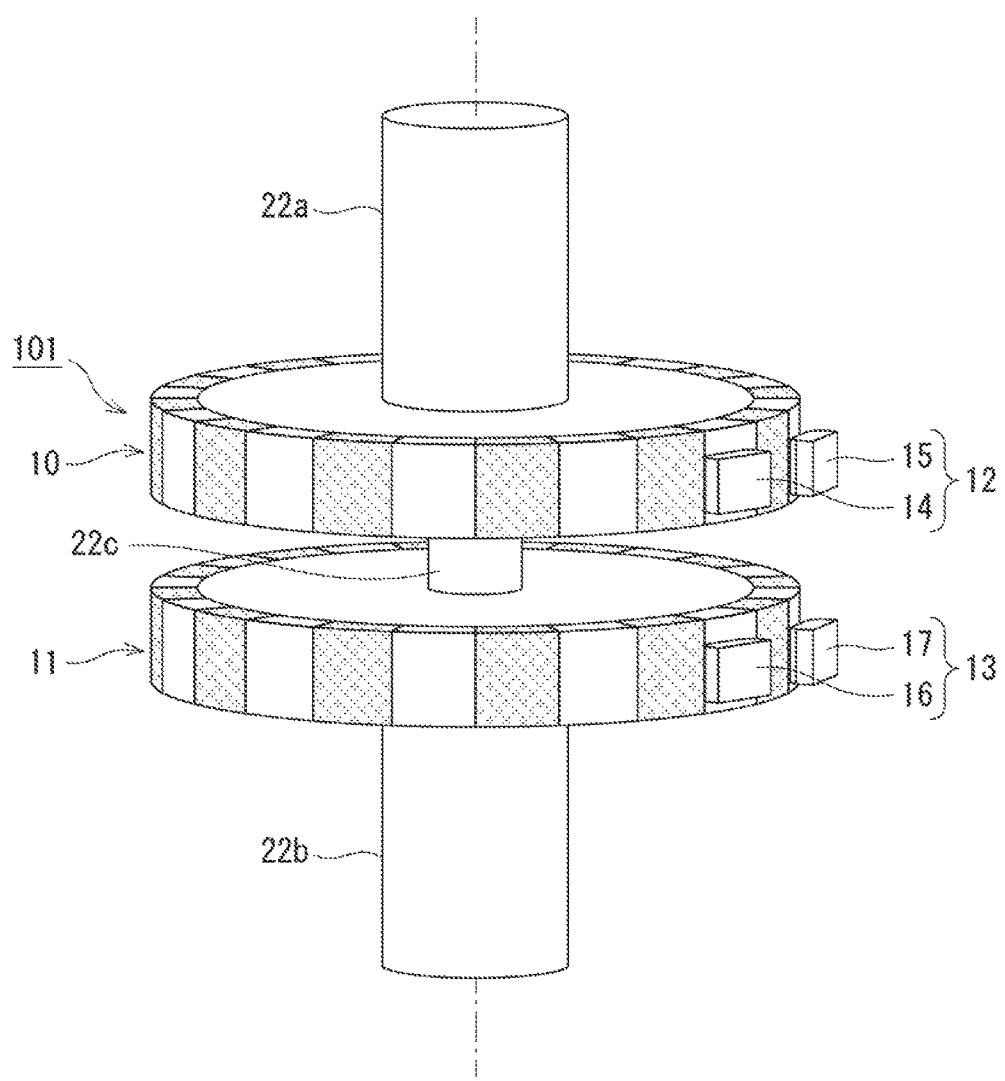
FIG. 2 is a perspective view schematically illustrating a configuration example of a first sensor unit of a first relative angle detection device according to the first embodiment of the present invention.
Figure 4:
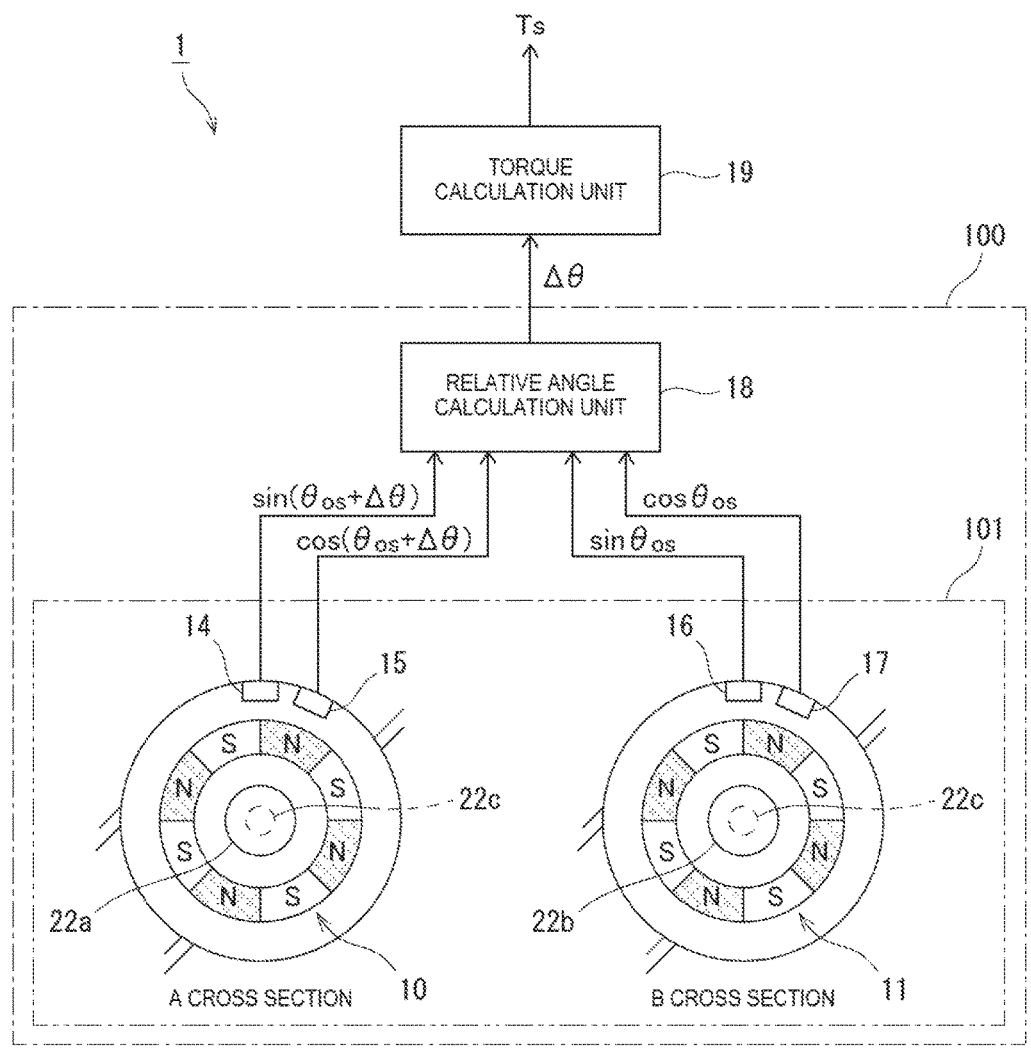
FIG. 4 is a drawing illustrating a configuration example of a first torque sensor according to the first embodiment of the present invention.

Specifically, as illustrated in FIG. 2 and FIG. 4, the first torque sensor 1 includes the first relative angle detection device 100 and the torque calculation unit 19. The first relative angle detection device 100 includes the first sensor unit 101 and the relative angle calculation unit 18.

As illustrated in FIG. 2, the first sensor unit 101 includes the first multipolar ring magnet 10, the second multipolar ring magnet 11, and a torsion bar 22c made of an elastic member such as spring steel.

The first sensor unit 101 includes the first rotation angle sensor 12 provided radially outside of the first multipolar ring magnet 10 and configured to detect the rotation angle of the first multipolar ring magnet 10 and the second rotation angle sensor 13 provided radially outside of the second multipolar ring magnet 11 and configured to detect the rotation angle of the second multipolar ring magnet 11.

In the first embodiment, the first multipolar ring magnet 10 is provided to the side end of the output shaft 22b of the input shaft 22a (ideally, connecting position of the torsion bar 22c) so as to be synchronously rotatable with the input shaft 22a. Further, the second multipolar ring magnet 11 is provided to the side end of the input shaft 22a of the output shaft 22b (ideally, the connecting position of the torsion bar 22c) so as to be synchronously rotatable with the output shaft 22b.

Further, the first multipolar ring magnet 10 and the second multipolar ring magnet 11 in the first embodiment can be obtained by magnetizing apart of the circumference surface of the magnetic body ring to one magnetic pole from between the S pole and the N pole at regular intervals.

Figure 3A:
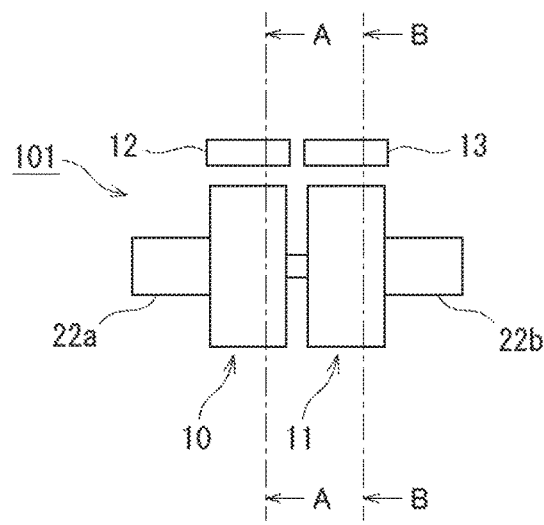
FIG. 3A is a drawing of the first sensor unit of the first relative angle detection device according to the first embodiment of the present invention as viewed from the front.
Figure 3B:
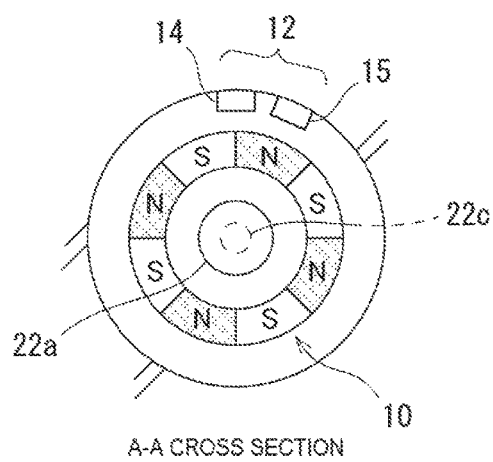
FIG. 3B is a cross-sectional view of FIG. 3A taken along a line A-A.
Figure 3C:
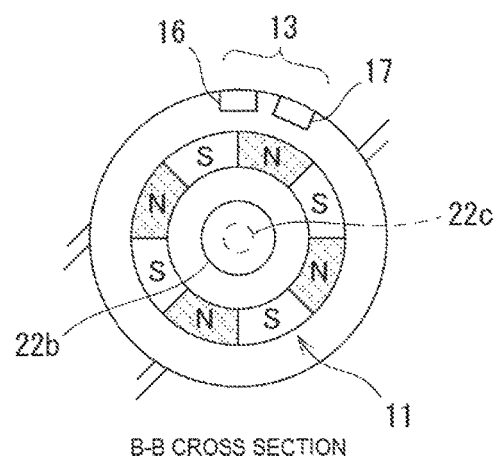
FIG. 3C is a cross-sectional view of FIG. 3A taken along a line B-B.

As illustrated in FIG. 3B which is a cross-sectional view of FIG. 3A taken along a line A-A and FIG. 3C which is a cross-sectional view of FIG. 3A taken along a line B-B, specifically, in the first multipolar ring magnet 10 and the second multipolar ring magnet 11, the N pole that is hatched in the drawing and the S pole that is unhatched in the drawing, i.e. different types of magnetic poles are alternately and equally distributed in the circumferential direction.

Further, magnetic pole pairs are configured from a pair of magnetic poles, i.e., the S pole and the N pole that are adjacent with each other in the circumferential direction of the first multipolar ring magnet 10 and the second multipolar ring magnet 11.

The first multipolar ring magnet 10 and the second multipolar ring magnet 11 can be configured from, for example, the neodymium magnet, the ferrite magnet, the samarium-cobalt magnet and the like in accordance with the necessary magnetic flux density.

The first rotation angle sensor 12 and the second rotation angle sensor 13 are provided to a fixing part that does not synchronously rotate with the input shaft 22a that serves as the first rotation axis and the output shaft 22b that serves as the second rotation axis. The first rotation angle sensor 12 and the second rotation angle sensor 13 respectively output the sin signal and the cos signal in accordance with the rotation angles of the first multipolar ring magnet 10 and the second multipolar ring magnet 11.

As illustrated in FIG. 2 and FIG. 3B, specifically the first rotation angle sensor 12 includes a first sin magnetic sensor 14 and a first cos magnetic sensor 15 that are provided to the magnetic pole pitch while shifting the phase by an electric angle of 90° (having Phase difference of 90°). Further, as illustrated in FIG. 2 and FIG. 3C, the second rotation angle sensor 13 includes a second sin magnetic sensor 16 and a second cos magnetic sensor 17 that are provided to the magnetic pole pitch while shifting a phase by an electric angle of 90° (having phase difference of 90°).

The first sin magnetic sensor 14, in accordance with the rotation angle of the first multipolar ring magnet 10, outputs the first sin signal, and the first cos magnetic sensor 15, in accordance with the rotation angle of the first multipolar ring magnet 10, outputs the first cos signal.

Further, the second sin magnetic sensor 16, in accordance with the rotation angle of the second multipolar ring magnet 11, outputs the second sin signal, and the second cos magnetic sensor 17, in accordance with the rotation angle of the second multipolar ring magnet 11, outputs the second cos signal.

The relative angle calculation unit 18 receives these output first sin signal, first cos signal, second sin signal and second cos signal.

In the first embodiment, the first sin magnetic sensor 14 and the first cos magnetic sensor 15 are arranged to face the first multipolar ring magnet 10 in a radial direction such that the detection units face the pole faces of the first multipolar ring magnet 10. Further, the second sin magnetic sensor 16 and the second cos magnetic sensor 17 are arranged to face the second multipolar ring magnet 11 in the radial direction such that the detection units face the pole faces of the second multipolar ring magnet 11.

For these magnetic sensors 14, 15, 16 and 17, for example, a hall element, Hall IC, MR (Magneto Resistance effect) sensor and the like can be used.

The relative angle calculation unit 18, based on the input first sin signal, first cos signal, second sin signal and second cos signal, calculates the relative angle (i.e., the relative angle between the input shaft 22a and the output shaft 22b) $\Delta\theta$ between the first multipolar ring magnet 10 and the second multipolar ring magnet 11. The relative angle calculation unit 18 outputs the calculated relative angle $\Delta\theta$ to the torque calculation unit 19.

The torque calculation unit 19, based on the relative angle $\Delta\theta$ input from the relative angle calculation unit 18, calculates the steering torque Ts. If the biaxial relative angle $\Delta\theta$ connected through the torsion bar is obtained, using the cross sectional second polar moment, modulus of transverse elasticity, length, diameter and the like of the torsion bar, the torque can be calculated using a well-known calculation method.

Next, detailed configurations of the relative angle calculation unit 18 are described.

As illustrated in FIG. 6, the relative angle calculation unit 18 includes a sin $\Delta\theta$ calculation unit 181, a cos $\Delta\theta$ calculation unit 182, and a $\Delta\theta$ calculation unit 183.

In the first embodiment, the rotation angle (electrical angle) of the first multipolar ring magnet 10 is assumed to be $\theta is$ and the rotation angle (electrical angle) of the second multipolar ring magnet 11 is assumed to be $\theta os$. When the steering wheel 21 is steered and the input shaft 22a is turned, based on assumption that $\theta os$ is fixed as a predetermined angle while $\theta is$ changes, followings are represented: "$\sin \theta is = \sin(\theta os + \Delta\theta)$," "$\cos \theta is = \cos(\theta os + \Delta\theta)$."

In other words, in the first embodiment, as illustrated in FIG. 4, it is assumed that, from the first sin magnetic sensor 14, the first sin signal representing $\sin(\theta os + \Delta\theta)$ is output, and from the first cos magnetic sensor 15, the first cos signal representing $\cos(\theta os + \Delta\theta)$ is output. Further, it is assumed that, from the second sin magnetic sensor 16, the second sin signal representing sin θos is output and, from the second cos magnetic sensor 17, the second cos signal representing cos θos is output.

Hereinafter, the first sin signal, the first cos signal, the second sin signal, and the second cos signal are sometimes described as "sin(θos+Δθ)," "cos(θos+Δθ)," "sin θos," and "cos θos."

The sin Δθ calculation unit 181 calculates sin Δθ in accordance with the following expressions (1) and (2).

$$TMs = (\sin \theta os + \cos(\theta os + \Delta\theta))^2 + (\cos \theta os - \sin(\theta os + \Delta\theta))^2 \quad (1)$$

$$\sin \Delta\theta = -TMs/2 + 1 \quad (2)$$

Above expression (2) is obtained by deforming above expression (1) using the addition theorem and the like of the trigonometric function.

Specifically, the sin Δθ calculation unit 181, in accordance with the above expression (1), calculates a value obtained by squaring the added value of sin θos input from the second sin magnetic sensor 16 and cos(θos+Δθ) input from the first cos magnetic sensor 15. Further, the sin Δθ calculation unit 181 subtracts, from cos θos input from the second cos magnetic sensor 17, sin(θos+Δθ) input from the first sin magnetic sensor 14, and squares the thus obtained subtraction value. By summing the calculated square values, TMs is calculated.

Continuously, the sin Δθ calculation unit 181, in accordance with the above expression (2), divides the calculated TMs by 2, and subtracts the thus obtained division value from 1 to calculate sin Δθ. The sin Δθ calculation unit 181 outputs the calculated sin Δθ to the Δθ calculation unit 183.

The cos Δθ calculation unit 182, in accordance with the following expressions (3) and (4), calculates cos Δθ.

$$TMc = (\sin \theta os + \sin(\theta os + \Delta\theta))^2 + (\cos \theta os + \cos(\theta os + \Delta\theta))^2 \quad (3)$$

$$\cos \Delta\theta = TMc/2 - 1 \quad (4)$$

The above expression (4) is obtained by deforming the above expression (3) using the addition theorem and the like of the trigonometric function.

Specifically, the cos Δθ calculation unit 182, in accordance with the above expression (3), calculates a value obtained by squaring the added value of sin θos input from the second sin magnetic sensor 16 and sin(θos+Δθ) input from the first sin magnetic sensor 14. Further, the cos Δθ calculation unit 182 calculates a value obtained by squaring the added value of cos θos input from the second cos magnetic sensor 17 and cos(θos+Δθ) input from the first cos magnetic sensor 15. By summing the calculated square values, TMc is calculated.

Continuously, the cos Δθ calculation unit 182, in accordance with the above expression (4), divides the calculated TMc by 2, and subtracts 1 from the thus obtained division value to calculate cos Δθ. The cos Δθ calculation unit 182 outputs the calculated cos Δθ to the Δ calculation unit 183.

When the steering wheel 21 is steered and the input shaft 22a is turned from a state where, for example, the steering wheel 21 is at a neutral position, it is assumed that θos is fixed to "0°," while θis changes.

Figure 5A:
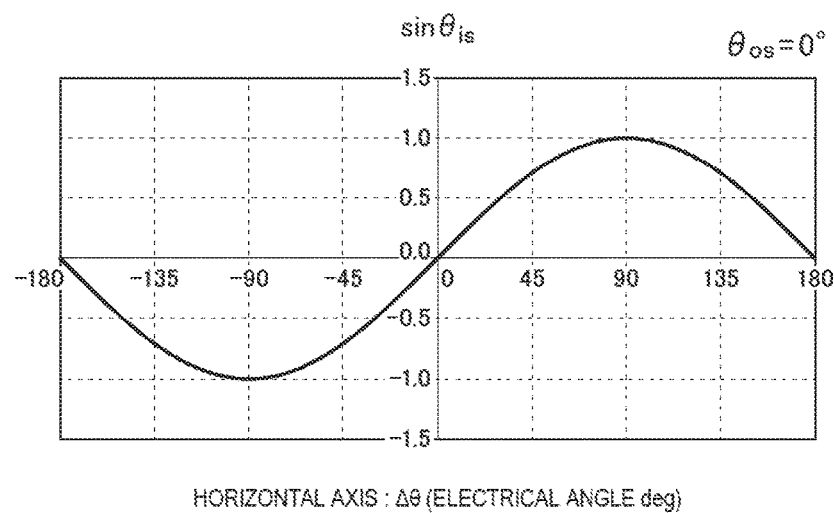
FIG. 5A is a waveform chart illustrating sin $\theta$is and FIG. 5B is a waveform chart illustrating cos $\theta$is.
Figure 5B:
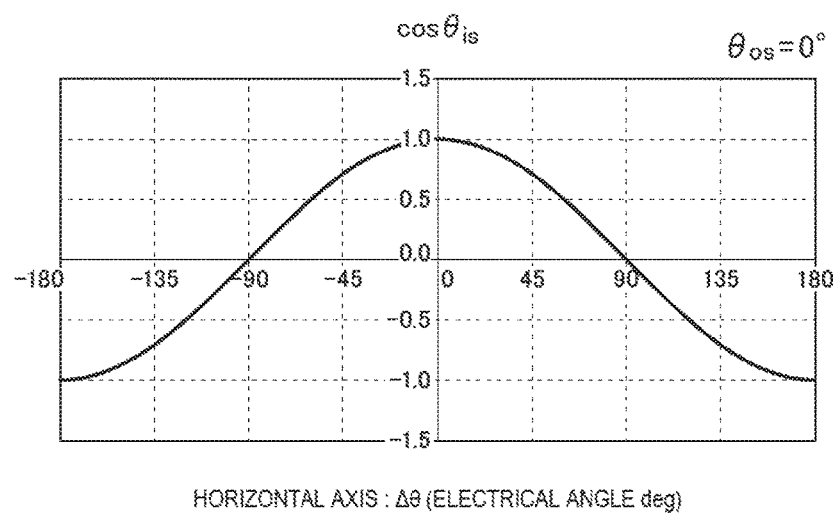

When θos is fixed to "0°" to lead "sin θos=0" and "cos θos=1" and the steering wheel 21 is at the neutral position, as illustrated in FIG. 5A, if Δθ is "0°," sin θis is "0," if Δθ is "90°," sin θis is "1," and if Δθ is "-90°," sin θis is "-1." On the other hand, when the steering wheel 21 is at the neutral position, as illustrated in FIG. 5B, if Δθ is "0°," cos θis is "1" and if Δθ is "90°" and "-90°," cos θis is "0."

Figure 7A:
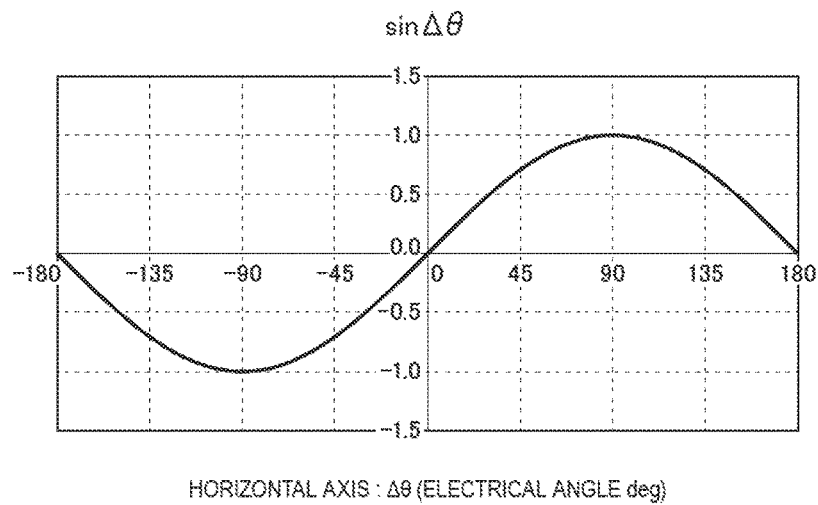
FIG. 7A is a waveform chart illustrating sin $\Delta\theta$ and FIG. 7B is a waveform chart illustrating cos $\Delta\theta$.

In this case, sin Δθ calculated in accordance with the above expressions (1) and (2) takes values on a sin curve on which, as illustrated in FIG. 7A, if Δθ is "0°," sin Δθ is "0," if Δθ is "90°," sin Δθ is "1," and if Δθ is "-90°," sin Δθ is "-1."

Figure 7B:
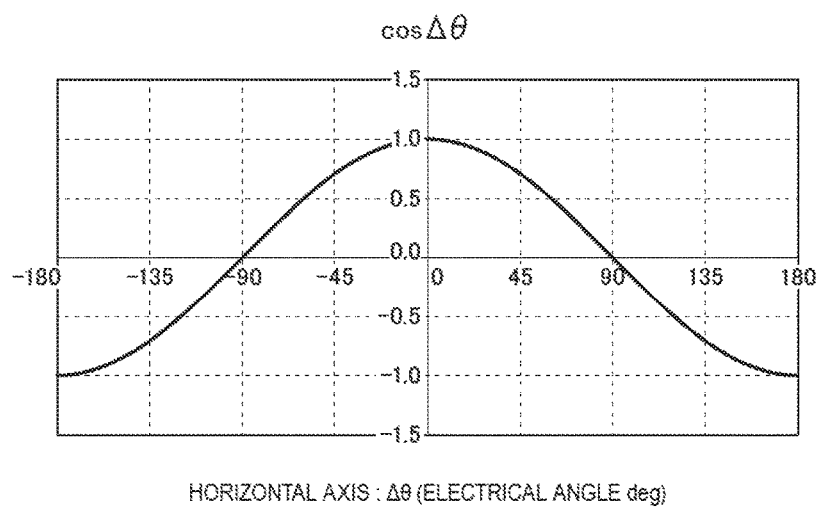

Further, cos Δθ calculated in accordance with the above expressions (3) and (4) takes values on a cos curve on which, as illustrated in FIG. 7B, if Δθ is "0°," cos Δθ is "1," and if Δθ is "90°" and "-90°," cos Δθ is "0."

The Δθ calculation unit 183 calculates the relative angle Δθ in accordance with a expression (5) below.

$$\Delta\theta = \arctan(\sin \Delta\theta / \cos \Delta\theta) \quad (5)$$

Specifically, the Δθ calculation unit 183 calculates the arctangent of a value obtained by dividing sin Δθ by cos Δθ to calculate the relative angle Δθ in accordance with the above expression (5) using sin Δθ input from the sin Δθ calculation unit 181 and cos Δθ input from the cos Δθ calculation unit 183. The relative angle calculation unit 18 outputs the calculated relative angle Δθ to the torque calculation unit 19.

Figure 8:
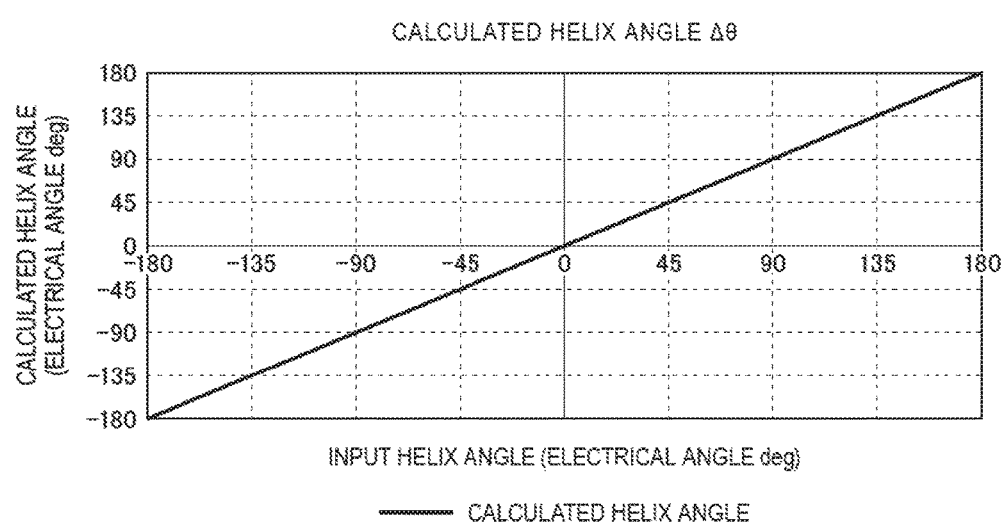
FIG. 8 is a drawing illustrating a relationship between an input helix angle and a calculated helix angle (the relative angle $\Delta\theta$)

As illustrated in FIG. 8, the ratio relationship between the relative angle (helix angle) Δθ and input helix angle is 1:1. In other words, by calculating the relative angle Δθ in accordance with the above expressions (1) to (5), it is possible to calculate the helix angle (relative angle) without depending on the steering angle of the steering wheel 21.

(Operations)

Next, operations of the first embodiment are described.

Upon steering of the steering wheel 21 by a driver of the vehicle 3 and transmission of the steering force to the steering shaft 22, first, the input shaft 22a turns in a direction corresponding to the steering direction. With this turning, the end portion of a side of the input shaft 22a of the torsion bar 22c (hereinafter referred to as "input end") turns, and accordingly the first multipolar ring magnet 10 provided to the input end of the torsion bar 22c turns.

The magnetic flux in accordance with the rotational displacement by the turning is detected by the first sin magnetic sensor 14 and the first cos magnetic sensor 15 as sin(θos+Δθ) and cos(θos+Δθ). The detection signals are input to the relative angle calculation unit 18.

On the other hand, the steering force transmitted through the input end is transmitted to the end portion (hereinafter referred to as "output end") of the output shaft 22b side through torsion (elastic deformation) of the torsion bar 22c, and accordingly, the output end turns. In other words, the input end (input shaft 22a) and the output end (output shaft 22b) are relatively displaced in a rotation direction.

This turns the second multipolar ring magnet 11 provided to the output end of the torsion bar 22c. The magnetic flux in accordance with the rotational displacement by turning is detected by the second sin magnetic sensor 16 and the second cos magnetic sensor 17 as sin θos and cos θos. The detection signals are input to the relative angle calculation unit 18.

The relative angle calculation unit 18, based on received sin(θos+Δθ), cos(θos+Δθ), sin θos and cos θos, calculates sin Δθ and cos Δθ in accordance with above expressions (1) to (4). The relative angle calculation unit 18 uses the calculated sin Δθ and cos Δθ to, in accordance with the above expression (5), divide sin Δθ by cos Δθ to obtain the arctangent of the thus obtained division value and accordingly the relative angle Δθ is calculated. The relative angle calculation unit 18 outputs the calculated relative angle Δθ to the torque calculation unit 19.

The torque calculation unit 19 calculates the steering torque Ts, based on the relative angle Δθ, received from the relative angle calculation unit 18. For example, when the torsion bar 22c is a solid columnar member, the steering torque Ts applied to the torsion bar 22c is calculated from "$\Delta\theta = 32 \cdot Ts \cdot L/(\pi \cdot D^4 \cdot G)$". Please note, L indicates a length of the torsion bar 22c, D indicates a diameter of the torsion bar 22c, and G indicates the modulus of transverse elasticity of the torsion bar 22c.

The torque calculation unit 19 outputs the calculated steering torque Ts to the EPS control unit 34.

Through the current command calculation circuit, the EPS control unit 34 calculates the current command value based on the steering torque Ts from the torque calculation unit 19, the vehicle speed V from the vehicle speed sensor 35, and the motor rotation angle θm from the electric motor 33. Further, through the motor drive circuit, the EPS control unit 34 generates the three-phase alternating current in accordance with the current command value calculated through the current command calculation circuit, supplies the generated three-phase alternating current to the electric motor 33, and causes the electric motor 33 to generate the steering assist force.

In the first embodiment, the rotation angle θis of the first multipolar ring magnet 10 corresponds to the rotation angle $\theta_1$ in CLAIMS and Solution to Problem, and the rotation angle θos of the second multipolar ring magnet 11 corresponds to the rotation angle $\theta_2$ in CLAIMS and Solution to Problem.

(Effect of First Embodiment)

The first relative angle detection device 100 according to the first embodiment includes: the first multipolar ring magnet 10 having different magnetic poles alternately and equally distributed in the circumferential direction and configured to synchronously rotate with the input shaft 22a from between the coaxially arranged input shaft 22a and output shaft 22b; the second multipolar ring magnet 11 having different magnetic poles alternately and equally distributed with in the circumferential direction and configured to synchronously rotate with the output shaft 22b from between the input shaft 22a and the output shaft 22b; the first rotation angle sensor 12 configured to detect the magnetic flux in accordance with the rotation angle θis when the first multipolar ring magnet 10 is turned to output the first sin signal representing sin θis and the first cos signal representing cos θis; the second rotation angle sensor 13 configured to detect the magnetic flux in accordance with the rotation angle θos when the second multipolar ring magnet 11 is turned to output the second sin signal representing sin θos and the second cos signal representing cos θos; and the relative angle calculation unit configured to, based on the first sin signal and the first cos signal, and the second sin signal and the second cos signal, calculate sin Δθ and cos Δθ corresponding to the relative angle Δθ between the input shaft 22a and the output shaft 22b, and from Δθ=arctan(sin Δθ/cos Δθ), calculates the relative angle Δθ.

With this configuration, it is possible to calculate both sin Δθ and cos Δθ and divide the calculated sin Δθ by cos Δθ to obtain the arctangent of the division value, and accordingly the relative angle Δθ can be calculated. This allows the calculation of the torque even at the helix angle region exceeding the linear portion of sin Δθ. As a result, it is possible to handle more wider torque detection range. Further, even in the same torque detection range, the whole information on sin Δθ can be used, it is possible to enhance the resolution of a detected torque value. Further, by one time calculation, i.e., the calculation of arctan(sin Δθ/cos Δθ), the relative angle Δθ can be calculated, and thus, the highly accurate torque value can be calculated.

In the first relative angle detection device 100 according to the first embodiment, the first multipolar ring magnet 10 and the second multipolar ring magnet 11 are configured by magnetizing the part of the circumference surface to alternately different magnetic poles in the circumferential direction. The first rotation angle sensor 12 is arranged such that the detection unit (first sin magnetic sensor 14 and first cos magnetic sensor 15) of the magnetic flux of the first rotation angle sensor 12 faces the pole face formed to the circumference surface of the first multipolar ring magnet 10. Further, the second rotation angle sensor 13 is arranged such that the detection unit (second sin magnetic sensor 16 and second cos magnetic sensor 17) of the magnetic flux of the second rotation angle sensor 13 faces the pole face formed to the circumference surface of the second multipolar ring magnet 11.

With this configuration, for example, even if there is insufficient space relative to the ring magnet in an axial direction, the rotation angle sensor can be provided in a radially facing manner.

In the first relative angle detection device 100 according to the first embodiment, the first rotation angle sensor 12 includes the first sin magnetic sensor 14 configured to output the first sin signal and the first cos magnetic sensor 15 configured to output the first cos signal, both fixed to the pitch of the magnetic pole of the first multipolar ring magnet 10 while having the phase difference of 90° of the electrical angle. Further, the second rotation angle sensor 13 includes the second sin magnetic sensor 16 configured to output the second sin signal and the second cos magnetic sensor 17 configured to output the second cos signal, both fixed to the pitch of the magnetic pole of the second multipolar ring magnet 11 while having the phase difference of 90° of the electrical angle.

With this configuration, the first sin magnetic sensor 14 and the first cos magnetic sensor 15 can easily output signals representing sin θis and cos θis in accordance with the rotation angle θis of the first multipolar ring magnet 10. Further, the second sin magnetic sensor 16 and the second cos magnetic sensor 17 can easily output signals representing sin θos and cos θos in accordance with the rotation angle θos of the second multipolar ring magnet 11.

In the first relative angle detection device 100 according to the first embodiment, the first rotation angle sensor 12 and the second rotation angle sensor 13 are provided such that when the relative angle Δθ is 0°, the output of the first rotation angle sensor 12 and the output of the second rotation angle sensor 13 make the same phase.

With this configuration, using the signals output from the first rotation angle sensor 12 and the second rotation angle sensor 13, sin Δθ and cos Δθ can be calculated easily in accordance with the above expressions (1) to (4).

According to the first relative angle detection device 100 of the first embodiment, sin θis and cos θis are respectively sin(θos+Δθ) and cos(θos+Δθ). Then, the relative angle calculation unit 18, based on the above expressions (1) and (2), calculates sin Δθ and based on the above expressions (3) and (4), calculates cos Δθ.

With this configuration, sin Δθ and cos Δθ can be calculated by a simple calculation using the signals output from the first rotation angle sensor 12 and output from the second rotation angle sensor 13.

The first torque sensor 1 according to the first embodiment includes the first relative angle detection device 100 of the first embodiment configured to detect the relative angle $\Delta\theta$ between the input shaft 22a and the output shaft 22b connected via the torsion bar 22c; and the torque calculation unit 19 configured to calculate, based on the relative angle $\Delta\theta$, the torque (steering torque Ts) generated to the input shaft 22a and the output shaft 22b.

With this configuration, functions and effects equivalent to those of the first relative angle detection device 100 according to any one of above (1) to (5) can be obtained.

The electric power steering device 2 according to the first embodiment includes the first torque sensor 1 of the first embodiment.

With this configuration, by the highly accurate steering torque Ts corresponding to the wide torque detection range, the electric motor is driven and controlled to allow generation of the appropriate steering assist torque. As a result, the favorable steering assist such as steering feeling can be performed.

The vehicle 3 according to the first embodiment includes the electric power steering device 2 of the first embodiment.

With this configuration, functions and effects equivalent to those of the electric power steering device 2 can be obtained.

Second Embodiment (Configuration)

While the first relative angle detection device 100 of the first embodiment includes the relative angle calculation unit 18, the relative angle detection device of the second embodiment includes the sensor calculation unit 180, and the configuration of the second embodiment is the same as that of the first embodiment except that the torque calculation unit 19 calculates, based on a second relative angle $\Delta\theta_2$ output from the sensor calculation unit 180, the steering torque Ts.

Hereinafter, components of the second embodiment equivalent to those of the first embodiment are denoted with the same reference numerals to appropriately omit the descriptions, and different components are described in details.

Figure 9:
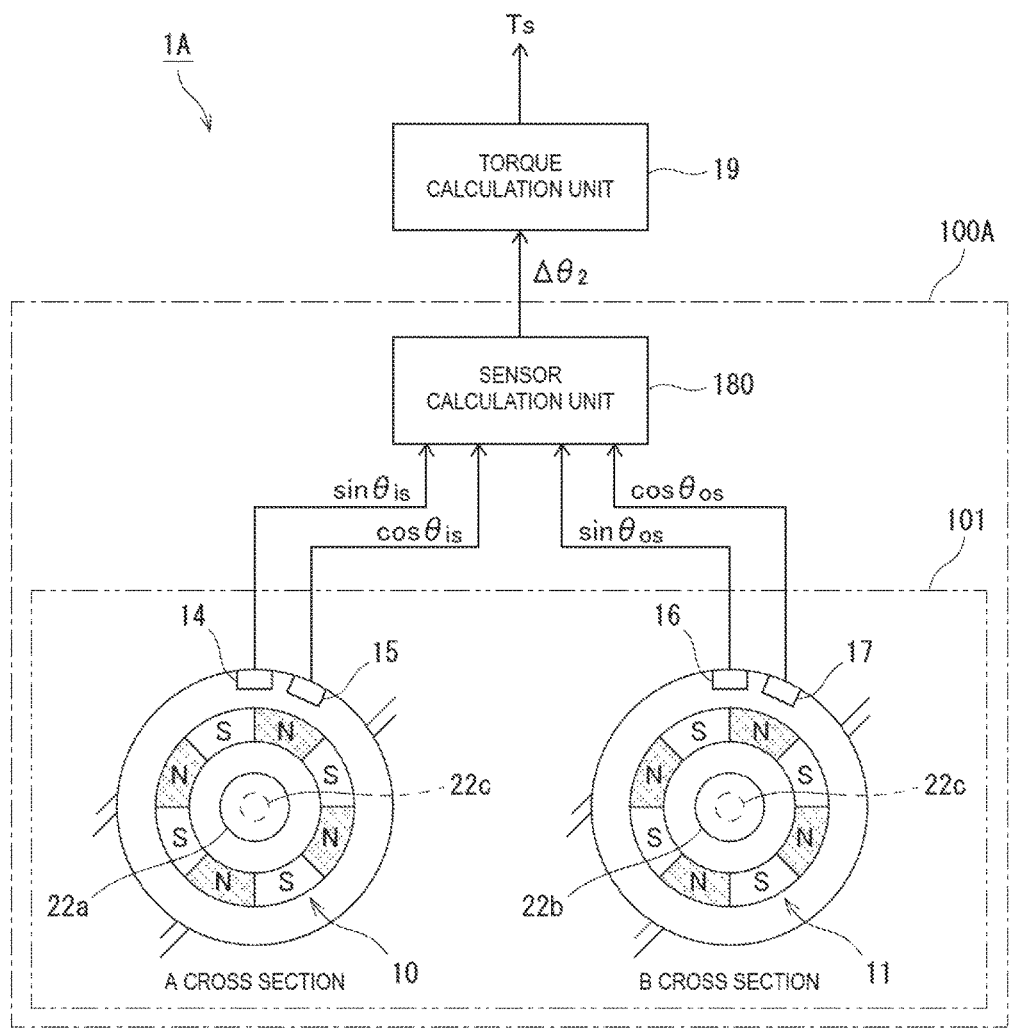
FIG. 9 is a drawing illustrating a configuration example of a second torque sensor according to a second embodiment of the present invention.

As illustrated in FIG. 9, the second torque sensor 1A of the second embodiment includes a second relative angle detection device 100A and the torque calculation unit 19. The second relative angle detection device 100A includes the first sensor unit 101 and the sensor calculation unit 180.

Figure 10:
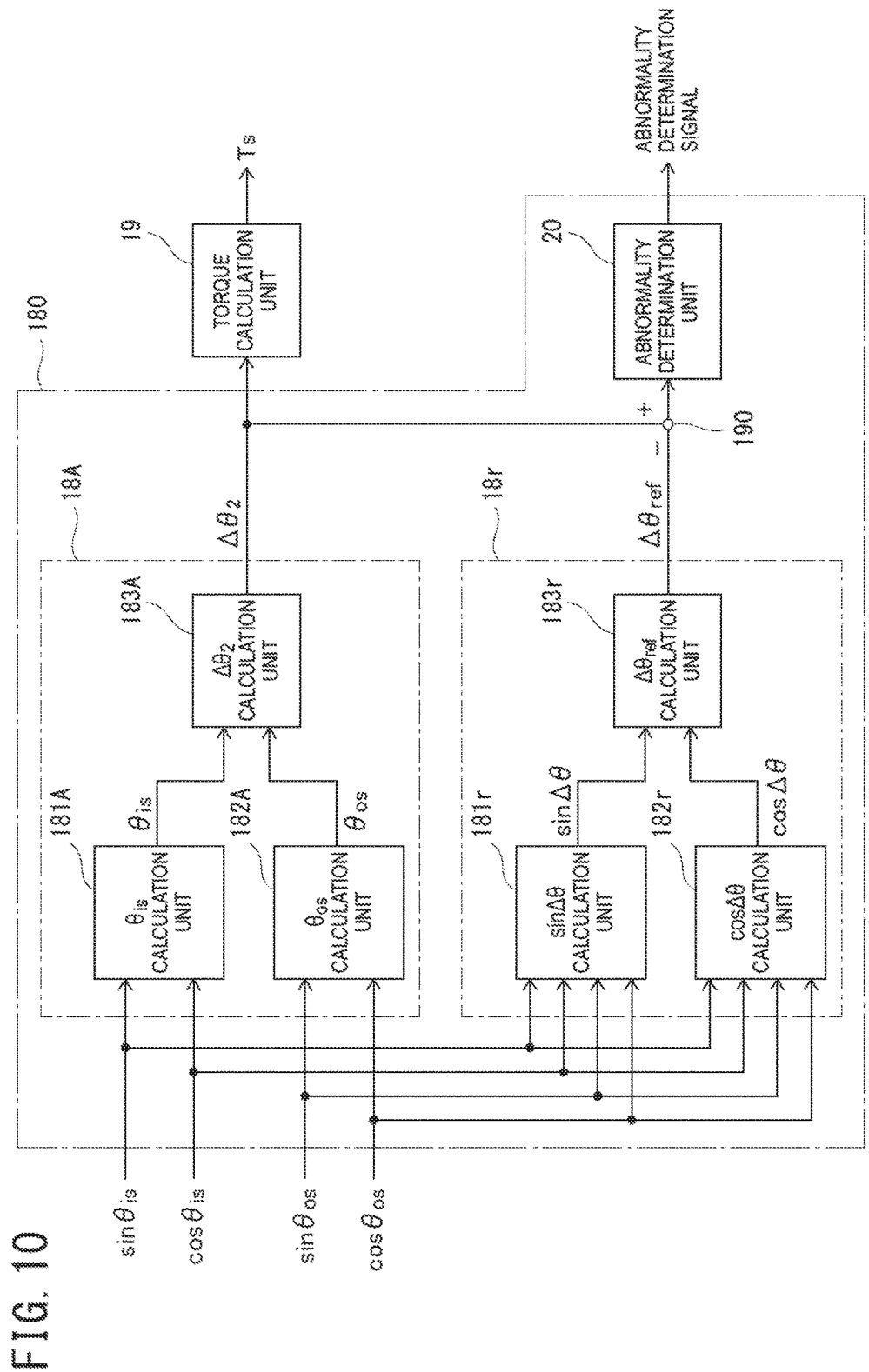
FIG. 10 is a block diagram illustrating a configuration example of a sensor calculation unit according to the second embodiment of the present invention.

As illustrated in FIG. 10, a sensor calculation unit 180 includes a second relative angle calculation unit 18A and a third relative angle calculation unit 18r. The first sin signal, the first cos signal, the second sin signal, and the second cos signal respectively output from the first sin magnetic sensor 14, the first cos magnetic sensor 15, the second sin magnetic sensor 16 and the second cos magnetic sensor 17 are input to the second relative angle calculation unit 18A and the third relative angle calculation unit 18r.

The second relative angle calculation unit 18A, based on the first sin signal, the first cos signal, the second sin signal, and the second cos signal, calculates the relative angle between the first multipolar ring magnet 10 and the second multipolar ring magnet 11, i.e., the relative angle between the input shaft 22a and the output shaft 22b as the second relative angle $\Delta\theta_2$. Then, the second relative angle calculation unit 18A outputs the calculated second relative angle $\Delta\theta_2$ to the torque calculation unit 19.

The torque calculation unit 19, based on the second relative angle $\Delta\theta_2$ input from the second relative angle calculation unit 18A, calculates the steering torque Ts. In other words, if two shafts connected via the torsion bar 22c, i.e., the relative angle between the input shaft 22a and the output shaft 22b can be obtained, using the cross sectional second polar moment, modulus of transverse elasticity, the length, the diameter and the like of the torsion bar 22c, the torque can be calculated by the well-known calculation method.

On the other hand, the third relative angle calculation unit 18r, based on the first sin signal, the first cos signal, the second sin signal, and the second cos signal, calculates the relative angle between the input shaft 22a and the output shaft 22b as a third relative angle $\Delta\theta$ref by a method different from that of the second relative angle calculation unit 18A.

As illustrated in FIG. 10, the second relative angle calculation unit 18A includes an input shaft rotational angle ($\theta$is in drawing) calculation unit 181A, an output shaft rotational angle ($\theta$os in drawing) calculation unit 182A, and a second relative angle ($\Delta\theta_2$ in drawing) calculation unit 183A. In the second embodiment, the rotation angle (electrical angle) of the first multipolar ring magnet 10 is $\theta$is ($=\theta_1$) and the rotation angle (electrical angle) of the second multipolar ring magnet 11 is $\theta$os($=\theta_2$). Since the first multipolar ring magnet 10 synchronously rotates with the input shaft 22a, the rotation angle $\theta$is of the first multipolar ring magnet 10 is the rotation angle $\theta$is of the input shaft 22a, and since the second multipolar ring magnet 11 synchronously rotates with the output shaft 22b, the rotation angle $\theta$os of the second multipolar ring magnet 11 is the rotation angle $\theta$os of the output shaft 22b.

Relative to the rotation angle $\theta$is of the first multipolar ring magnet 10, the first sin magnetic sensor 14 outputs sin $\theta$is ($=\sin\theta_1$) as the first sin signal and the first cos magnetic sensor 15 outputs cos $\theta$is($=\cos\theta_1$) as the first cos signal. The input shaft rotational angle calculation unit 181A that receives the first sin signal sin $\theta$is and the first cos signal cos $\theta$is calculates the rotation angle $\theta$is of the first multipolar ring magnet 10, i.e., the input shaft 22a based on the arctangent function of a value obtained by dividing the first sin signal sin $\theta$is by the first cos signal cos $\theta$is, i.e., $\theta$is=arctan(sin $\theta$is/cos $\theta$is).

Further, relative to the rotation angle $\theta$os of the second multipolar ring magnet 11, the second sin magnetic sensor 16 outputs sin $\theta$os ($=\sin\theta_2$) as the second sin signal and the second cos magnetic sensor 17 outputs cos $\theta$os ($=\cos\theta_2$) as the second cos signal. The output shaft rotational angle calculation unit 182A that receives the second sin signal sin $\theta$os and the second cos signal cos $\theta$os calculates the rotation angle $\theta$os of the second multipolar ring magnet 11, i.e., the output shaft 22b based on the arctangent function of a value obtained by dividing the second sin signal sin $\theta$os by the second cos signal cos $\theta$os, i.e., $\theta$os=arctan (sin $\theta$os/cos $\theta$os).

As described later, if the rotation angle $\theta$is of the input shaft 22a is represented as $\theta$is=$\theta$os+$\Delta\theta$ relative to the rotation angle $\theta$os of the output shaft 22b, the second relative angle calculation unit 183A can calculate the second relative angle $\Delta\theta_2$ as the relative angle between the input shaft 22a and the output shaft 22b from a difference value obtained by subtracting the rotation angle $\theta$os of the output shaft 22b from the rotation angle $\theta$is of the input shaft 22a. As illustrated in FIG. 8, the ratio relationship between the calculated second relative angle (helix angle) $\Delta\theta_2$ and the input helix angle is 1:1. In other words, the second relative angle calculation unit 18A calculates the second relative angle $\Delta\theta_2$ as the relative angle between the input shaft 22a and the output shaft 22b to enable calculation of the helix angle (relative angle) without depending on the steering angle of the steering wheel 21.

On the other hand, as illustrated in FIG. 10, the third relative angle calculation unit 18r includes the relative angle sine value (sin $\Delta\theta$ in drawing) calculation unit 181r, the relative angle cosine value (cos $\Delta\theta$ in drawing) calculation unit 182r, and the second relative angle ($\Delta\theta$ref in drawing) calculation unit 183r. For example, when the steering wheel 21 is steered and the input shaft 22a is rotated, while the rotation angle θos of the second multipolar ring magnet 11, i.e., the output shaft 22b is fixed at a predetermined angle, the rotation angle θis of the first multipolar ring magnet 10, i.e., the input shaft 22a is changed. In this case, as the relative angle between the input shaft 22a and the output shaft 22b, using the third relative angle $\Delta\theta$ref, followings can be represented: sin θis=sin(θos+$\Delta\theta$ref) and cos θis=cos(θos+$\Delta\theta$ref).

Accordingly, the relative angle sine value calculation unit 181r, in accordance with below expressions (6) and (7), calculates the relative angle sine value sin $\Delta\theta$.

$$TMs=(\sin\theta os+\cos(\theta os+\Delta\theta ref))^2+(\cos\theta os-\sin(\theta os+\Delta\theta ref))^2 \quad (6)$$

$$\sin\Delta\theta=-TMs/2+1 \quad (7)$$

Specifically, in accordance with the above expression (6), the relative angle sine value calculation unit 181r adds cos(θos+$\Delta\theta$ref) as the first cos signal cos θis input from the first cos magnetic sensor 15 to the second sin signal sin θos input from the second sin magnetic sensor 16 and squares the thus obtained added value. Further, the relative angle sine value calculation unit 181r subtracts sin(θos+$\Delta\theta$ref) as the first sin signal sin θis input from the first sin magnetic sensor 14 from the second cos signal cos θos input from the second cos magnetic sensor 17 and squares the thus obtained subtraction value. By summing the calculated square values, TMs is calculated. Next, the relative angle sine value calculation unit 181r, in accordance with the above expression (7), divides the calculated TMs by 2 and subtracts the division value from 1 to calculate the relative angle sine value sin $\Delta\theta$. The calculated relative angle sine value sin $\Delta\theta$ is output to the third relative angle calculation unit 183r. The above expression (7) is obtained by deforming the above expression (6) using the addition theorem and the like of the trigonometric function.

Further, the relative angle cosine value calculation unit 182r, in accordance with below expressions (8) and (9), calculates the relative angle cosine value cos $\Delta\theta$.

$$TMc=(\sin\theta os+\sin(\theta os+\Delta\theta ref))^2+(\cos\theta os+\cos(\theta os+\Delta\theta ref))^2 \quad (8)$$

$$\cos\Delta\theta=TMc/2-1 \quad (9)$$

Specifically, the relative angle cosine value calculation unit 182r, in accordance with the above expression (8), adds sin(θos+$\Delta\theta$ref) as the first sin signal sin θis input from the first sin magnetic sensor 14 to the second sin signal sin θos input from the second sin magnetic sensor 16 and squares the thus obtained added value. Further, the relative angle cosine value calculation unit 182r adds cos(θos+$\Delta\theta$ref) as the first cos signal cos θis input from the first cos magnetic sensor 15 to the second cos signal cos θos input from the second cos magnetic sensor 17 and squares the thus obtained added values. Then, by summing the calculated square values, TMc is calculated. Next, in accordance with the above expression (9), the relative angle cosine value calculation unit 182r subtracts 1 from a value obtained by dividing the calculated TMc by 2 to calculate the relative angle cosine value cos $\Delta\theta$. The calculated relative angle cosine value cos $\Delta\theta$ is output to the third relative angle calculation unit 183r. The above expression (9) is obtained by deforming the above expression (8) using the addition theorem and the like of the trigonometric function.

For example, when the steering wheel 21 is steered and the input shaft 22a is rotated forma state where the steering wheel 21 is at a neutral position, while the rotation angle θos of the output shaft 22b is fixed to "0°", the rotation angle θis of the input shaft 22a changes. In a state where θos is fixed to "0°" to lead "sin θos=0" and "cos θos=1" and the steering wheel 21 is at the neutral position, as illustrated in FIG. 5A, if $\Delta\theta$ is "0°", sin θis is "0", if $\Delta\theta$ is "90°", sin θis is "1", and if $\Delta\theta$ is "−90°", sin θis is "−1". On the other hand, when the steering wheel 21 is at the neutral position, as illustrated in FIG. 5B, if $\Delta\theta$ is "0°", cos θis is "1", and if $\Delta\theta$ is "90°" and "−90°", cos θis is "0".

In this case, when the steering wheel 21 is at the neutral position, as illustrated in FIG. 7A, sin $\Delta\theta$ calculated in accordance with the above expressions (6) and (7) takes values on a sine wave curve on which if $\Delta\theta$ is "0°", sin $\Delta\theta$ is "0", if $\Delta\theta$ is "90°", sin $\Delta\theta$ is "1", and if $\Delta\theta$ is "−90°", sin $\Delta\theta$ is "−1". Further, when the steering wheel 21 is at the neutral position, as illustrated in FIG. 7B, cos $\Delta\theta$ calculated n accordance with the above expressions (8) and (9) takes values on a cosine wave curve on which if $\Delta\theta$ is "0°", cos $\Delta\theta$ is "1", and if $\Delta\theta$ is "90°" and "−90°", cos $\Delta\theta$ is "0".

The third relative angle calculation unit 183r, in accordance with a below expression (10), calculates the third relative angle $\Delta\theta$ref.

$$\Delta\theta ref=\arctan(\sin\Delta\theta/\cos\Delta\theta) \quad (10)$$

Specifically, the third relative angle calculation unit 183r, in accordance with the above expression (10), uses the relative angle sine value sin $\Delta\theta$ input from the relative angle sine value calculation unit 181r and the relative angle cosine value cos $\Delta\theta$ input from the relative angle cosine value calculation unit 182r to divide the relative angle sine value sin $\Delta\theta$ by the relative angle cosine value cos $\Delta\theta$ and calculate the arctangent function of the thus obtained division value, and accordingly third relative angle $\Delta\theta$ref is calculated. The calculated third relative angle $\Delta\theta$ref is output to an abnormality determination unit 20 via a first adder-subtracter 190. In the abnormality determination unit 20, the first adder-subtracter 190 calculates a difference value between the second relative angle $\Delta\theta_2$ calculated by the second relative angle calculation unit 183A and the third relative angle $\Delta\theta$ref calculated by the third relative angle calculation unit 183r. When an absolute value of the difference value between the second relative angle $\Delta\theta_2$ and the third relative angle $\Delta\theta$ref is at or above a specified value set in advance, the abnormality determination unit 20 determines that an abnormality is present in the relative angle detection device.

(Operation)

Next, operations of the second embodiment are described.

Upon steering of the steering wheel 21 by a driver of the vehicle 3 and transmission of the steering force to the steering shaft 22, first the input shaft 22a rotates in a direction corresponding to the steering direction. In accordance with the rotation, the end portion (hereinafter referred to as "input end") of a side of the input shaft 22a of the torsion bar 22c rotates, and the first multipolar ring magnet 10 provided to the input end of the torsion bar 22c rotates. The magnetic flux in accordance with the rotational displacement by this rotation is detected at the first sin magnetic sensor 14 and the first cos magnetic sensor 15 as the first sin signal sin θis and the first cos signal cos θis. The detection signals are input to the second relative angle calculation unit 18A and the third relative angle calculation unit 18r.

On the other hand, the steering force transmitted through the input end is transmitted to the end portion (hereinafter referred to as "output end") of a side of the output shaft 22b through a twist (elastic deformation) of the torsion bar 22c, and accordingly the output end rotates. In other words, the input end (input shaft 22a) and the output end (output shaft 22b) are relatively displaced in the rotation direction. This rotates the second multipolar ring magnet 11 provided to the output end of the torsion bar 22c. The magnetic flux in accordance with the rotational displacement by the rotation is detected at the second sin magnetic sensor 16 and the second cos magnetic sensor 17 as the second sin signal sin θos and the second cos signal cos θos. The detection signals are also input to the second relative angle calculation unit 18A and the third relative angle calculation unit 18r.

The second relative angle calculation unit 18A divides the input first sin signal sin θis by the first cos signal cos θis and from the arctangent function of the division value, calculates the rotation angle θis of the first multipolar ring magnet 10, i.e., the input shaft 22a. Further, the second relative angle calculation unit 18A divides the second sin signal sin θos by the second cos signal cos θos, and from the arctangent function of the division value, calculates the rotation angle θos of the second multipolar ring magnet 11, i.e., the output shaft 22b. The second relative angle calculation unit 18A, from the difference value between the rotation angle θis of the input shaft 22a and the rotation angle θos of the output shaft 22b, calculates the relative angle between the input shaft 22a and the output shaft 22b as the second relative angle $\Delta\theta_2$. The second relative angle calculation unit 18A outputs the calculated second relative angle $\Delta\theta_2$ to the torque calculation unit 19 and the first adder-subtracter 190.

The torque calculation unit 19 calculates the steering torque Ts based on the second relative angle $\Delta\theta_2$ received from the second relative angle calculation unit 18A. For example, when the torsion bar 22c is a solid columnar member, the steering torque Ts applied to the torsion bar 22c is calculated from "$\Delta\theta=32\cdot Ts\cdot L/(\pi\cdot D^4\cdot G)$". Please note, L indicates the length of the torsion bar 22c, D indicates the diameter of the torsion bar 22c, and G indicates the modulus of transverse elasticity of the torsion bar 22c. The torque calculation unit 19 outputs the calculated steering torque Ts to the EPS control unit 34.

The EPS control unit 34, through the current command calculation circuit, calculates the current command value based on the steering torque Ts from the torque calculation unit 19, the vehicle speed V from the vehicle speed sensor 35, and the motor rotation angle θm from the electric motor 33. Further, the EPS control unit 34, through the motor drive circuit, generates the three-phase alternating current in accordance with the current command value calculated through the current command calculation circuit, supplies the generated three-phase alternating current to the electric motor 33, and causes electric motor 33 to generate the steering assist force.

On the other hand, the third relative angle calculation unit 18r, in accordance with the above expressions (6) to (9), calculates the relative angle sine value sin Δθ and the relative angle cosine value cos Δθ from the input first sin signal sin θis, first cos signal cos θis, second sin signal sin θos, and second cos signal cos θos. Further, the third relative angle calculation unit 18r, in accordance with the above expression (10), uses the calculated relative angle sine value sin Δθ and relative angle cosine value cos Δθ to divide the relative angle sine value sin Δθ by the relative angle cosine value cos Δθ to calculate the arctangent function of the division value, and accordingly the third relative angle Δθref is calculated. Further, the calculated third relative angle Δθref is output to the first adder-subtracter 190. When the absolute value of the difference value between the second relative angle $\Delta\theta_2$ and the third relative angle Δθref which difference value is calculated by the first adder-subtracter 190 is at or above the specified value, the abnormality determination unit 20 determines that an abnormality is present in a system.

In the second embodiment, the rotation angle θis of the first multipolar ring magnet 10 corresponds to the rotation angle $\theta_1$ in CLAIMS and Solution to Problem and the rotation angle θos of the second multipolar ring magnet 11 corresponds to the rotation angle $\theta_2$ in CLAIMS and Solution to Problem. Further, in the first embodiment, the second relative angle $\Delta\theta_2$ corresponds to the first relative angle $\Delta\theta_1$ in CLAIMS and Solution to Problem and the third relative angle Δθref corresponds to the second relative angle Δθ2 and the third relative angle Δθref in CLAIMS and Solution to Problem.

(Effects of Second Embodiment)

The second relative angle detection device 100A according to the second embodiment includes: the first multipolar ring magnet 10 having different magnetic poles alternately and equally distributed in the circumferential direction and configured to rotate synchronously with the input shaft 22a from between coaxially arranged input shaft 22a and output shaft 22b; the second multipolar ring magnet 11 having different magnetic poles alternately and equally distributed in the circumferential direction and configured to rotate synchronously with the output shaft 22b from between the input shaft 22a and the output shaft 22b; the first rotation angle sensor 12 configured to detect the magnetic flux in accordance with the rotation angle θis of the first multipolar ring magnet 10 and output the first sin signal sin θis and the first cos signal cos θis; the second rotation angle sensor 13 configured to detect the magnetic flux in accordance with the rotation angle θos of the second multipolar ring magnet 11 and output the second sin signal sin θos and the second cos signal cos θos; and the second relative angle calculation unit 18A configured to, based on the first sin signal sin θis and the first cos signal cos θis, calculate the rotation angle θis from θis=arctan(sin θis/cos θis), based on the second sin signal sin θos and the second cos signal cos θos, calculate the rotation angle θos from θos=arctan(sin θos/cos θos), and from the difference value between the rotation angle θis and the rotation angle θos, calculate the second relative angle $\Delta\theta_2$ as the relative angle between the input shaft 22a and the output shaft 22b.

With this configuration, it is possible to divide the first sin signal sin θis by the first cos signal cos θis to calculate the arctangent function of the division value to obtain the rotation angle θis, divide the second sin signal sin θos by the second cos signal cos θos to calculate the arctangent function of the division value to obtain the rotation angle θos, and from the difference value between the calculated rotation angle θis and rotation angle θos, calculate the second relative angle $\Delta\theta_2$ as the relative angle between the input shaft 22a and the output shaft 22b. This allows the calculation of the torque even at the helix angle region exceeding the linear portion of sin Δθ. As a result, it is possible to handle a wider torque detection range. Further, even at the same torque detection range, since the whole information on sin Δθ can be used, the resolution of the detected torque value can be enhanced. Further, since the second relative angle $\Delta\theta_2$ can be calculated at the small number of calculation, the more highly accurate torque value can be calculated.

In the first relative angle detection device 100 according to the first embodiment, the first multipolar ring magnet 10 and the second multipolar ring magnet 11 are configured by magnetizing the part of the circumference surface to the alternately different magnetic poles in the circumferential direction. The first rotation angle sensor 12 is provided such that magnetic flux detection units (of the first sin magnetic sensor 14 and the first cos magnetic sensor 15) face the pole faces formed to the circumference surface of the first multipolar ring magnet 10. Further, the second rotation angle sensor 13 is provided such that the magnetic flux detection units (of the second sin magnetic sensor 16 and the second cos magnetic sensor 17) face the pole face formed to the circumference surface of the second multipolar ring magnet 11. With this configuration, even if there is insufficient space relative to the ring magnet in the axial direction, the rotation angle sensor can be provided in a radially facing manner.

In the second relative angle detection device 100A according to the second embodiment, the first rotation angle sensor 12 includes the first sin magnetic sensor 14 configured to output the first sin signal sin θis and the first cos magnetic sensor 15 configured to output the first cos signal cos θis, both provided to the pitch of the magnetic pole of the first multipolar ring magnet 10 while having the phase difference of 90° of the electrical angle. Further, the second rotation angle sensor 13 includes the second sin magnetic sensor 16 configured to output the second sin signal sin θos and the second cos magnetic sensor 17 configured to output the second cos signal cos θos, both provided to the pitch of the magnetic pole of the second multipolar ring magnet 11 while having the phase difference of 90° of the electrical angle. With this configuration, the first sin magnetic sensor 14 and the first cos magnetic sensor 15 can easily output the first sin signal sin θis and the first cos signal cos θis in accordance with the rotation angle θis of the first multipolar ring magnet 10. Further, the second sin magnetic sensor 16 and the second cos magnetic sensor 17 can easily output the second sin signal sin θos and the second cos signal cos θos in accordance with the rotation angle θos of the second multipolar ring magnet 11.

In the second relative angle detection device 100A according to the second embodiment, the first rotation angle sensor 12 and the second rotation angle sensor 13 are provided such that when the relative angle Δθ is 0°, the output of the first rotation angle sensor 12 and the output of the second rotation angle sensor 13 make the same phase. With this configuration, the relative angle Δθ can be calculated easily and accurately using signals output from the first rotation angle sensor 12 and the second rotation angle sensor 13.

The second relative angle detection device 100A according to the second embodiment includes: the third relative angle calculation unit 18r that, based on the first sin signal sin θis, the first cos signal cos θis, the second sin signal sin θos, and the second cos signal cos θos, calculates sin Δθ and cos Δθ in accordance with the relative angle Δθ between the input shaft 22a and the output shaft 22b, and from Δθref=arctan(sin Δθ/cos Δθ), calculates the third relative angle Δθref as the relative angle between the input shaft 22a and the output shaft 22b; and the abnormality determination unit 20 configured to determine the abnormality based on the difference value between the second relative angle $\Delta\theta_2$ calculated by the second relative angle calculation unit 18A and the third relative angle Δθref calculated by the third relative angle calculation unit 18r. With this configuration, the abnormality determination unit can detect abnormality in the system when the difference value between the second relative angle $\Delta\theta_2$ and the third relative angle Δθref calculated by the method different from that of the second relative angle $\Delta\theta_2$ is at or above a specified value set in advance.

In the second relative angle detection device 100A according to the second embodiment, the third relative angle calculation unit 18r, based on the above expressions (6) and (7), calculates the relative angle sine value sin Δθ, and based on the above expressions (8) and (9), calculates the relative angle cosine value cos Δθ. With this configuration, the relative angle sine value sin Δθ and the relative angle cosine value cos Δθ can be calculated easily and accurately using the signals output from the first rotation angle sensor 12 and the second rotation angle sensor 13.

A second torque sensor 1A according to the second embodiment includes: the second relative angle detection device 100A according to the second embodiment configured to detect the second relative angle $\Delta\theta_2$ as the relative angle between the input shaft 22a and the output shaft 22b connected via the torsion bar 22c; and the torque calculation unit 19 configured to, from the second relative angle $\Delta\theta_2$, calculate the steering torque Ts generated to the input shaft 22a and the output shaft 22b. With this configuration, functions and effects equivalent to those of the second relative angle detection device 100A can be obtained.

The electric power steering device 2 according to the second embodiment includes the second torque sensor 1A of the second embodiment. With this configuration, the electric motor 33 is driven and controlled by the highly accurate steering torque Ts corresponding to the wide torque detection range to enable generation of the appropriate steering assist torque. As a result, the favorable steering assist such as steering feeling can be performed.

The vehicle 3 according to the second embodiment includes the electric power steering device 2 of the second embodiment. With this configuration, functions and effects equivalent to those of the electric power steering device 2 can be obtained.

Third Embodiment (Configuration)

The third embodiment of the present invention has the same configuration as that of the first embodiment except that, instead of the first sensor unit 101 of the first embodiment, the configuration of the third embodiment includes the second sensor unit 401 whose configuration is partially different from the first sensor unit 101.

Hereinafter, components of the third embodiment similar to those of the first embodiment are denoted with the same reference numerals to appropriately omit the descriptions, and different components are described in details.

Figure 12:
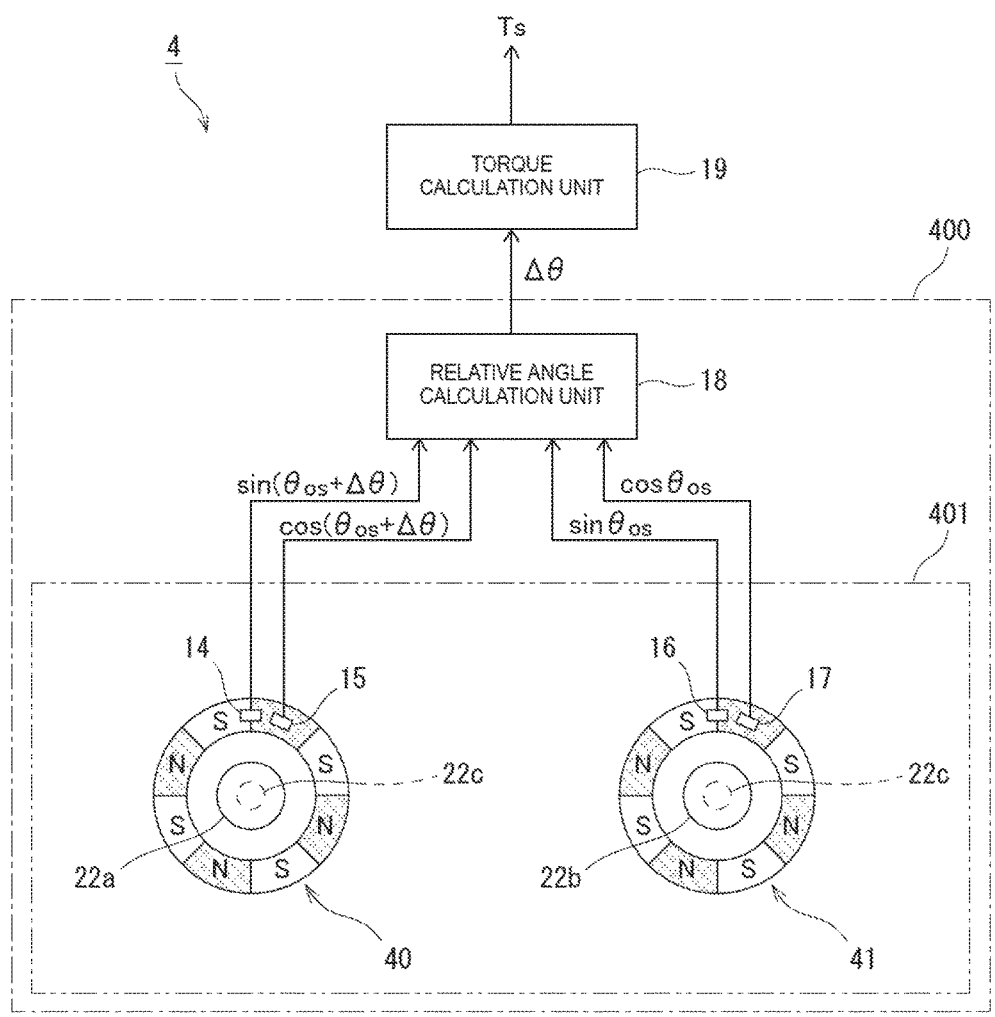
FIG. 12 is a drawing illustrating a configuration example of a third torque sensor according to the third embodiment of the present invention.

As illustrated in FIG. 12, a third torque sensor 4 of the third embodiment includes the torque calculation unit 19 and a third relative angle detection device 400, and the third relative angle detection device 400 includes the second sensor unit 401 and the relative angle calculation unit 18.

Figure 11:
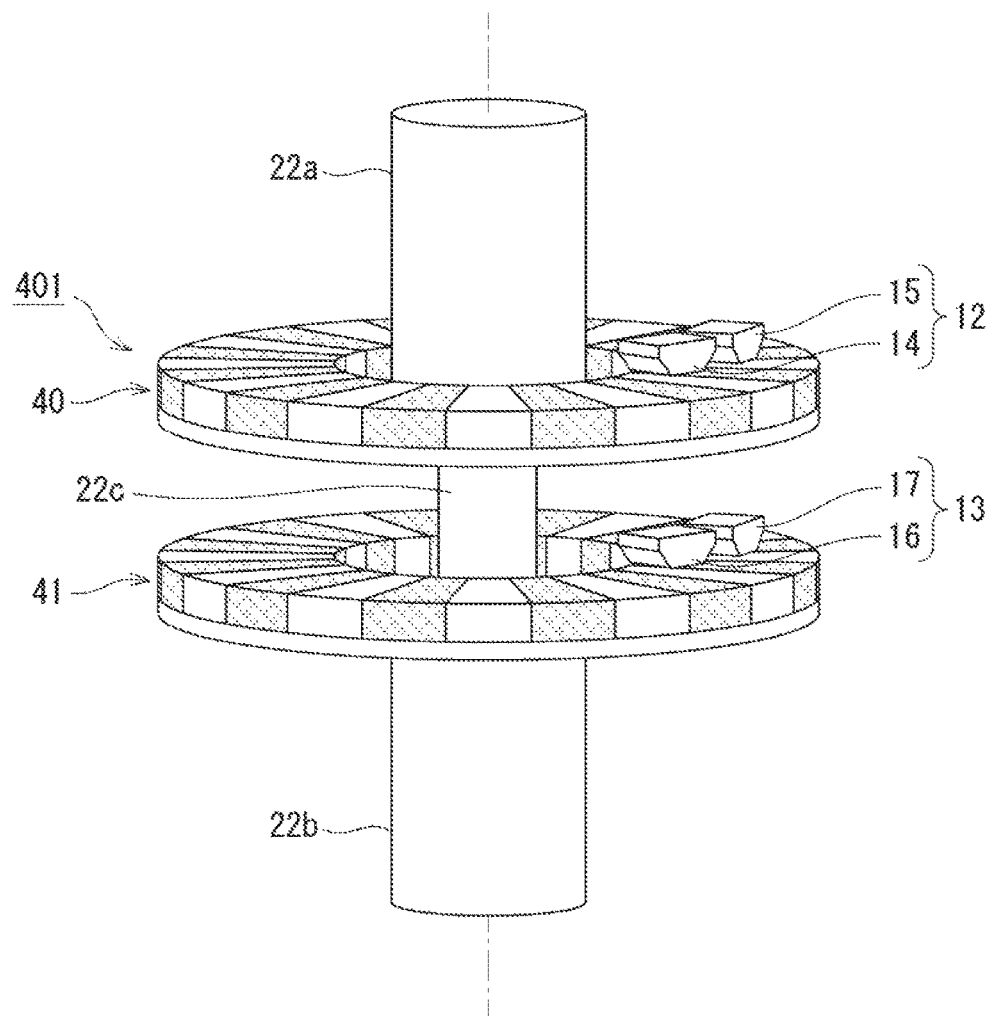
FIG. 11 is a drawing illustrating a configuration example of a second sensor unit of a third relative angle detection device according to a third embodiment of the present invention.

As illustrated in FIG. 11, the second sensor unit 401 includes a third multipolar ring magnet 40 and a fourth multipolar ring magnet 41 instead of the first multipolar ring magnet 10 and the second multipolar ring magnet 11 of the first embodiment.

The third multipolar ring magnet 40 and the fourth multipolar ring magnet 41 are different from the first multipolar ring magnet 10 and the second multipolar ring magnet 11 of the first embodiment in that the axial end face of the ring magnet is magnetized to the alternately different magnetic poles in the circumferential direction.

The attachment positions of the third multipolar ring magnet 40 and the fourth multipolar ring magnet 41 are the same as those of the first multipolar ring magnet 10 and the second multipolar ring magnet 11 of the first embodiment. Further, the third multipolar ring magnet 40 and the fourth multipolar ring magnet 41 are formed from multipolar ring magnets having the same configuration.

As illustrated in FIG. 11, the third multipolar ring magnet 40 and the fourth multipolar ring magnet 41 are alternately and equally distributed, in the circumferential direction, with different types of magnetic poles, i.e., hatched N pole and unhatched S pole in the drawing.

Further, magnetic pole pairs are formed from a pair magnetic poles, i.e., the S pole and the N pole that are adjacent with each other in the circumferential direction of the third multipolar ring magnet 40 and the fourth multipolar ring magnet 41. Further, the third multipolar ring magnet 40 and the fourth multipolar ring magnet 41 can be made from, based on the necessary magnetic flux density, for example, the neodymium magnet, the ferrite magnet, the samarium-cobalt magnet and the like.

As similar to the first sensor unit 101 of the first embodiment, although the second sensor unit 401 according to the third embodiment includes the first rotation angle sensor 12 and the second rotation angle sensor 13, the arrangement positions of the sensors are different from those in the first embodiment.

Specifically, as illustrated in FIG. 11, the first sin magnetic sensor 14 and the first cos magnetic sensor 15 of the first rotation angle sensor 12 are provided to face the pole face of the third multipolar ring magnet 40 and axially face the third multipolar ring magnet 40. Further, the second sin magnetic sensor 16 and the second cos magnetic sensor 17 of the second rotation angle sensor 13 are provided to face the pole face of the fourth multipolar ring magnet 41 and axially face the fourth multipolar ring magnet 41.

As illustrated in FIG. 11, the first sin magnetic sensor 14 and the first cos magnetic sensor 15 of the third embodiment are provided to the pitch of the magnetic pole while shifting the phase by 90° of the electric angle (having phase difference of 90°). Further, as illustrated in FIG. 11, the second sin magnetic sensor 16 and the second cos magnetic sensor 17 of the second embodiment are provided to the pitch of the magnetic pole while shifting the phase by 90° of the electric angle (having phase difference of 90°).

The first rotation angle sensor 12 and the second rotation angle sensor 13 of the third embodiment are provided to the fixing part that does not synchronously rotate with the input shaft 22a and the output shaft 22b.

In the third embodiment, the rotation angle θis of the third multipolar ring magnet 40 corresponds to the rotation angle $\theta_1$ in CLAIMS and Solution to Problem, and the rotation angle θos of the fourth multipolar ring magnet 41 corresponds to the rotation angle $\theta_2$ in CLAIMS and Solution to Problem.

(Effects of Third Embodiment)

The third embodiment yields the following effects in addition to the effects of the first embodiment.

The third relative angle detection device 400 according to the third embodiment includes the third multipolar ring magnet 40 and the fourth multipolar ring magnet 41 in which a part of an end face in an axial direction is magnetized to the alternately different magnetic poles in the circumferential direction. The first rotation angle sensor 12 is provided such that detection units (first sin magnetic sensor 14 and first cos magnetic sensor 15) of the magnetic flux of the first rotation angle sensor 12 face the pole face formed to an end face of the third multipolar ring magnet 40 in the axial direction. Further, the second rotation angle sensor 13 is provided such that detection units (second sin magnetic sensor 16 and second cos magnetic sensor 17) of the magnetic flux of the second rotation angle sensor 13 face the pole face formed to an end face of the fourth multipolar ring magnet 41 in the axial direction.

With this configuration, even if there is insufficient space relative to, for example, the ring magnet in a radial direction, the rotation angle sensor can be provided in an axially facing manner.

Fourth Embodiment (Configuration)

While the third relative angle detection device 400 of the third embodiment includes the relative angle calculation unit 18, a relative angle detection device of the fourth embodiment includes the sensor calculation unit 180, and the fourth embodiment has the same configuration as that of the third embodiment except that the torque calculation unit 19, based on the second relative angle $\Delta\theta_2$ output from the sensor calculation unit 180, calculates the steering torque Ts.

Hereinafter, components which are same as those of the third embodiment are denoted with the same reference numerals to appropriately omit the description, and different components are described in details.

Figure 13:
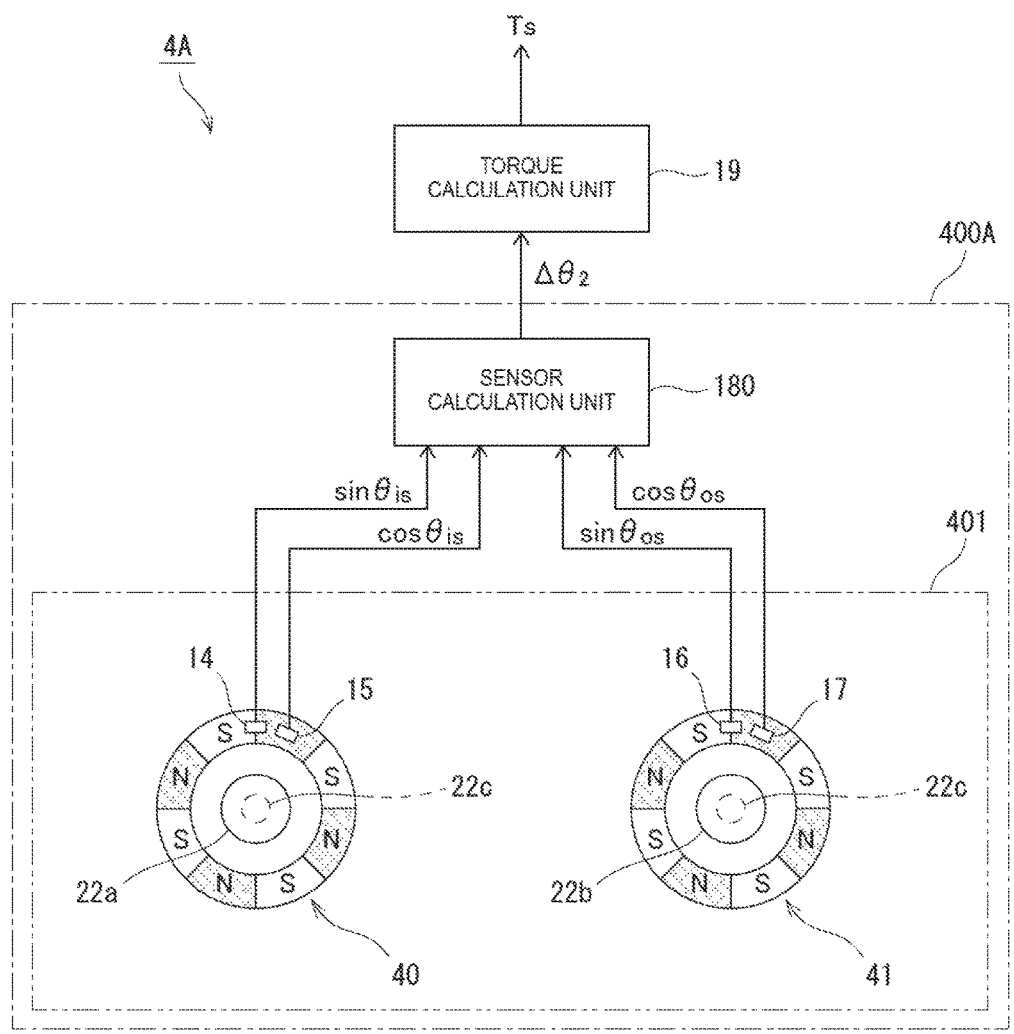
FIG. 13 is a drawing illustrating a configuration example of a fourth torque sensor according to a fourth embodiment of the present invention.

As illustrated in FIG. 13, the fourth torque sensor 4A of the fourth embodiment includes a fourth relative angle detection device 400A, and the fourth relative angle detection device 400A includes the second sensor unit 401 and the sensor calculation unit 180.

In other words, the fourth torque sensor 4A has the same configuration as that of the second torque sensor 1A of the second embodiment except that the arrangement positions of the first rotation angle sensor 12 and the second rotation angle sensor 13 are different. Specifically, the first sin magnetic sensor 14 and the first cos magnetic sensor 15 of the first rotation angle sensor 12 are provided to the third multipolar ring magnet 40 in an axially facing manner. Further, the second sin magnetic sensor 16 and the second cos magnetic sensor 17 of the second rotation angle sensor 13 are provided to the fourth multipolar ring magnet 41 in an axially facing manner.

In the fourth embodiment, the third multipolar ring magnet 40, i.e., the rotation angle θis of the input shaft 22a corresponds to the rotation angle $\theta_1$ in CLAIMS and Solution to Problem and the fourth multipolar ring magnet 41, i.e., the rotation angle θos of the output shaft 22b corresponds to the rotation angle $\theta_2$ in CLAIMS and Solution to Problem. Further, in the fourth embodiment, the second relative angle $\Delta\theta_2$ corresponds to the first relative angle $\Delta\theta1$ in CLAIMS and Solution to Problem and the third relative angle $\Delta\theta$ref corresponds to the second relative angle $\Delta\theta2$ and the third relative angle $\Delta\theta$ref in CLAIMS and Solution to Problem.

(Effects of Fourth Embodiment)

The fourth embodiment yields the following effects in addition to the effects of the second embodiment.

The fourth relative angle detection device 400A according to the fourth embodiment includes the third multipolar ring magnet 40 and the fourth multipolar ring magnet 41 in which a part of an end face in an axial direction is magnetized to the alternately different magnetic poles in the circumferential direction. The first rotation angle sensor 12 is provided such that the magnetic flux detection units (of the first sin magnetic sensor 14 and the first cos magnetic sensor 15) face the pole face formed to an end face of the third multipolar ring magnet 40 in the axial direction. Further, the second rotation angle sensor 13 is provided such that the magnetic flux detection units (of the second sin magnetic sensor 16 and the second cos magnetic sensor 17) face the pole face formed to an end face of the fourth multipolar ring magnet 41 in the axial direction.

With this configuration, even if there is insufficient space relative to, for example, the ring magnet in the radial direction, the rotation angle sensor can be arranged in an axially facing manner.

Fifth Embodiment (Configuration)

The fifth embodiment of the present invention has the same configuration as that of the first embodiment except for inclusion of a third sensor unit 501 that uses a resolver for detecting the relative angle, instead of inclusion of the first sensor unit 101 of the first embodiment.

Hereinafter, components similar to those of the first embodiment are denoted with the same reference numerals to appropriately omit the description, and different components are described in details.

Figure 16:
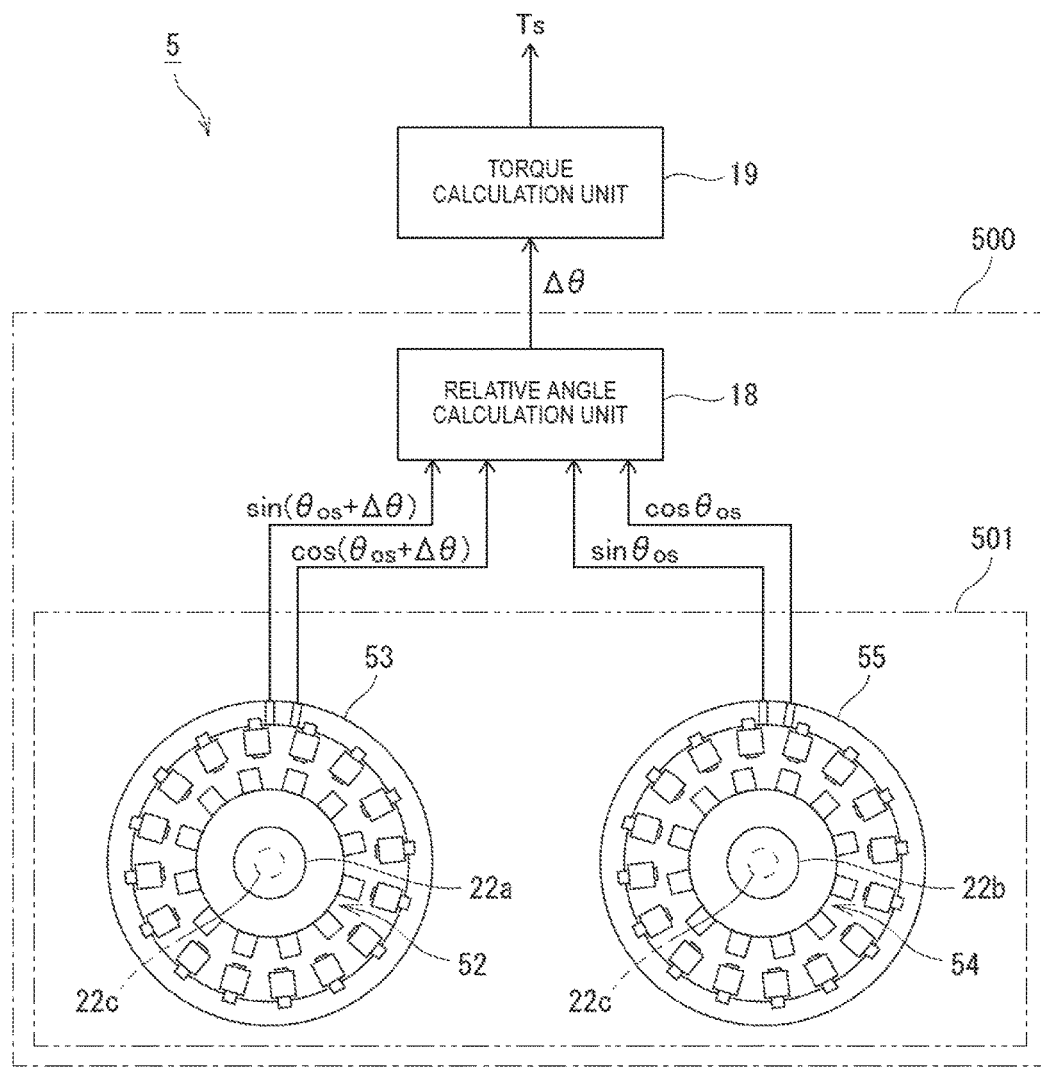
FIG. 16 is a drawing illustrating a configuration example of a fifth torque sensor according to the fifth embodiment of the present invention.

As illustrated in FIG. 16, a fifth torque sensor 5 according to the fifth embodiment includes the torque calculation unit 19 and a fifth relative angle detection device 500, and the fifth relative angle detection device 500 includes the third sensor unit 501 and the relative angle calculation unit 18.

Figure 14:
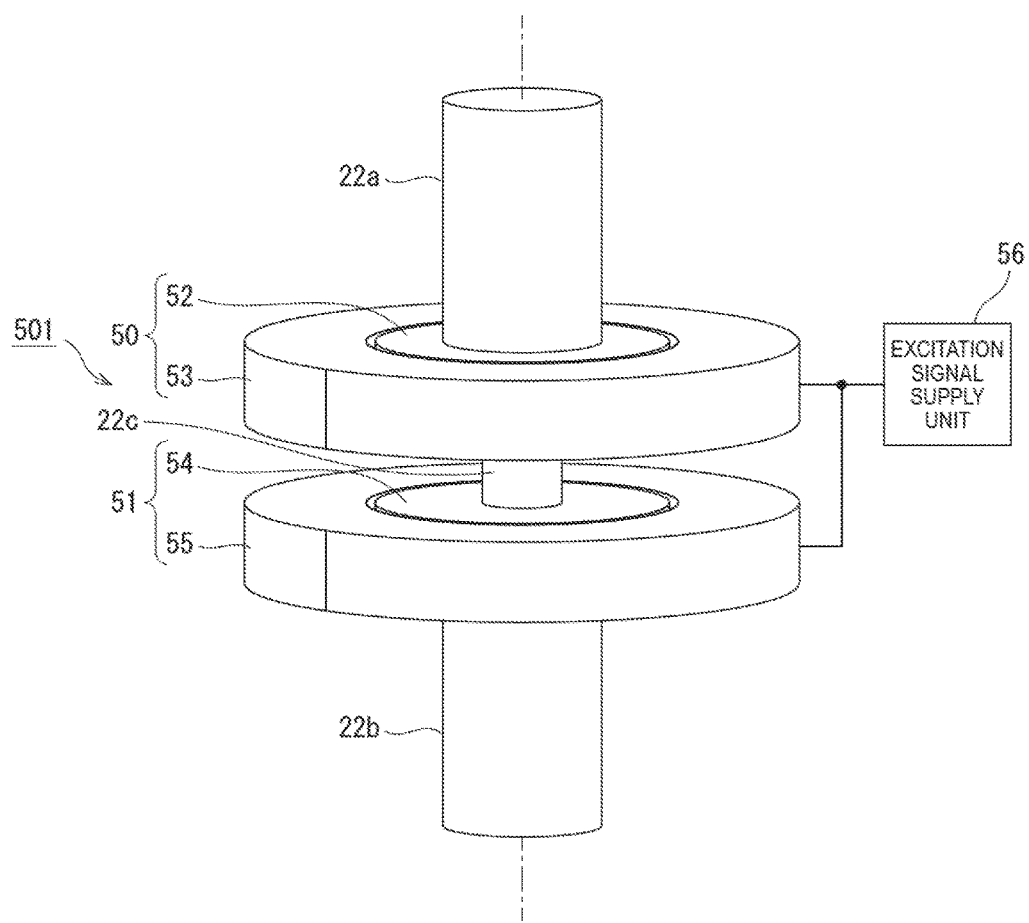
FIG. 14 is a drawing illustrating a configuration example of a third sensor unit of a fifth relative angle detection device according to a fifth embodiment of the present invention.
Figure 15A:
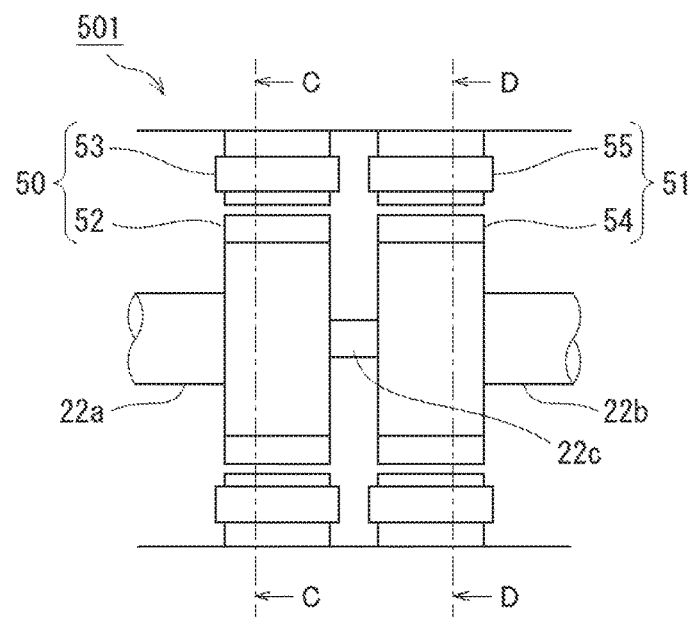
FIG. 15A is a schematic diagram of the third sensor unit of the fifth relative angle detection device according to the fifth embodiment of the present invention as viewed from the front.

As illustrated in FIG. 14 and FIG. 15A, the third sensor unit 501 includes a first resolver 50, a second resolver 51, and an excitation signal supply unit 56.

Figure 15B:
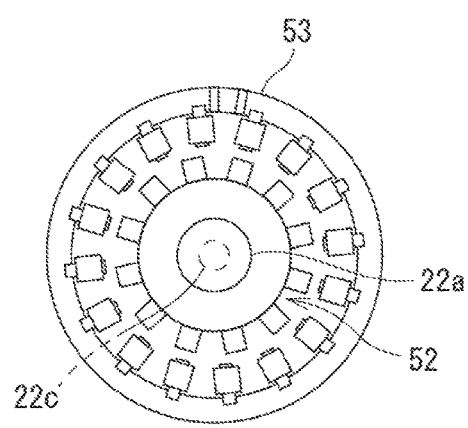
FIG. 15B is a cross-sectional view of FIG. 15A taken along a line C-C.

In the example represented by FIG. 15B, the first resolver 50 includes: a first rotor 52 having 12 teeth equally distributed in an outer circumference; and a first stator 53 that is provided to the fixing part not synchronously rotating with the input shaft 22a and the output shaft 22b and includes 16 armature windings (magnetic pole) obtained by winding coils to each of 16 poles equally distributed to the inner circumference.

Figure 15C:
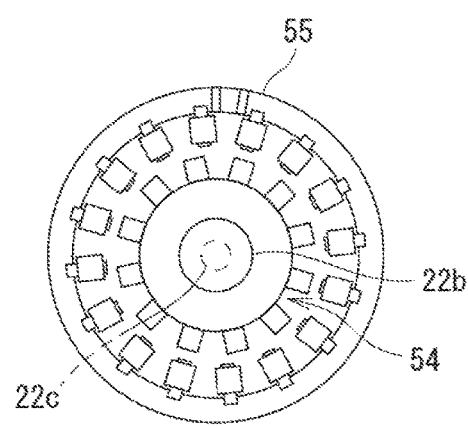
FIG. 15C is a cross-sectional view of FIG. 15A taken along a line D-D.

In the example represented by FIG. 15C, the second resolver 51 includes a second rotor 54 having 12 teeth equally distributed in the outer circumference; and a second stator 55 that is provided to the fixing part not synchronously rotating with the input shaft 22a and the output shaft 22b and includes 16 armature windings (magnetic pole) obtained by winding coils to each of 16 poles equally distributed to the inner circumference in the circumferential direction in an equally distributed manner.

In the first resolver 50 and the second resolver 51, the number of teeth is not limited to 12, but may be 11 or less or 13 or above. Further, the number of armature windings is not limited to 16, and may be 15 or less or 17 or above.

The first rotor 52 is provided to the input shaft 22a so as to be synchronously rotatable with the input shaft 22a and the second rotor 54 is provided to the output shaft 22b so as to be synchronously rotatable with the output shaft 22b.

The first rotor 52 and the first stator 53 are arranged such that the first stator 53 is concentrically provided at the outside of the first rotor 52 and each tooth of the first rotor 52 and each armature winding of the first stator 53 face with each other in a radial direction with a predetermined air gap therebetween.

The second rotor 54 and the second stator 55 are arranged such that the second stator 55 is concentrically provided at the outside of the second rotor 54 and each tooth of the second rotor 54 and each armature winding of the second stator 55 face with each other in the radial direction with a predetermined air gap therebetween.

In the fifth embodiment, the first rotor 52 is attached to the end of a side of the output shaft 22b of the input shaft 22a (ideally, connecting position of torsion bar 22c) so as to be synchronously rotatable with the input shaft 22a. Further, the second rotor 54 is attached to the end of a side of the input shaft 22a of the output shaft 22b (ideally, connecting position of torsion bar 22c) so as to be synchronously rotatable with the output shaft 22b.

The excitation signal supply unit 56 supplies, to a coil of each armature winding of the first stator 53 and the second stator 55, a sinusoidal excitation signal.

In the fifth embodiment, the first resolver 50 and the second resolver 51 are 4-phase resolvers. In other words, each pole of the first stator 53 and the second stator 55 is provided such that ¼ pitch is shifted from pitches obtained by multiplying pitches between the teeth of the first rotor 52 and the second rotor 54 by the integer.

Accordingly, when outputs of coils of 16 armature windings of the first stator 53 and the second stator 55 are divided by four in the circumferential direction by 90°, the outputs of the coils of the four divided armature windings within 90° in the circumferential direction become sine wave signals (or cosine wave signals) which are out of the phase by 90° between the adjacent armature windings. In the third embodiment, among coils of each armature winding, the coils that output the same signals are connected in series.

In other words, when the rotation angle of the first rotor 52 is $\theta is$, the first sin signal representing $\sin \theta is$ and the first cos signal representing $\cos \theta is$ can be obtained from the outputs of the coils of the first stator 53.

Further, when the rotation angle of the second rotor 54 is $\theta os$, the second sin signal representing $\sin \theta os$ and the second cos signal representing $\cos \theta os$ can be obtained from the outputs of the coils of the second stator 55.

As similar to the above first embodiment, followings are represented: "$\sin \theta is = \sin(\theta os + \Delta\theta)$" and "$\cos \theta is = \cos(\theta os + \Delta\theta)$". In other words, it is assumed that from the coil of the first stator 53, the first sin signal representing $\sin(\theta os + \Delta\theta)$ and the first cos signal representing $\cos(\theta os + \Delta\theta)$ can be obtained.

The first sin signal and the first cos signal, and the second sin signal and the second cos signal which are output from each coil are, as illustrated in FIG. 16, input to the relative angle calculation unit 18 via an unillustrated resolver cable.

As similar to the first embodiment, the relative angle calculation unit 18 according to the fifth embodiment, in accordance with the above expressions (1) to (4), calculates $\sin \Delta\theta$ and $\cos \Delta\theta$ based on $\sin(\theta os + \Delta\theta)$, $\cos(\theta os + \Delta\theta)$, $\sin \theta os$, and $\cos \theta os$ which are input from the first stator 53 and the second stator 55 via the resolver cable. Then, the relative angle calculation unit, in accordance with the above expression (5), calculates the relative angle $\Delta\theta$ based on the calculated $\sin \Delta\theta$ and $\cos \Delta\theta$. The calculated relative angle $\Delta\theta$ is output to the torque calculation unit 19.

In the fifth embodiment, the rotation angle $\theta is$ of the first rotor 52 corresponds to the rotation angle $\theta_1$ in CLAIMS and Solution to Problem and the rotation angle $\theta os$ of the second rotor 54 corresponds to the rotation angle $\theta_2$ in CLAIMS and Solution to Problem.

(Effects of Fifth Embodiment)

The fifth embodiment yields following effects in addition to the effects of the first embodiment.

The fifth relative angle detection device 500 according to the fifth embodiment includes: the first rotor 52 having a plurality of teeth equally distributed in the outer circumference and configured to synchronously rotate with the input shaft 22a from between the coaxially arranged input shaft 22a and output shaft 22b; and the second rotor 54 having a plurality of teeth equally distributed in the outer circumference and configured to synchronously rotate with the output shaft 22b from between the input shaft 22a and the output shaft 22b. Further, the fifth relative angle detection device includes the first stator 53 concentrically arranged with the first rotor 52 at the outside of the first rotor 52, having a plurality of poles equally distributed in the inner circumference, and including armature windings obtained by winding coils around each pole; and the second stator 55 concentrically arranged with the second rotor 54 at the outside of the second rotor 54, having a plurality of poles equally distributed in the inner circumference, and including armature windings obtained by winding coils around poles. Further, the fifth relative angle detection device includes: the excitation signal supply unit 56 configured to supply, to the coils of the first stator 53 and the second stator 55, the excitation signal; and the relative angle calculation configured to calculate sin $\Delta\theta$ and cos $\Delta\theta$ corresponding to the relative angle $\Delta\theta$ between the input shaft 22a and the output shaft 22b based on the first sin signal representing sin $\theta$is and the first cos signal representing cos $\theta$is in accordance with the rotation angle $\theta$is of the first rotor 52 output from the coil of the first stator 53 which is supplied with the excitation signal and the second sin signal representing sin $\theta$os and the second cos signal representing cos $\theta$os in accordance with the rotation angle $\theta$os of the second rotor 54 output from the coil of the second stator 55 which is supplied with the excitation signal, and calculates the relative angle $\Delta\theta$ from $\Delta\theta = \arctan(\sin \Delta\theta / \cos \Delta\theta)$.

With this configuration, it is possible to calculate both sin $\Delta\theta$ and cos $\Delta\theta$, divide the calculated sin $\Delta\theta$ by cos $\Delta\theta$, and calculate the arctangent of the division value to calculate the relative angle $\Delta\theta$. This allows the calculation of the torque even at the helix angle region exceeding the linear portion of sin $\Delta\theta$. As a result, it is possible to handle the wider torque detection range. Even at the same torque detection range, since the whole information on sin $\Delta\theta$ can be used, the resolution of the detected torque value can be enhanced. Further, the relative angle $\Delta\theta$ can be calculated by the one time calculation, i.e., the calculation of arctan(sin $\Delta\theta$/cos $\Delta\theta$), and thus, the more highly accurate torque value can be calculated.

In the fifth relative angle detection device 500 according to the fifth embodiment, the first stator 53 and the second stator 55 are provided such that when the relative angle $\Delta\theta$ is 0°, the output of the coil of the first stator 53 and the output of the coil of the second stator 55 make the same phase.

With this configuration, in accordance with the above expressions (1) to (4), sin $\Delta\theta$ and cos $\Delta\theta$ can be calculated easily using signals output from coils (detection coils) of the first stator 53 and the second stator 55.

Sixth Embodiment (Configuration)

While the fifth relative angle detection device 500 according to the fifth embodiment includes the relative angle calculation unit 18, a relative angle detection device according to the sixth embodiment includes the sensor calculation unit 180, and the sixth embodiment has the same configuration as that of the fifth embodiment except that the torque calculation unit 19, based on the second relative angle $\Delta\theta_2$ output from the sensor calculation unit 180, calculates the steering torque Ts.

Hereinafter, components similar to those of the fifth embodiment are denoted with the same reference numerals to appropriately omit the descriptions, and different components are described in details.

Figure 17:
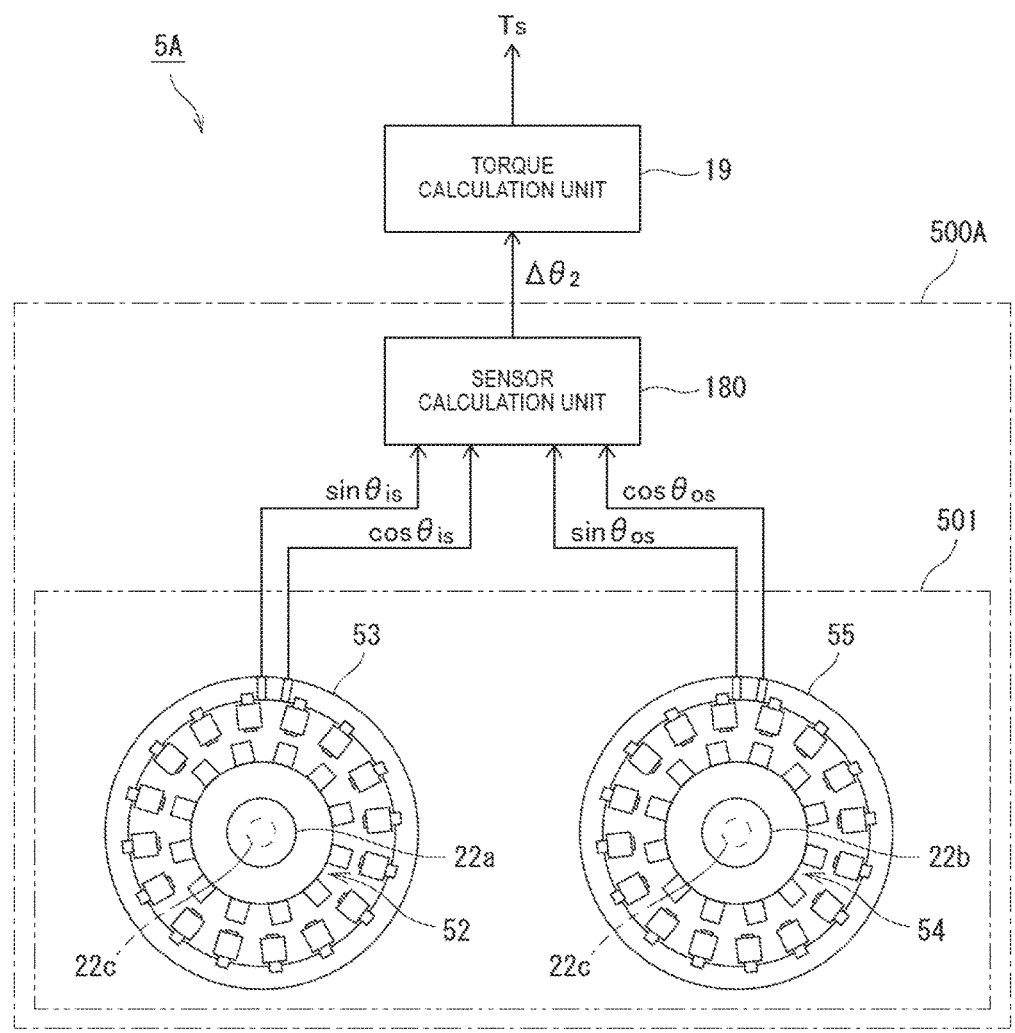
FIG. 17 is a drawing illustrating a configuration example of a sixth torque sensor according to a sixth embodiment of the present invention.

As illustrated in FIG. 17, a sixth torque sensor 5A according to the sixth embodiment includes the torque calculation unit 19 and a sixth relative angle detection device 500A, and the sixth relative angle detection device 500A includes the third sensor unit 501 and the sensor calculation unit 180.

In other words, the sixth torque sensor 5A has the same configuration as that of the second torque sensor LA of the second embodiment except that the sixth torque sensor 5A has the third sensor unit 501 instead of the first sensor unit 101.

In the sixth embodiment, the first sin signal sin $\theta$is and the first cos signal cos $\theta$is, and the second sin signal sin $\theta$os and the second cos signal cos $\theta$os which are output from each coil of the third sensor unit 501 are, via the resolver cable, input to the second relative angle calculation unit 18A and the third relative angle calculation unit 18r in the sensor calculation unit 180.

As similar to the second embodiment, the second relative angle calculation unit 18A according to the sixth embodiment calculates the rotation angle $\theta$is of the input shaft 22a and the rotation angle $\theta$os of the output shaft 22b based on the first sin signal sin $\theta$is and the first cos signal cos $\theta$is, and the second sin signal sin $\theta$os and the second cos signal cos $\theta$os which are input from the first stator 53 and the second stator 55 via the resolver cable. The second relative angle calculation unit, based on the difference value between the calculated rotation angle $\theta$is of the input shaft 22a and the rotation angle $\theta$os of the output shaft 22b, calculates the second relative angle $\Delta\theta_2$ as the relative angle between the input shaft 22a and the output shaft 22b. Then, the calculated second relative angle $\Delta\theta_2$ is output to the torque calculation unit 19 and the first adder-subtracter 190.

On the other hand, the third relative angle calculation unit 18r according to the sixth embodiment, based on the input first sin signal sin $\theta$is and the first cos signal cos $\theta$is, and the second sin signal sin $\theta$os and the second cos signal cos $\theta$os, calculates the relative angle sine value sin $\Delta\theta$ and the relative angle cosine value cos $\Delta\theta$ in accordance with the above expressions (6) to (9). Further, the third relative angle calculation unit, based on the calculated relative angle sine value sin $\Delta\theta$ and the relative angle cosine value cos $\Delta\theta$, calculates the third relative angle $\Delta\theta$ref as the relative angle between the input shaft 22a and the output shaft 22b in accordance with the above expression (10).

As similar to the second embodiment, the abnormality determination unit 20 determines the abnormality based on the difference value between the third relative angle $\Delta\theta$ref calculated by the third relative angle calculation unit 18r and the second relative angle $\Delta\theta_2$ calculated by the second relative angle calculation unit 18A.

In the sixth embodiment, the first rotor 52, i.e., the rotation angle $\theta$is of the input shaft 22a corresponds to the rotation angle $\theta_1$ in CLAIMS, and the second rotor 54, i.e., the rotation angle $\theta$os of the output shaft 22b corresponds to the rotation angle $\theta_2$ in CLAIMS. Further, in the sixth embodiment, the second relative angle $\Delta\theta_2$ corresponds to the first relative angle $\Delta\theta1$ in CLAIMS and the third relative angle $\Delta\theta$ref corresponds to the second relative angle $\Delta\theta2$ and the third relative angle $\Delta\theta$ref in CLAIMS.

(Effects of Sixth Embodiment)

The sixth embodiment yields following effects in addition to the effects of the second embodiment.

The sixth relative angle detection device 500A according to the sixth embodiment includes: the first rotor 52 having a plurality of teeth at regular intervals in the outer circumference and configured to synchronously rotate with the input shaft 22a from between the coaxially arranged input shaft 22a and output shaft 22b; and the second rotor 54 having different magnetic poles alternately and equally distributed in the circumferential direction and configured to synchronously rotate with the output shaft 22b from between the input shaft 22a and the output shaft 22b. Further, the sixth relative angle detection device includes: the first stator 53 concentrically arranged with the first rotor 52 at the outside of the first rotor 52, having a plurality of poles equally distributed in the inner circumference, and including the armature winding obtained by winding the coil around each pole; and the second stator 55 concentrically arranged with the second rotor 54 at the outside of the second rotor 54, having a plurality of poles equally distributed in the inner circumference and having the armature winding obtained by winding the coil around each pole. Further, the sixth relative angle detection device includes: the excitation signal supply unit 56 configured to supply, to the coils of the first stator 53 and the second stator 55, the excitation signal; and the second relative angle calculation unit 18A that, based on the first sin signal representing sin θis and the first cos signal representing cos θis output from the coil of the first stator 53 which is supplied with the excitation signal and is in accordance with the rotation angle θis of the first rotor 52, calculates the rotation angle θis from θis=arctan(sin θis/cos θis), based on the second sin signal representing sin θos and the second cos signal representing cos θos in accordance with the rotation angle θos of the second rotor 54 output from the coils of the second stator 55 which is supplied with the excitation signal, calculates the rotation angle θos from θos=arctan(sin θos/cos θos), and based on the difference value between the rotation angle θis and the rotation angle θos, calculates the second relative angle $\Delta\theta_2$ as the relative angle between the input shaft 22a and the output shaft 22b.

With this configuration, it is possible to divide the first sin signal sin θis by the first cos signal cos θis, and calculate the arctangent function of the division value to calculate the rotation angle θis; divide the second sin signal sin θos by the second cos signal cos θos and calculate the arctangent function of the division value to calculate the rotation angle θos; and based on the difference value between the calculated rotation angle θis and the rotation angle θos, calculate the second relative angle $\Delta\theta_2$ as the relative angle between the input shaft 22a and the output shaft 22b. This allows the calculation of the torque even at the helix angle region exceeding the linear portion of sin $\Delta\theta$. As a result, it is possible to handle the wider torque detection range. Further, even at the same torque detection range, the whole information on sin $\Delta\theta$ can be used, and thus, the resolution of the detected torque value can be enhanced. The second relative angle $\Delta\theta_2$ can be calculated by the small number of calculations, and thus, the more highly accurate torque value can be calculated.

In the sixth relative angle detection device 500A according to the sixth embodiment, the first stator 53 and the second stator 55 are provided such that when the relative angle $\Delta\theta$ is 0°, the output of the coil of the first stator 53 and the output of the coil of the second stator 55 make the same phase. With this configuration, using the signals output from coils (detection coils) of the first stator 53 and the second stator 55, the relative angle $\Delta\theta$ can be calculated easily and accurately.

Further, the sixth relative angle detection device 500A according to the sixth embodiment includes: the third relative angle calculation unit 18r that, based on the first sin signal sin θis, the first cos signal cos θis, the second sin signal sin θos and the second cos signal cos θos, calculates sin $\Delta\theta$ and cos $\Delta\theta$ in accordance with the relative angle $\Delta\theta$ between the input shaft 22a and the output shaft 22b, and based on $\Delta\theta$ref=arctan(sin $\Delta\theta$/cos $\Delta\theta$), calculates the third relative angle $\Delta\theta$ref as the relative angle between the input shaft 22a and the output shaft 22b; and the abnormality determination unit 20 that determines the abnormality based on the difference value between the second relative angle $\Delta\theta_2$ calculated by the second relative angle calculation unit 18A and the third relative angle $\Delta\theta$ref calculated by the third relative angle calculation unit 18r. With this configuration, the abnormality determination unit can detect the abnormality in the system when the difference value between the second relative angle $\Delta\theta_2$ and the third relative angle $\Delta\theta$ref calculated by a method different from that of the second relative angle $\Delta\theta_2$ is at or above the specified value set in advance.

Seventh Embodiment (Configuration)

The seventh embodiment of the present invention has the same configuration as that of the first embodiment except for the inclusion of a fourth sensor unit 601 that uses an optical encoder for detecting the rotation angle instead of the first sensor unit 101 of the first embodiment.

Hereinafter, components similar to those of the first embodiment are denoted with the same reference numerals to appropriately omit the description, and different components are described in details.

Figure 19:
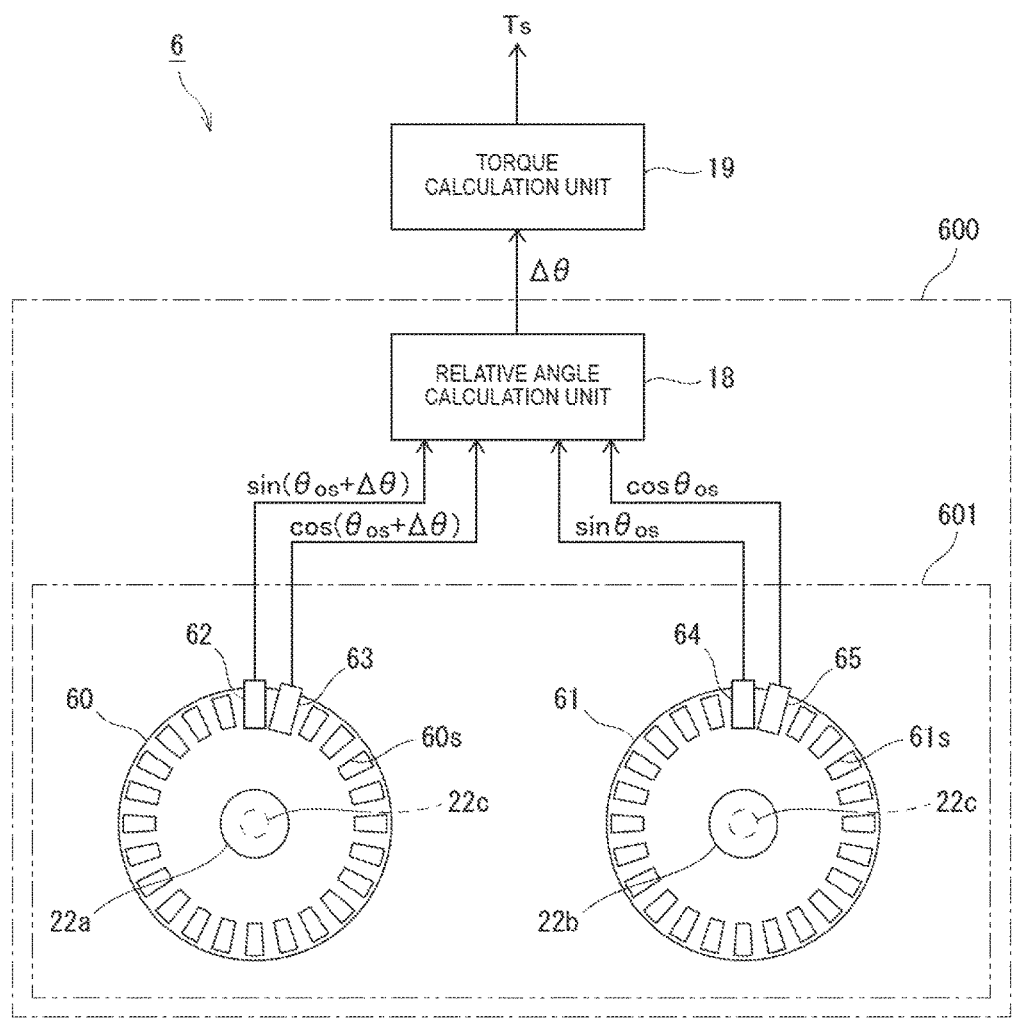
FIG. 19 is a drawing illustrating a configuration example of a seventh torque sensor according to the seventh embodiment of the present invention.

As illustrated in FIG. 19, a seventh torque sensor 6 according to the seventh embodiment includes the torque calculation unit 19 and a seventh relative angle detection device 600, and the seventh relative angle detection device 600 includes the fourth sensor unit 601 and the relative angle calculation unit 18.

Figure 18A:
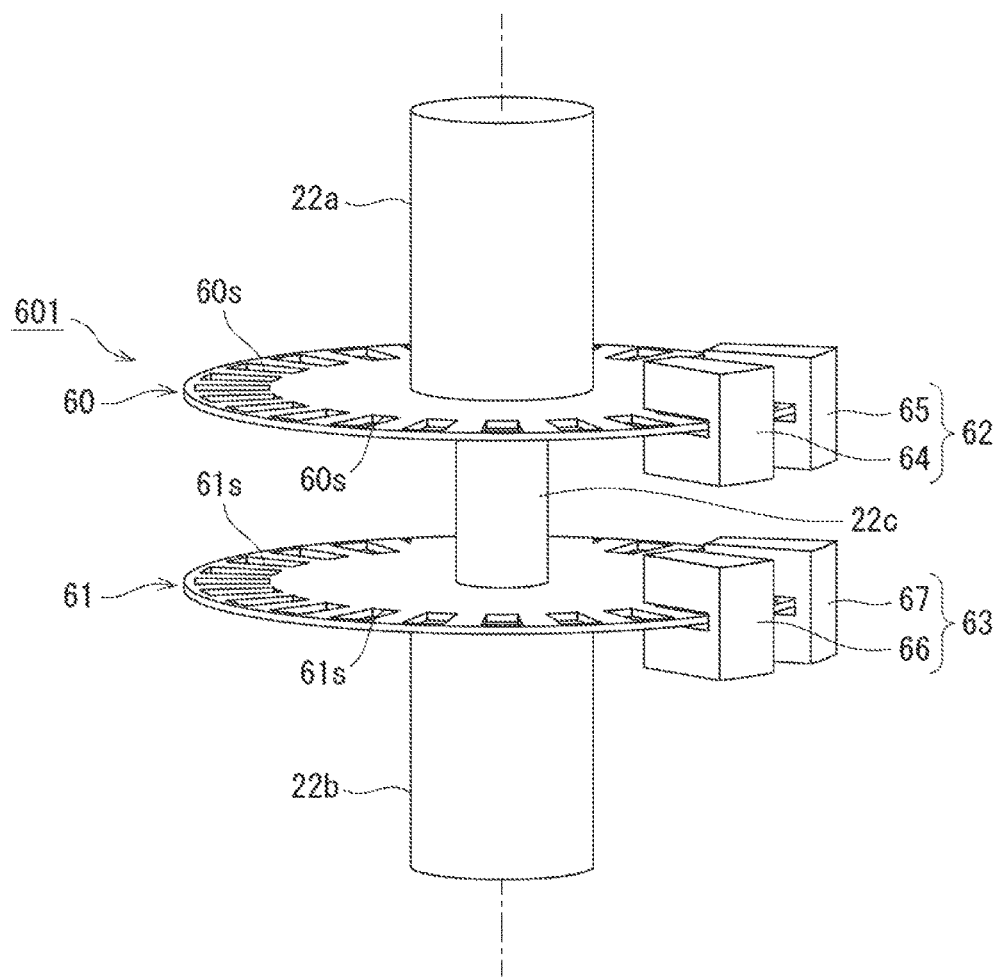
FIG. 18A is a perspective view illustrating a configuration example of a fourth sensor unit of a seventh relative angle detection device according to a seventh embodiment of the present invention.

As illustrated in FIG. 18A, the fourth sensor unit 601 includes annular and sheet-like first code wheel 60 and second code wheel 61, a third rotation angle sensor 62 that detects the rotation angle of the first code wheel 60, and a fourth rotation angle sensor 63 that detects the rotation angle of the second code wheel 61.

The first code wheel 60 is configured such that, in the vicinity of the outer periphery of the plate surface, a plurality of slits 60s formed of rectangular through holes are arranged at regular intervals in the circumferential direction in a plan view.

The second code wheel 61 is configured such that, in the vicinity of the outer periphery of the plate surface, a plurality of slits 61s formed of rectangular through holes are arranged in the circumferential direction at regular intervals in a plan view.

In the seventh embodiment, the first code wheel 60 is provided to the end of a side of the output shaft 22b of the input shaft 22a (ideally, connecting position of torsion bar 22c) so as to be synchronously rotatable with the input shaft 22a. Further, the second code wheel 61 is provided to the end of a side of the input shaft 22a of the output shaft 22b (ideally, connecting position of torsion bar 22c) so as to be synchronously rotatable with the output shaft 22b.

The third rotation angle sensor 62 and the fourth rotation angle sensor 63 are provided to the fixing part that does not synchronously rotate with the input shaft 22a and the output shaft 22b. The third rotation angle sensor 62 and the fourth rotation angle sensor 63 respectively output the sin signal and the cos signal in accordance with the rotation angles of the first code wheel 60 and the second code wheel 61.

Specifically, the third rotation angle sensor 62 includes the first sin optical sensor 64 and a first cos optical sensor 65 that are provided to the pitch of the slit while shifting the phase by 90° of the electric angle (having phase difference of 90°). Further, the fourth rotation angle sensor 63 includes a second sin optical sensor 66 and a second cos optical sensor 67 that are provided to the pitch of the slit while shifting the phase by 90° of the electric angle (having phase difference of 90°).

The first sin optical sensor 64, in accordance with the rotation angle of the first code wheel 60, outputs the first sin signal, and the first cos optical sensor 65, in accordance with the rotation angle of the first code wheel, outputs the first cos signal.

The second sin optical sensor 66, in accordance with the rotation angle of the second code wheel 61, outputs the second sin signal and the second cos optical sensor 67, in accordance with the rotation angle of the second code wheel 61, outputs the second cos signal.

Figure 18B:
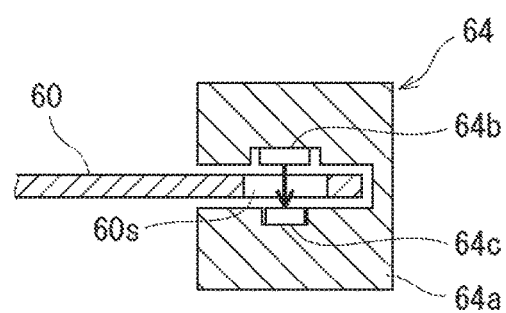
FIG. 18B is an axial partial cross-sectional view including a first sin optical sensor 64 illustrated in FIG. 18A.

As illustrated in FIG. 18B, the first sin optical sensor 64 includes a detection frame 62a that has a substantially U-shaped axial section, a light source 62b, and a light receiving unit 62c.

From between two vertically facing frame portion at the inside of the detection frame 62a, the light source 62b is positioned in the recess formed to the upper side frame portion and the light receiving unit 62c is positioned in the recess formed to the lower side frame portion in a facing manner such that the light receiving unit 62c can receive emission light from the light source 62b.

As illustrated in FIG. 18A, the first sin optical sensor 64 is arranged such that a whole slit 60a (through hole) extends through a space between the light source 62b and the light receiving unit 62c at the inside of the detection frame 62a and the two frame portions of the detection frame 62a sandwich a region including a position where the slit is formed to the outer edge portion of the first code wheel 60. In other words, as illustrated in FIG. 18B, the arrangement is made such that the emission light from the light source 62b is transmitted through the slit 60a and is received by the light receiving unit 62c.

The first cos optical sensor 65, the second sin optical sensor 66, and the second cos optical sensor 67 can have the same configuration as those of the first sin optical sensor 64 by merely replacing reference numerals of the detection frame to 65a, 66a, and 67a, the reference numerals of the light source to 65b, 66b, and 67b, and reference numerals of the light receiving unit to 65c, 66c, and 67c, and thus, descriptions thereof are omitted.

As similar to the first embodiment, in the seventh embodiment, the rotation angle (electrical angle) of the first code wheel 60 is θis and the rotation angle (electrical angle) of the second code wheel 61 is θos. Further, the relative angle between the first code wheel 60 and the second code wheel 61 (i.e., relative angle between input shaft 22a and output shaft 22b) is Δθ.

Further, as similar to the first embodiment, in the seventh embodiment also, while θos is fixed to a predetermined angle (for example, 0°), θis is changed.

In other words, in the seventh embodiment, from the first sin optical sensor 64, the first sin signal representing sin (θos+Δθ) is output, and from the first cos optical sensor 65, the first cos signal representing cos(θos+Δθ) is output. Further, from the second sin optical sensor 66, the second sin signal representing sin θos is output and, and from the second cos optical sensor 67, the second cos signal representing cos θos is output.

As illustrated in FIG. 19, the output sin(θos+Δθ), cos (θos+Δθ), sin θos and cos θos are input to the relative angle calculation unit 18.

As similar to the first embodiment, the relative angle calculation unit 18 according to the seventh embodiment, based on sin (θos+Δθ), cos (θos+Δθ), sin θos and cos θos that are respectively input from the first sin optical sensor 64, the first cos optical sensor 65, the second sin optical sensor 66 and the second cos optical sensor 67, calculates sin Δθ and cos Δθ in accordance with the above expressions (1) to (4). Then, the relative angle calculation unit, based on the calculated sin Δθ and cos Δθ, calculates the relative angle Δθ in accordance with the above expression (5). The calculated relative angle Δθ is output to the torque calculation unit 19.

In the fourth embodiment, the rotation angle θis of the first code wheel 60 corresponds to the rotation angle $\theta_1$ in CLAIMS and Solution to Problem, and the rotation angle θos of the second code wheel 61 corresponds to the rotation angle $\theta_2$ in CLAIMS and Solution to Problem.

(Effects of Seventh Embodiment)

The seventh embodiment yields following effects in addition to the effects of the first embodiment.

The seventh relative angle detection device 600 according to the seventh embodiment includes: the first code wheel 60 that including a plurality of slits 60s formed in the circumferential direction at regular intervals and configured to synchronously rotate with the input shaft 22a from between the coaxially arranged input shaft 22a and output shaft 22b; and the second code wheel 61 including a plurality of slits 61s formed in the circumferential direction at regular intervals and configured to synchronously rotate with the output shaft 22b from between the input shaft 22a and the output shaft 22b. Further, the seventh relative angle detection device includes: the third rotation angle sensor 62 including the light source (light sources 64b and 65b) and the light receiving unit (light receiving units 64c and 65c) configured to receive light which is obtained by the emission light from the light source transmitting slits 60s of the first code wheel 60 and output the first sin signal representing sin θis and the first cos signal representing cos θis in accordance with the rotation angle θis of the first code wheel; and the fourth rotation angle sensor 63 including the light source (light sources 66b and 67b) and the light receiving unit (light receiving units 66c and 67c) configured to receive light which is obtained by the emission light from the light source transmitting the slit 61s of the second code wheel 61 and output the second sin signal representing sin θos and the second cos signal representing cos θos in accordance with the rotation angle θos of the second code wheel 61. Further, the seventh relative angle detection device includes the relative angle calculation unit 18 configured to, based on the first sin signal, the first cos signal, the second sin signal, and the second cos signal, calculate sin Δθ and cos Δθ in accordance with the relative angle Δθ between the input shaft 22a and the output shaft 22b, and calculate the relative angle Δθ based on Δθ=arctan(sin Δθ/cos Δθ).

With this configuration, it is possible to calculate both sin $\Delta\theta$ and cos $\Delta\theta$, divide the calculated sin $\Delta\theta$ by cos $\Delta\theta$, and calculate the arctangent of the division value to calculate the relative angle $\Delta\theta$. This allows the calculation of the torque even at the helix angle region exceeding the linear portion of sin $\Delta\theta$. As a result, it is possible to handle the wider torque detection range. Further, even at the same torque detection range, the whole information on sin $\Delta\theta$ can be used, and thus, the resolution of the detected torque value can be enhanced. Since the relative angle $\Delta\theta$ can be calculated by one time calculation, i.e., the calculation of arctan(sin $\Delta\theta$/cos $\Delta\theta$), the more highly accurate torque value can be calculated.

In the seventh relative angle detection device 600 according to the seventh embodiment, the third rotation angle sensor 62 and the fourth rotation angle sensor 63 are arranged such that when the relative angle $\Delta\theta$ is 0°, the output of the first rotation angle sensor and the output of the second rotation angle sensor make the same phase.

With this configuration, using the signals output from the third rotation angle sensor 62 and the fourth rotation angle sensor 63, sin $\Delta\theta$ and cos $\Delta\theta$ can be calculated easily in accordance with the above expressions (1) to (4).

Eighth Embodiment (Configuration)

While the seventh relative angle detection device 600 according to the seventh embodiment includes the relative angle calculation unit 18, a relative angle detection device according to the eighth embodiment of the present invention includes the sensor calculation unit 180, and the eighth embodiment has the same configuration as that of the seventh embodiment except that the torque calculation unit 19, based on the second relative angle $\Delta\theta_2$ output from the sensor calculation unit 180, calculates the steering torque Ts.

Hereinafter, components similar to those of the seventh embodiment are denoted with the same reference numerals to appropriately omit the descriptions, and different components are described in details.

Figure 20:
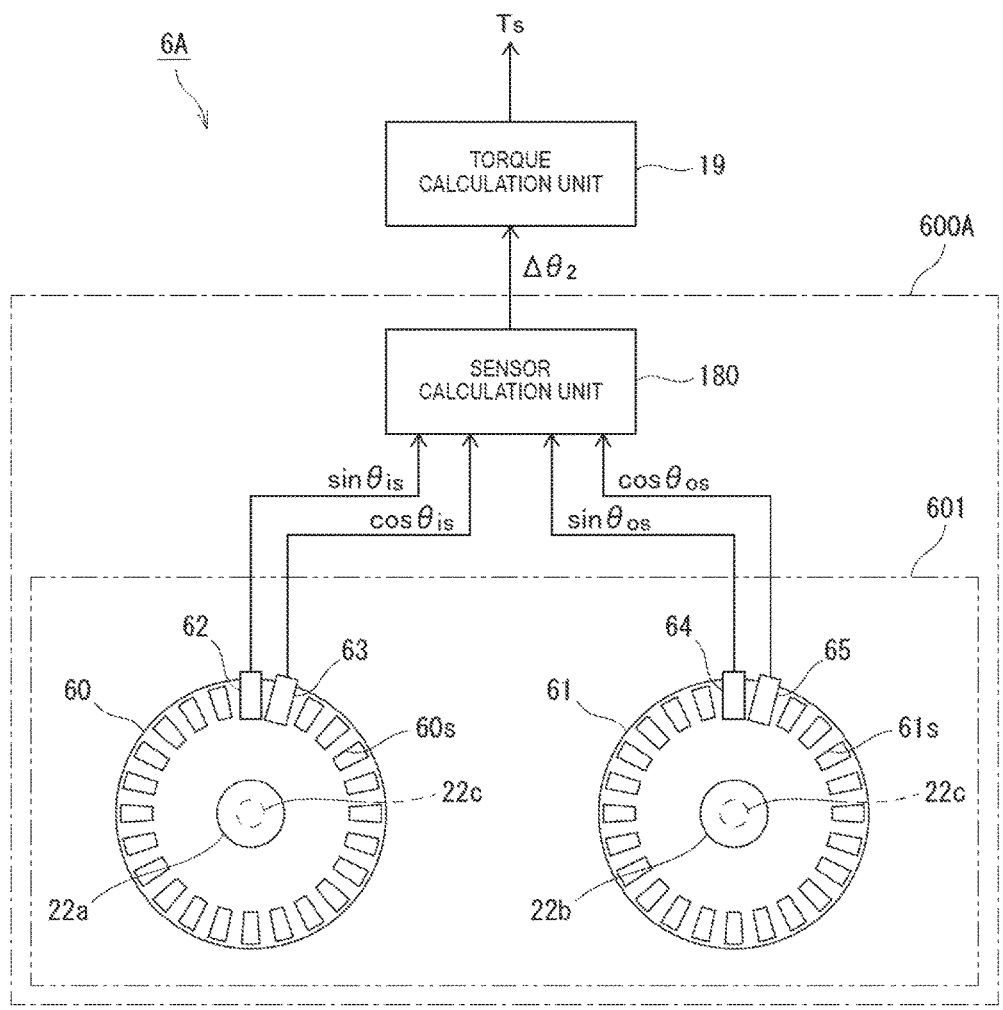
FIG. 20 is a drawing illustrating a configuration example of an eighth torque sensor according to an eighth embodiment of the present invention.

As illustrated in FIG. 20, an eighth torque sensor 6A according to the eighth embodiment includes the torque calculation unit 19 and an eighth relative angle detection device 600A, and the eighth relative angle detection device 600A includes the fourth sensor unit 601 and the sensor calculation unit 180.

In other words, the eighth torque sensor 6A has the same configuration as the second torque sensor 1A of the second embodiment except for the inclusion of the fourth sensor unit 601 instead of the first sensor unit 101.

In the eighth embodiment, the first sin signal sin $\theta$is, the first cos signal cos $\theta$is, the second sin signal sin $\theta$os and the second cos signal cos $\theta$os that are output from each optical sensor are input to the second relative angle calculation unit 18A and the third relative angle calculation unit 18r in the sensor calculation unit 180.

As same as the second embodiment, the second relative angle calculation unit 18A according to the eighth embodiment, based on the first sin signal sin $\theta$is and the first cos signal cos $\theta$is, and the second sin signal sin $\theta$os and the second cos signal cos $\theta$os that are respectively input from the first sin optical sensor 64, the first cos optical sensor 65, the second sin optical sensor 66, and the second cos optical sensor 67, calculates the rotation angle $\theta$is of the input shaft 22a and the rotation angle $\theta$os of the output shaft 22b. Then, the relative angle calculation unit, based on the difference value between the calculated rotation angle $\theta$is of the input shaft 22a and the rotation angle $\theta$os of the output shaft 22b, calculates the second relative angle $\Delta\theta_2$ as the relative angle between the input shaft 22a and the output shaft 22b. The calculated second relative angle $\Delta\theta_2$ is output to the torque calculation unit 19.

On the other hand, the third relative angle calculation unit 18r according to the eighth embodiment, based on the input first sin signal sin $\theta$is, first cos signal cos $\theta$is, second sin signal sin $\theta$os and second cos signal cos $\theta$os, calculates the relative angle sine value sin $\Delta\theta$ and the relative angle cosine value cos $\Delta\theta$ in accordance with the above expressions (6) to (9). Further, the relative angle calculation unit, based on the calculated relative angle sine value sin $\Delta\theta$ and relative angle cosine value cos $\Delta\theta$, calculates the third relative angle $\Delta\theta$ref as the relative angle between the input shaft 22a and the output shaft 22b in accordance with the above expression (10).

As similar to the second embodiment, the abnormality determination unit 20 determines the abnormality based on the difference value between the third relative angle $\Delta\theta$ref calculated by the third relative angle calculation unit 18r and the second relative angle $\Delta\theta_2$ calculated by the second relative angle calculation unit 18A.

In the eighth embodiment, the first code wheel 60, i.e., the rotation angle $\theta$is of the input shaft 22a corresponds to the rotation angle $\theta_1$ in CLAIMS and the second code wheel 61, i.e., the rotation angle $\theta$os of the output shaft 22b corresponds to the rotation angle $\theta_2$ in CLAIMS. Further, in the eighth embodiment, the second relative angle $\Delta\theta_2$ corresponds to the first relative angle $\Delta\theta_1$ in CLAIMS and the third relative angle $\Delta\theta$ref corresponds to the second relative angle $\Delta\theta_2$ and the third relative angle $\Delta\theta$ref in CLAIMS.

(Effects of Eighth Embodiment)

The eighth embodiment yields following effects in addition to the effects of the second embodiment. The eighth relative angle detection device 600A according to the eighth embodiment includes: the first code wheel 60 including a plurality of slits 60s formed in the circumferential direction at regular intervals and configured to synchronously rotate with the input shaft 22a from between the coaxially arranged input shaft 22a and output shaft 22b; and the second code wheel 61 including a plurality of slits 61s formed in the circumferential direction at regular intervals and configured to synchronously rotate with the output shaft 22b from between the input shaft 22a and the output shaft 22b. Further, the relative angle detection device includes: the third rotation angle sensor 62 including the light source (light sources 64b and 65b), and the light receiving unit (light receiving units 64c and 65c) configured to receive light obtained by the emission light from the light source transmitting the slits 60s of the first code wheel 60 and output the first sin signal representing sin $\theta$is and the first cos signal representing cos $\theta$is in accordance with the rotation angle $\theta$is of the first code wheel 60; and the fourth rotation angle sensor 63 including the light source (light sources 66b and 67b) and the light receiving unit (light receiving units 66c and 67c) configured to receive light obtained by the emission light from the light source transmitting the slit 61s of the second code wheel 61 and output the second sin signal representing sin $\theta$os and the second cos signal representing cos $\theta$os in accordance with the rotation angle $\theta$os of the second code wheel 61. Still further, the relative angle detection device includes the second relative angle calculation unit 18A configured to, based on the first sin signal sin $\theta$is and the first cos signal cos $\theta$is, calculate the rotation angle $\theta$is from $\theta$is=arctan (sin $\theta$is/cos $\theta$is), based on the second sin signal sin $\theta$os and the second cos signal cos $\theta$os, calculate the rotation angle θos from θos=arctan(sin θos/cos θos), and based on the difference value between the rotation angle θis and the rotation angle θos, calculate the second relative angle Δθ₂ as the relative angle between the input shaft 22a and the output shaft 22b.

With this configuration, it is possible to divide the first sin signal sin θis by the first cos signal cos θis and calculate the arctangent function of the division value to calculate the rotation angle θis; divide the second sin signal sin θos by the second cos signal cos θos and calculate the arctangent function of the division value to calculate the rotation angle θos, and based on the difference value between the rotation angle θis and the rotation angle θos, calculate the second relative angle Δθ₂ as the relative angle between the input shaft 22a and the output shaft 22b. This allows the calculation of the torque even at the helix angle region exceeding the linear portion of sin Δθ. As a result, it is possible to handle the wider torque detection range. Further, even at the same torque detection range, the whole information on sin Δθ can be used, and thus, the resolution of the detected torque value can be enhanced. Since the second relative angle Δθ₂ can be calculated by the small number of calculations, the more highly accurate torque value can be calculated.

In the eighth relative angle detection device 600A according to the eighth embodiment, the third rotation angle sensor 62 and the fourth rotation angle sensor 63 are provided such that when the relative angle Δθ is 0°, the output of the third rotation angle sensor 62 and the output of the fourth rotation angle sensor 63 make the same phase. With this configuration, using the signals output from the third rotation angle sensor 62 and the fourth rotation angle sensor 63, the relative angle Δθ can be calculated easily and accurately.

The eighth relative angle detection device 600A according to the eighth embodiment includes: the third relative angle calculation unit 18r configured to, based on the first sin signal sin θis, the first cos signal cos θis, the second sin signal sin θos and the second cos signal cos θos, calculate sin Δθ and cos Δθ in accordance with the relative angle Δθ between the input shaft 22a and the output shaft 22b, and from Δθref=arctan(sin Δθ/cos Δθ), calculate the third relative angle Δθref as the relative angle between the input shaft 22a and the output shaft 22b; and the abnormality determination unit 20 configured to determine the abnormality based on the difference value between the second relative angle Δθ₂ calculated by the second relative angle calculation unit 18A and the third relative angle Δθref calculated by the third relative angle calculation unit 18r. With this configuration, the abnormality determination unit can detect the abnormality in the system when the difference value between the second relative angle Δθ₂ and the third relative angle Δθref which is calculated by a method different from that of the second relative angle Δθ₂ is at or above the specified value set in advance.

Ninth Embodiment (Configuration)

The ninth embodiment of the present invention has the same configuration as that of the first embodiment except for the inclusion of a fifth sensor unit 701 that uses an eddy current for detecting the rotation angle instead of the first sensor unit 101 of the first embodiment.

Hereinafter, components similar to those of the first embodiment are denoted with the same reference numerals to appropriately omit the descriptions, and different components are described in details.

Figure 22:
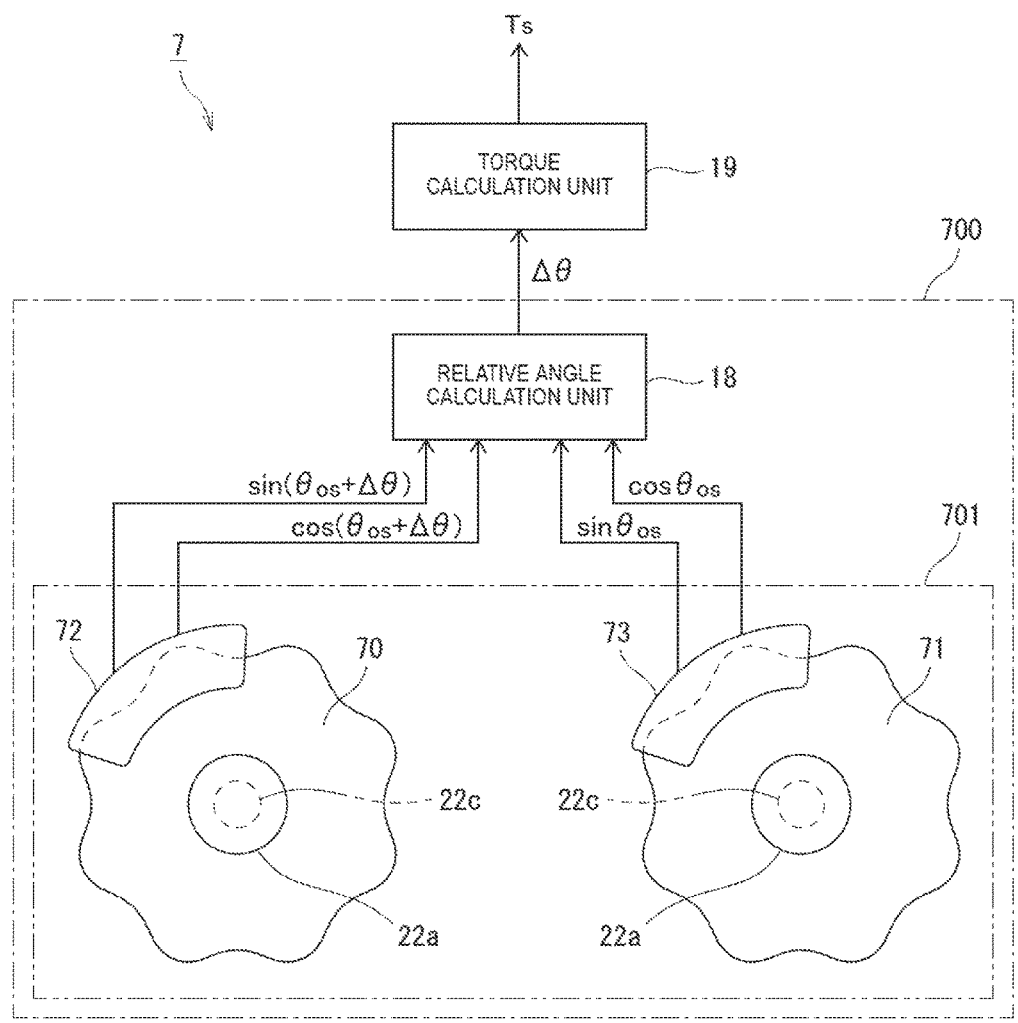
FIG. 22 is a drawing illustrating a configuration example of a ninth torque sensor according to the ninth embodiment of the present invention.

As illustrated in FIG. 22, a ninth torque sensor 7 according to the ninth embodiment includes the torque calculation unit 19 and a ninth relative angle detection device 700, and the ninth relative angle detection device 700 includes the fifth sensor unit 701 and the relative angle calculation unit 18.

Figure 21A:
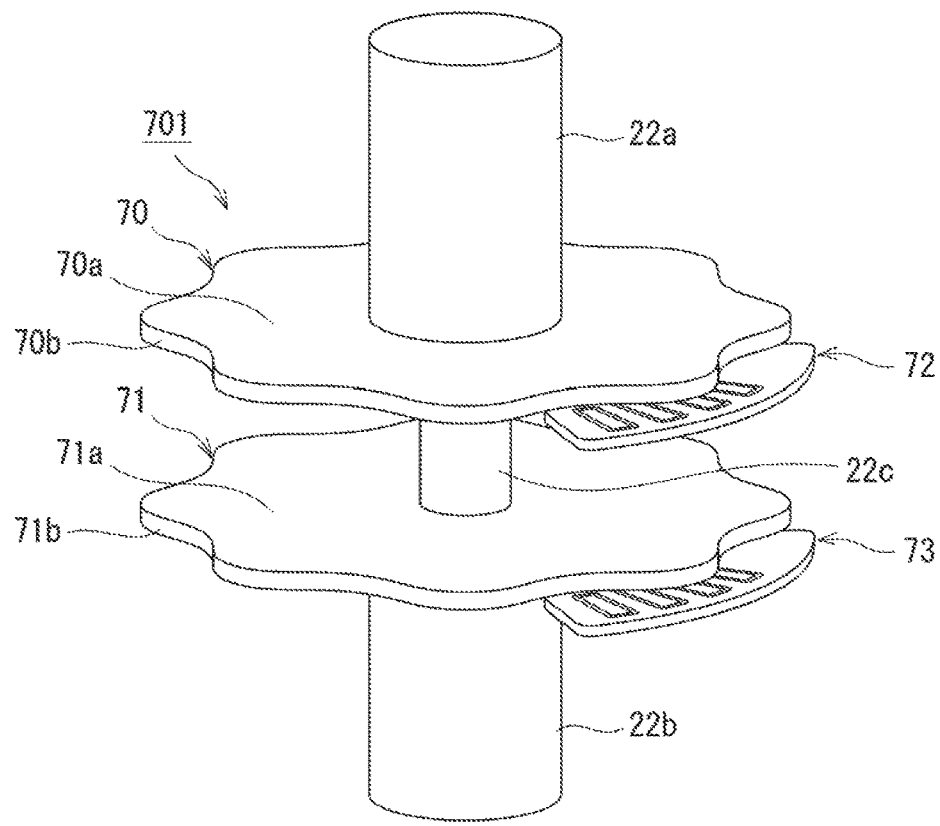
FIG. 21A is a perspective view illustrating a configuration example of a fifth sensor unit of a ninth relative angle detection device according to a ninth embodiment of the present invention.

As illustrated in FIG. 21A, the fifth sensor unit 701 includes a first target 70, a second target 71, a fifth rotation angle sensor 72 configured to detect the rotation angle of the first target 70, and a sixth rotation angle sensor 73 configured to detect the rotation angle of the second target 71.

The first target 70 includes a first annular conductor 70a configured from an annular and sheet-like conductor and a first sinusoidal unit 70b formed to have a shape in which the ends at the outer diameter side of the first annular conductor 70a sinusoidally changes along the circumferential direction in a plan view from an axial direction. In other words, the first sinusoidal unit 70b has a shape in which the width in the radial direction sinusoidally changes.

The second target 71 includes a second annular conductor 71a configured from an annular and sheet-like conductor and a second sinusoidal unit 71b formed to have a shape in which the end at the outer diameter side of the second annular conductor 71a sinusoidally changes along the circumferential direction in a plan view from the axial direction. In other words, the second sinusoidal unit 71b has a shape in which the width in the radial direction sinusoidally changes.

The first target 70 and the second target 71 can be configured from, for example, conductors of metals such as aluminum, steel, and copper or plastics materials or the like including the metal.

In the ninth embodiment, the first target 70 is attached to the end of a side of the output shaft 22b of the input shaft 22a (ideally, connecting position of torsion bar 22c) so as to be synchronously rotatable with the input shaft 22a. Further, the second target 71 is attached to the end of the side of the input shaft 22a of the output shaft 22b (ideally, connecting position of torsion bar 22c) so as to be synchronously rotatable with the output shaft 22b.

The fifth rotation angle sensor 72 and the sixth rotation angle sensor 73 are provided to the fixing part that does not synchronously rotate with the input shaft 22a and the output shaft 22b. The fifth rotation angle sensor 72 and the sixth rotation angle sensor 73, in accordance with the rotation angles of the first target 70 and the second target 71, respectively output the sin signal and cos signal.

Figure 21B:
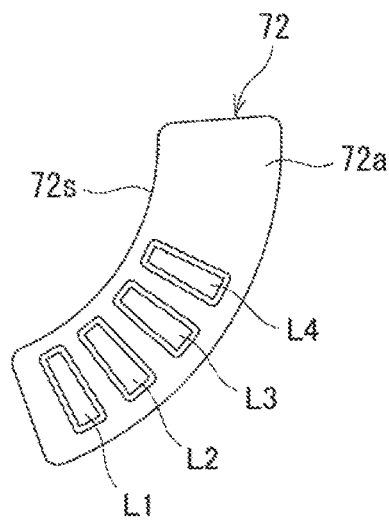
FIG. 21B is a plan view obtained by viewing the fifth rotation angle sensor of FIG. 21A from the surface side.

Specifically, as illustrated in FIG. 21B, the fifth rotation angle sensor 72 includes a substrate 72s. Further, the fifth rotation angle sensor includes planar coils L1, L2, L3, and L4 positioned on a front side surface 72a of the substrate 72s such that the changes in the inductance relative to the first sinusoidal unit 70b of the first target 70 is +Sin, +Cos, -Sin, and -Cos.

Figure 21C:
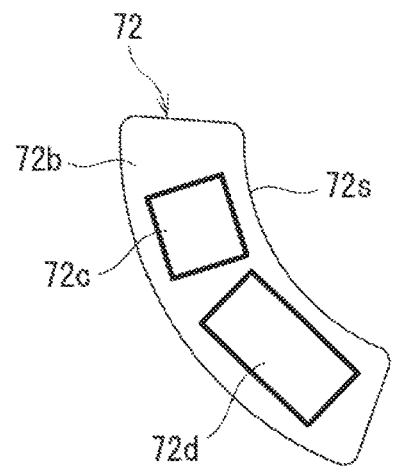
FIG. 21C is a plan view obtained by viewing the fifth rotation angle sensor of FIG. 21A from the back side.

As illustrated in FIG. 21C, the fifth rotation angle sensor 72 includes an ASIC (application-specific IC) 72c and a peripheral circuit 72d that are mounted on a back surface 72b of the substrate 72s.

In the ninth embodiment, the fifth rotation angle sensor 72 is provided to axially face the first target 70 such that the planar coils L1 to L4 face the first sinusoidal unit 70b of the first target 70. Further, the sixth rotation angle sensor 73 is provided to axially face the second target 71 such that the planar coils L1 to L4 face the second sinusoidal unit 71b of the second target 71.

The fifth rotation angle sensor 72 applies the current to the planar coils L1 to L4 to excite the planar coils, and through the magnetic flux by exciting, causes the first target 70 to generate the eddy current. The peripheral circuit 72d detects a voltage fluctuation (eddy current loss) when the inductances of the planar coils L1 to L4 are decreased by the generated eddy current. The peripheral circuit 72d detects the voltage fluctuation as the differential signals of +Sin, +Cos, −Sin, and −Cos. The fifth rotation angle sensor 72 transforms, to a single-ended signal, via the ASIC 72c, the differential signal that is detected by the peripheral circuit 72d and is in accordance with the rotation angle of the first target 70. The fifth rotation angle sensor outputs the transformed signals, i.e., the first sin signal and the first cos signal.

On the other hand, the sixth rotation angle sensor 73 has the same configuration as that of the fifth rotation angle sensor 72 by merely replacing the reference numeral of the substrate of the fifth rotation angle sensor 72 to 73s, the reference numeral of the front side surface to 73a, the reference numeral of the back surface to 73b, the reference numeral of ASIC to 73c, and the reference numeral of the peripheral circuit to 73d, and thus the descriptions are omitted.

The sixth rotation angle sensor 73 transforms, via an ASIC 73c, to a single-ended signal, the differential signal that is detected by a peripheral circuit 73d and is in accordance with the rotation angle of the second target 71. Then, the sixth rotation angle sensor outputs the transformed signals, i.e., the second sin signal and the second cos signal.

In the ninth embodiment, as similar to the first embodiment, it is assumed that the rotation angle (electrical angle) of the first target 70 is $\theta is$ and the rotation angle (electrical angle) of the second target 71 is $\theta os$. Further, it is assumed that the relative angle between the first target 70 and the second target 71 (i.e., relative angle between input shaft 22a and output shaft 22b) is $\Delta\theta$.

In the ninth embodiment, as similar to the first embodiment, while $\theta os$ is fixed to a predetermined angle (for example, 0°), $\theta is$ changes.

In other words, in the fifth embodiment, from the fifth rotation angle sensor 72, the first sin signal representing $\sin(\theta os+\Delta\theta)$ and the first cos signal representing $\cos(\theta os+\Delta\theta)$ are output. Further, from the sixth rotation angle sensor 73, the second sin signal representing $\sin \theta os$ and the second cos signal representing $\cos \theta os$ are output.

As illustrated in FIG. 16, the output sin ($\theta os+\Delta\theta$), cos ($\theta os+\Delta\theta$), sin $\theta os$ and cos $\theta os$ are input to the relative angle calculation unit 18.

As similar to the first embodiment, the relative angle calculation unit 18 according to the ninth embodiment, based on sin ($\theta os+\Delta\theta$), cos ($\theta os+\Delta\theta$), sin $\theta os$ and cos $\theta os$ input from the fifth rotation angle sensor 72 and the sixth rotation angle sensor 73, calculates sin $\Delta\theta$ and cos $\Delta\theta$ in accordance with the above expressions (1) to (4). Then, the relative angle calculation unit, based on the calculated sin $\Delta\theta$ and cos $\Delta\theta$, calculates the relative angle $\Delta\theta$ in accordance with the above expression (5). The calculated relative angle $\Delta\theta$ is output to the torque calculation unit 19.

In the ninth embodiment, the rotation angle $\theta is$ of the first target 70 corresponds to the rotation angle $\theta_1$ in CLAIMS and Solution to Problem, and the rotation angle $\theta os$ of the second target 71 corresponds to the rotation angle $\theta_2$ in CLAIMS and Solution to Problem. Further, planar coils L1, L2, L3, and L4 correspond to inductance elements.

(Effects of Ninth Embodiment)

The ninth embodiment yields following effects in addition to the effects of the first embodiment.

The ninth relative angle detection device 700 according to the ninth embodiment includes the first target 70 having the ring-like first sinusoidal unit 70b having the radial width sinusoidally changing along the circumferential direction and configured to synchronously rotate with the input shaft 22a from between the coaxially arranged input shaft 22a and output shaft 22b. Further, the ninth relative angle detection device includes the second target 71 having the ring-like second sinusoidal unit 71b having radial width sinusoidally changing in the circumferential direction and configured to synchronously rotate with the output shaft 22b from between the input shaft 22a and the output shaft 22b. The ninth relative angle detection device includes the fifth rotation angle sensor 72 including a plurality of inductance elements (planar coils L1 to L4) arranged to a fixed side by facing the first sinusoidal unit 70b with a predetermined gap therebetween, configured to detect the eddy current loss in accordance with the rotation angle $\theta is$ of the first target 70, and output the first sin signal representing $\sin \theta is$ and the first cos signal representing $\cos \theta is$. Further, the ninth relative angle detection device includes the sixth rotation angle sensor 73 including a plurality of inductance elements (planar coils L1 to L4) provided to the fixed side by facing the second sinusoidal unit 71b with the predetermined gap therebetween, configured to detect the eddy current loss in accordance with the rotation angle $\theta os$ of the second target 71, and output the second sin signal representing $\sin \theta os$ and the second cos signal representing $\cos \theta os$. The ninth relative angle detection device includes the relative angle calculation unit 18 configured to, based on the first sin signal and the first cos signal, and the second sin signal and the second cos signal, calculate sin $\Delta\theta$ and cos $\Delta\theta$ in accordance with the relative angle $\Delta\theta$ between the input shaft 22a and the output shaft 22b and calculate the relative angle $\Delta\theta$ from $\Delta\theta=\arctan (\sin \Delta\theta/\cos \Delta\theta)$.

With this configuration, it is possible to calculate both sin $\Delta\theta$ and cos $\Delta\theta$, and divide the calculated sin $\Delta\theta$ by cos $\Delta\theta$ to calculate the arctangent of the division value, and accordingly, the relative angle $\Delta\theta$ can be calculated. This allows the calculation of the torque even at the helix angle region exceeding the linear portion of sin $\Delta\theta$. As a result, it is possible to handle the wider torque detection range. Further, even at the same torque detection range, the whole information on sin $\Delta\theta$ can be used, and thus, the resolution of the detected torque value can be enhanced. Since the relative angle $\Delta\theta$ can be calculated by one time calculation, i.e., calculation of arctan(sin $\Delta\theta$/cos $\Delta\theta$), the more highly accurate torque value can be calculated.

The first target 70 include the first annular conductor 70a and the first sinusoidal unit 70b formed to have a shape in which the end at the outer diameter side of the first annular conductor 70a sinusoidally changes in a plan view from the axial direction. Further, the second target 71 includes the second annular conductor 71a and the second sinusoidal unit 71b formed to have a shape in which the end at the outer diameter side of the second annular conductor 71a sinusoidally changes in a plan view from the axial direction. The fifth rotation angle sensor 72 is provided to face an axial end face of the first target 70 such that a plurality of inductance elements (planar coils L1 to L4) of the fifth rotation angle sensor 72 face the first sinusoidal unit 70b. Further, the sixth rotation angle sensor 73 is provided to face an axial end face of the second target 71 such that a plurality of inductance elements (planar coils L1 to L4) of the sixth rotation angle sensor 73 face the second sinusoidal unit 71b.

With this configuration, even if there is an insufficient space relative to the target in the radial direction, the rotation angle sensor can be provided in an axially facing manner.

Tenth Embodiment (Configuration)

While the ninth relative angle detection device 700 according to the ninth embodiment includes the relative angle calculation unit 18, a relative angle detection device according to the tenth embodiment of the present invention has the sensor calculation unit 180, and the tenth embodiment has the same configuration as that of the ninth embodiment except that the torque calculation unit 19, based on the second relative angle $\Delta\theta_2$ output from the sensor calculation unit 180, calculates the steering torque Ts.

Hereinafter, components similar to those of the ninth embodiment are denoted with the same reference numerals to appropriately omit the descriptions, and different components are described in details.

Figure 23:
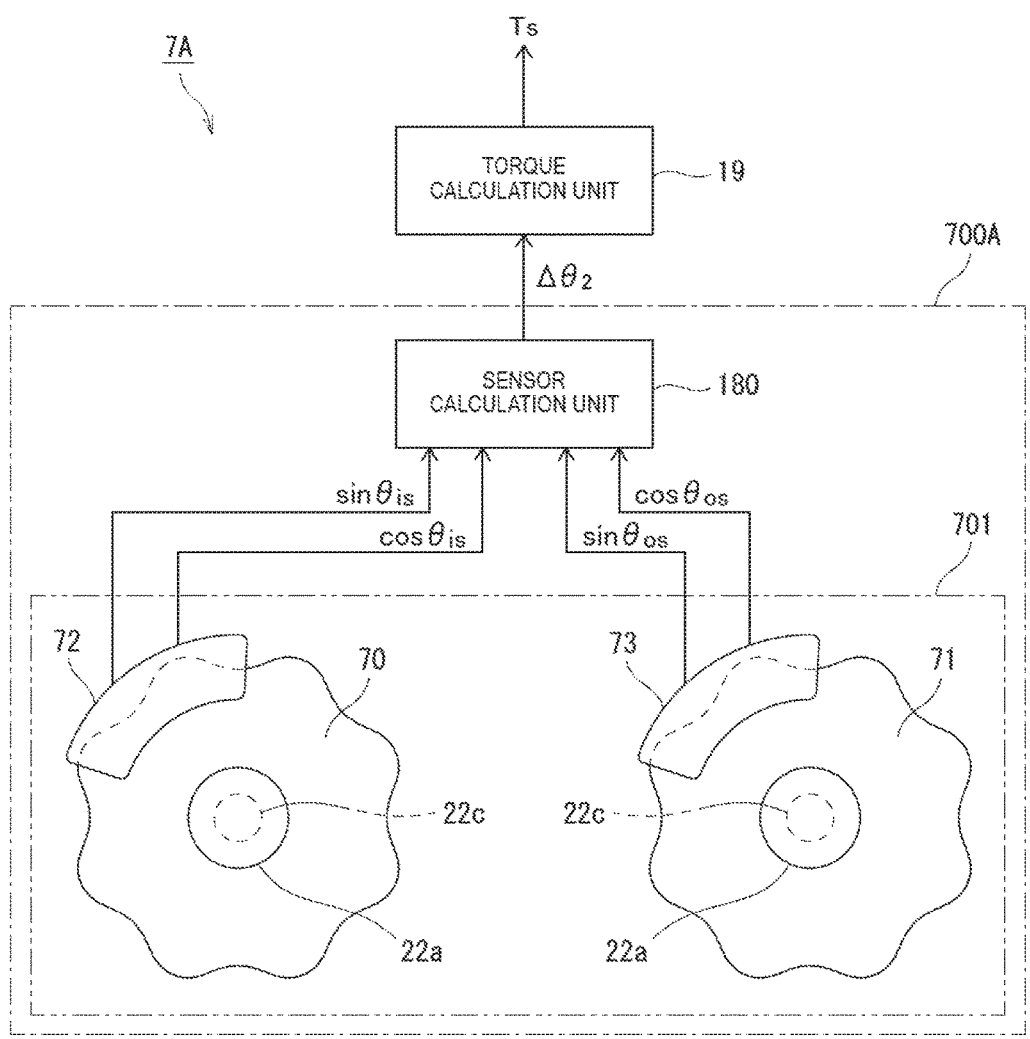
FIG. 23 is a drawing illustrating a configuration example of a tenth torque sensor according to a tenth embodiment of the present invention.

As illustrated in FIG. 23, a tenth torque sensor 7A according to the tenth embodiment includes the torque calculation unit 19 and the tenth relative angle detection device 700A, and the tenth relative angle detection device 700A includes the fifth sensor unit 701 and the sensor calculation unit 180.

In other words, the tenth torque sensor 7A has the same configuration as that of the second torque sensor 1A of the second embodiment except for the inclusion of the fifth sensor unit 701 instead of the first sensor unit 101.

Further, in the tenth embodiment, the first sin signal sin $\theta$is, the first cos signal cos $\theta$is, the second sin signal sin $\theta$os and the second cos signal cos $\theta$os that are output from the fifth rotation angle sensor 72 and the sixth rotation angle sensor 73 are input to the second relative angle calculation unit 18A and the third relative angle calculation unit 18r in the sensor calculation unit 180.

As similar to the second embodiment, the second relative angle calculation unit 18A according to the tenth embodiment, based on the first sin signal sin $\theta$is, the first cos signal cos $\theta$is, the second sin signal sin $\theta$os and the second cos signal cos $\theta$os that are input from the fifth rotation angle sensor 72 and the sixth rotation angle sensor 73, calculates the rotation angle $\theta$is of the input shaft 22a and the rotation angle $\theta$os of the output shaft 22b. Then, the second relative angle calculation unit, based on the difference value between the calculated rotation angle $\theta$is of the input shaft 22a and the rotation angle $\theta$os of the output shaft 22b, calculates the second relative angle $\Delta\theta_2$ as the relative angle between the input shaft 22a and the output shaft 22b. The calculated second relative angle $\Delta\theta_2$ is output to the torque calculation unit 19.

On the other hand, the third relative angle calculation unit 18r according to the tenth embodiment, based on the input first sin signal sin $\theta$is, the first cos signal cos $\theta$is, the second sin signal sin $\theta$os and the second cos signal cos $\theta$os, calculates the relative angle sine value sin $\Delta\theta$ and the relative angle cosine value cos $\Delta\theta$ in accordance with the above expressions (6) to (9). Further, the third relative angle calculation unit, based on the calculated relative angle sine value sin $\Delta\theta$ and the relative angle cosine value cos $\Delta\theta$, calculates the third relative angle $\Delta\theta$ref as the relative angle between the input shaft 22a and the output shaft 22b in accordance with the above expression (10).

As similar to the second embodiment, the abnormality determination unit 20 determines the abnormality based on the difference value between the third relative angle $\Delta\theta$ref calculated by the third relative angle calculation unit 18r and the second relative angle $\Delta\theta_2$ calculated by the second relative angle calculation unit 18A.

In the tenth embodiment, the first target 70, i.e., the rotation angle $\theta$is of the input shaft 22a corresponds to the rotation angle $\theta_1$ in CLAIMS and the second target 71, i.e., the rotation angle $\theta$os of the output shaft 22b corresponds to the rotation angle $\theta_2$ in CLAIMS. Further, the planar coils L1, L2, L3, and L4 correspond to the inductance elements in CLAIMS. In the tenth embodiment, the second relative angle $\Delta\theta_2$ corresponds to the first relative angle $\Delta\theta 1$ in CLAIMS and the third relative angle $\Delta\theta$ref corresponds to the second relative angle $\Delta\theta 2$ and the third relative angle $\Delta\theta$ref in CLAIMS.

(Effects of Tenth Embodiment)

The tenth embodiment yields following effects in addition to the effects of the second embodiment.

The tenth relative angle detection device 700A according to the tenth embodiment includes the first target 70 including a ring-like first sinusoidal unit 70b having the radial width sinusoidally changing in the circumferential direction and configured to synchronously rotate with the input shaft 22a from between the coaxially arranged input shaft 22a and output shaft 22b. Further, the tenth relative angle detection device includes the second target 71 including a ring-like second sinusoidal unit 71b having the radial width sinusoidally changing in the circumferential direction and configured to synchronously rotate with the output shaft 22b from between the input shaft 22a and the output shaft 22b. The tenth relative angle detection device includes the fifth rotation angle sensor 72 including a plurality of inductance elements (planar coils L1 to L4) provided to the fixed side to face the first sinusoidal unit 70b with a predetermined gap therebetween, configured to detect the eddy current loss in accordance with the rotation angle $\theta$is of the first target 70, and output the first sin signal representing sin $\theta$is and the first cos signal representing cos $\theta$is. Further, the tenth relative angle detection device includes the sixth rotation angle sensor 73 including a plurality of inductance elements (planar coils L1 to L4) provided to the fixed side to face the second sinusoidal unit 71b with the predetermined gap therebetween, configured to detect the eddy current loss in accordance with the rotation angle $\theta$os of the second target 71, and output the second sin signal representing sin $\theta$os and the second cos signal representing cos $\theta$os. Still further, the tenth relative angle detection device includes the second relative angle calculation unit 18A configured to, based on the first sin signal sin $\theta$is and the first cos signal cos $\theta$is, calculate the rotation angle $\theta$is from $\theta$is=arctan(sin $\theta$is/cos $\theta$is), based on the second sin signal sin $\theta$os and the second cos signal cos $\theta$os, calculate the rotation angle $\theta$os from $\theta$os=arctan(sin $\theta$os/cos $\theta$os), and calculate the second relative angle $\Delta\theta_2$ as the relative angle between the input shaft 22a and the output shaft 22b based on the difference value between the rotation angle $\theta$is and the rotation angle $\theta$os.

With this configuration, it is possible to calculate both sin $\Delta\theta$ and cos $\Delta\theta$ and divide the calculated sin $\Delta\theta$ by cos $\Delta\theta$ to calculate the arctangent of the division value, and accordingly, the second relative angle $\Delta\theta_2$ can be calculated. This allows the calculation of the torque even at the helix angle region exceeding the linear portion of sin $\Delta\theta$. As a result, it is possible to handle the wider torque detection range. Even at the same torque detection range, the whole information on sin $\Delta\theta$ can be used, and thus, the resolution of the detected torque value can be enhanced. Further, since the second relative angle $\Delta\theta_2$ can be calculated by the small number of calculations, the more highly accurate torque value can be calculated.

In the tenth relative angle detection device 700A according to the tenth embodiment, the first target 70 includes the first annular conductor 70a, and the first sinusoidal unit 70b formed to have a shape in which the end at the outer diameter side of the first annular conductor 70a sinusoidally changes in a plan view from the axial direction. Further, the second target 71 includes the second annular conductor 71a, and the second sinusoidal unit 71b formed to have a shape in which the end at the outer diameter side of the second annular conductor 71a sinusoidally changes in a plan view from the axial direction. The fifth rotation angle sensor 72 is provided to face an axial end face of the first target 70 such that a plurality of inductance elements (planar coils L1 to L4) of the fifth rotation angle sensor 72 face the first sinusoidal unit 70b. Further, the sixth rotation angle sensor 73 is provided to face an axial end face of the second target 71 such that a plurality of inductance elements (planar coils L1 to L4) of the sixth rotation angle sensor 73 face the second sinusoidal unit 71b.

With this configuration, even if there in an insufficient space relative to, for example, the target in the radial direction, the rotation angle sensor can be provided in an axially facing manner.

In the tenth relative angle detection device 700A according to the tenth embodiment, the fifth rotation angle sensor 72 and the sixth rotation angle sensor 73 are provided such that when the relative angle $\Delta\theta$ is 0°, the output of the fifth rotation angle sensor 72 and the output of the sixth rotation angle sensor 73 make the same phase. With this configuration, using the signals output from the fifth rotation angle sensor 72 and the sixth rotation angle sensor 73, the relative angle $\Delta\theta$ can be calculated easily and accurately.

The tenth relative angle detection device 700A according to the tenth embodiment includes: the third relative angle calculation unit 18r that, based on the first sin signal sin θis, the first cos signal cos θis, the second sin signal sin θos and the second cos signal cos θos, calculates sin $\Delta\theta$ and cos $\Delta\theta$ in accordance with the relative angle $\Delta\theta$ between the input shaft 22a and the output shaft 22b and calculates third relative angle $\Delta\theta$ref as the relative angle between the input shaft 22a and the output shaft 22b from $\Delta\theta\text{ref}=\arctan(\sin\Delta\theta/\cos\Delta\theta)$; and the abnormality determination unit 20 that determines the abnormality based on the difference value between the second relative angle $\Delta\theta_2$ calculated by the second relative angle calculation unit 18A and the third relative angle $\Delta\theta$ref calculated by the third relative angle calculation unit 18r. With this configuration, the abnormality determination unit can detect the abnormality in the system when the difference value between the second relative angle $\Delta\theta_2$ and the third relative angle $\Delta\theta$ref calculated by a method different from that of the second relative angle $\Delta\theta_2$ is at or above the specified value set in advance.

Eleventh Embodiment (Configuration)

The eleventh embodiment of the present invention has the same configuration as that of the first embodiment except for the inclusion of a sixth sensor unit 801 that uses the eddy current for detecting the rotation angle, instead of the first sensor unit 101 of the first embodiment.

Hereinafter, components similar to those of the first embodiment are denoted with the same reference numerals to appropriately omit the descriptions, and different components are described in details.

Figure 25:
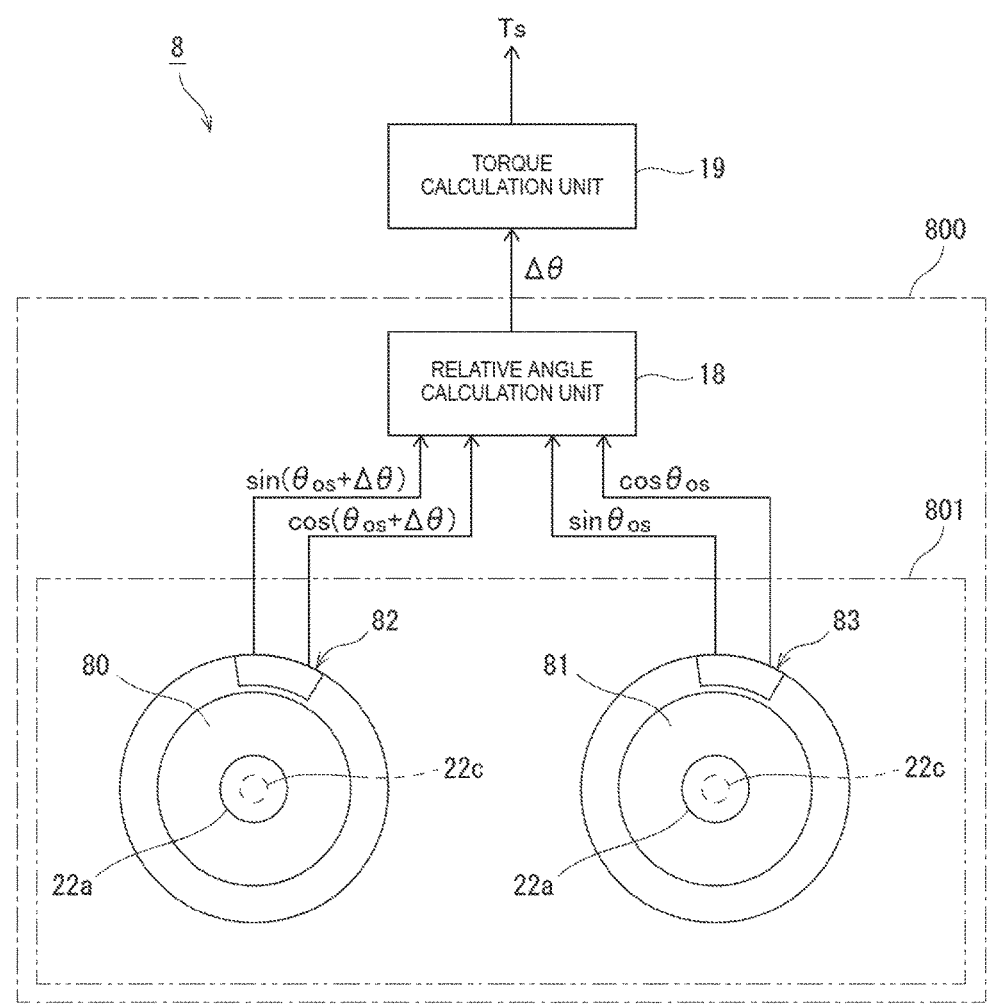
FIG. 25 is a drawing illustrating a configuration example of an eleventh torque sensor according to the eleventh embodiment of the present invention.

As illustrated in FIG. 25, an eleventh torque sensor 8 according to the eleventh embodiment includes the torque calculation unit 19 and an eleventh relative angle detection device 800, and the eleventh relative angle detection device 800 includes the sixth sensor unit 801 and the relative angle calculation unit 18.

The sixth sensor unit 801 includes a third target 80, a fourth target 81, a seventh rotation angle sensor 82 that detects the rotation angle of the third target 80, and an eighth rotation angle sensor 83 that detects the rotation angle of the fourth target 81.

The third target 80 includes a cylindrical first cylindrical body 80a, and a third sinusoidal unit 80b that is annularly formed to the outer periphery of the first cylindrical body 80a in the circumferential direction and has a shape in which a top of one sine wave and a bottom of the other sine wave become symmetrical and then, the two sine waves cross in a plan view. In other words, the third sinusoidal unit 80b has a shape in which an axial width sinusoidally changes.

The fourth target 81 includes a cylindrical second cylindrical body 81a, and a fourth sinusoidal unit 81b that is annularly formed to the outer periphery of the second cylindrical body 81a in the circumferential direction and has a shape in which a top of one sine wave and a bottom of the other sine wave become symmetrical and then, the two sine waves cross in a plan view. In other words, the fourth sinusoidal unit 81b has a shape in which an axial width sinusoidally changes.

The third sinusoidal unit 80b and the fourth sinusoidal unit 81b may be configured from, for example, the conductor of the metal such as aluminum, steel, and copper and the conductor of the plastics material or the like including the metal.

In the eleventh embodiment, the third target 80 is provided to the end at a side of the output shaft 22b of the input shaft 22a (ideally, connecting position of torsion bar 22c) so as to be synchronously rotatable with the input shaft 22a. Further, the fourth target 81 is provided to the end at a side of the input shaft 22a of the output shaft 22b (ideally, connecting position of torsion bar 22c) so as to be synchronously rotatable with the output shaft 22b.

The seventh rotation angle sensor 82 and an eighth rotation angle sensor 83 are provided to the fixing part that does not synchronously rotate with the input shaft 22a and the output shaft 22b. The seventh rotation angle sensor 82 and the eighth rotation angle sensor 83, in accordance with the rotation angles of the third target 80 and the fourth target 81, respectively output the sin signal and the cos signal.

Figure 24A:
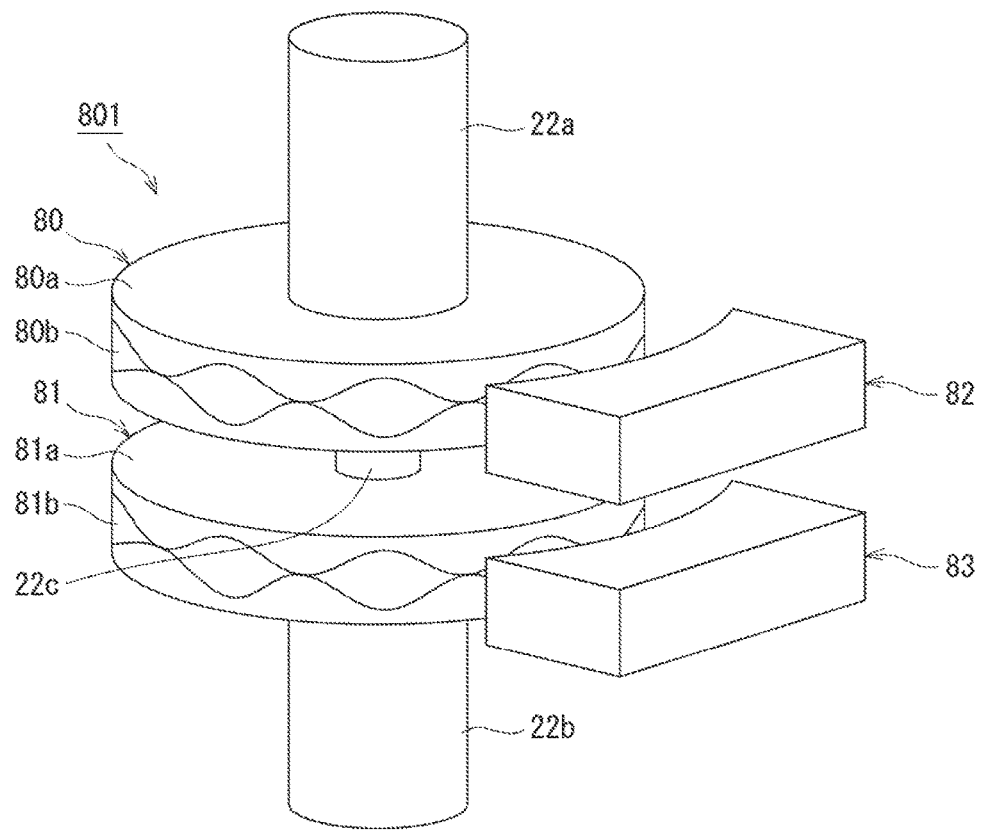
FIG. 24A is a perspective view illustrating a configuration example of a sixth sensor unit of an eleventh relative angle detection device according to an eleventh embodiment of the present invention.
Figure 24B:
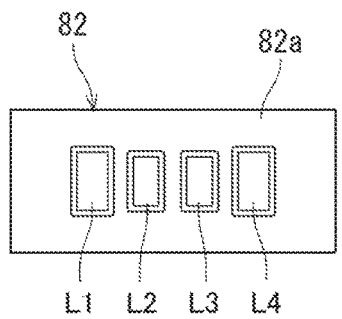
FIG. 24B is a plan view obtained by viewing the seventh rotation angle sensor of FIG. 24A from the curved side.

Specifically, as illustrated in FIG. 24A, the seventh rotation angle sensor 82 has the curved surface along the circumference surface that faces the circumference surface of the third target 80. As illustrated in FIG. 24B, the seventh rotation angle sensor 82 includes the planar coils L1, L2, L3, and L4 that are provided on a curved surface 82a.

In other words, in the eleventh embodiment, as illustrated in FIG. 24A, the seventh rotation angle sensor 82 is provided to face the third target 80 in the radial direction such that the planar coils L1 to L4 face the third sinusoidal unit 80b of the third target 80 with the predetermined gap therebetween.

The planar coils L1 to L4 are positioned on the curved surface 82a such that the change in the inductance relative to the third sinusoidal unit 80b of the third target 80 is +Sin, +Cos, −Sin, and −Cos.

Figure 24C:
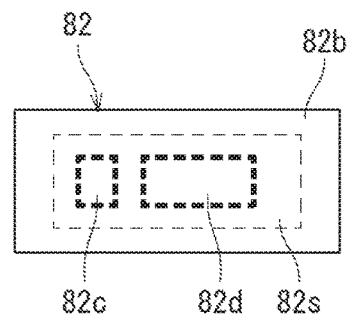
FIG. 24C is a plan view obtained by viewing the seventh rotation angle sensor of FIG. 24A from a surface opposite to the curved surface.

Further, as illustrated in FIG. 24C, the seventh rotation angle sensor 82 includes a substrate 82s at an inside as viewed from a surface 82*b* side opposite to the curved surface 82*a*, and an ASIC 82*c* and a peripheral circuit 82*d* that are mounted on a surface of the curved surface 82*a* side of the substrate 82*s*.

The seventh rotation angle sensor 82 applies the current to the planar coils L1 to L4 to excite the planar coils, and through the magnetic flux by exciting, causes the third target 80 to generate the eddy current. By the generated eddy current, the eddy current loss is caused, and the inductances of the planar coils L1 to L4 decrease. The peripheral circuit 82*d* detects the voltage fluctuations. The voltage fluctuations are detected as the differential signals of +Sin, +Cos, −Sin, and −Cos.

In other words, the seventh rotation angle sensor 82 detects the differential signal in accordance with the rotation angle of the third target 80, with the peripheral circuit 82*d*, and via the ASIC 82*c*, transforms the detected differential signal to the single-ended signal. Then, the transformed signals, i.e., the first sin signal and the first cos signal are output.

On the other hand, as illustrated in FIG. 24A, the eighth rotation angle sensor 83 includes the curved surface along the circumference surface that faces the circumference surface of the fourth target 81.

The eighth rotation angle sensor 83 has the same configuration as that of the seventh rotation angle sensor 82 by merely replacing the reference numeral of the curved surface to 83*a*, the reference numeral of the surface opposite to the curved surface 82*a* to 83*b*, the reference numeral of the substrate to 83S, the reference numeral of the ASIC to 83*c*, and the reference numeral of the peripheral circuit to 83*d*, and thus, descriptions are omitted.

In the eleventh embodiment, as illustrated in FIG. 24A, the eighth rotation angle sensor 83 is provided to face the fourth target 81 in the radial direction such that the planar coils L1 to L4 face the fourth sinusoidal unit 81*b* of the fourth target 81 with a predetermined gap therebetween.

Further, the eighth rotation angle sensor 83 detects the differential signal in accordance with the rotation angle of the fourth target 81, with the peripheral circuit 83*d* and via the ASIC 83*c*, transforms the detected differential signal to the single-ended signal. The transformed signals, i.e., the second sin signal and the second cos signal are output.

As similar to the first embodiment, in the eleventh embodiment, the rotation angle (electrical angle) of the third target 80 is θis, and the rotation angle (electrical angle) of the fourth target 81 is θos. Further, the relative angle between the third target 80 and the fourth target 81 (i.e., relative angle between input shaft 22*a* and output shaft 22*b*) is Δθ.

As similar to the first embodiment, in the eleventh embodiment also, while θos is fixed to a predetermined angle (for example, 0°), θis changes.

In other words, in the eleventh embodiment, from the seventh rotation angle sensor 82, the first sin signal representing sin(θos+Δθ) and the first cos signal representing cos(θos+Δθ) are output. Further, from the eighth rotation angle sensor 83, the second sin signal representing sin θos and the second cos signal representing cos θos are output.

As illustrated in FIG. 25, the output sin(θos+Δθ), cos (θos+Δθ), sin θos and cos θos are intput to the relative angle calculation unit 18.

As similar to the first embodiment, the relative angle calculation unit 18 according to the eleventh embodiment, based on sin (θos+Δθ), cos (θos+Δθ), sin θos and cos θos that are input from the seventh rotation angle sensor 82 and the eighth rotation angle sensor 83, calculates sin Δθ and cos Δθ in accordance with the above expressions (1) to (4). Then, the relative angle calculation unit, based on the calculated sin Δθ and cos Δθ, calculates the relative angle Δθ in accordance with the above expression (5). The calculated relative angle Δθ is output to the torque calculation unit 19.

In the eleventh embodiment, the rotation angle θis of the third target 80 corresponds to the rotation angle $θ_1$ in CLAIMS and the rotation angle θos of the fourth target 81 corresponds to the rotation angle $θ_2$ in CLAIMS. Further, the planar coils L1, L2, L3, and L4 correspond to the inductance elements in CLAIMS.

(Effects of Eleventh Embodiment)

The eleventh embodiment yields following effects in addition to the effects of the first embodiment.

The eleventh relative angle detection device 800 according to the eleventh embodiment includes the third target 80 having the ring-like third sinusoidal unit 80*b* having the axial width sinusoidally changing in the circumferential direction and configured to synchronously rotate with the input shaft 22*a* from between the coaxially arranged input shaft 22*a* and output shaft 22*b*. Further, the eleventh relative angle detection device includes the fourth target 81 having the ring-like fourth sinusoidal unit 81*b* having the axial width sinusoidally changing in the circumferential direction and configured to synchronously rotate with the output shaft 22*b* from between the input shaft 22*a* and the output shaft 22*b*. The eleventh relative angle detection device includes the seventh rotation angle sensor 82 including a plurality of inductance elements (planar coils L1 to L4) provided to the fixed side to face the third sinusoidal unit 80*b* with a predetermined gap therebetween, configured to detect the eddy current loss in accordance with the rotation angle θis of the third target 80, and output the first sin signal representing sin θis and the first cos signal representing cos θis. Further, the eleventh relative angle detection device includes the eighth rotation angle sensor 83 including a plurality of inductance elements (planar coils L1 to L4) provided to the fixed side to face the fourth sinusoidal unit 81*b* with a predetermined gap therebetween, configured to detect the eddy current loss in accordance with the rotation angle θos of the fourth target 81, and output the second sin signal representing sin θos and the second cos signal representing cos θos. The eleventh relative angle detection device includes the relative angle calculation unit 18 configured to, based on the first sin signal and the first cos signal, and the second sin signal and the second cos signal, calculate sin Δθ and cos Δθ in accordance with the relative angle Δθ between the input shaft 22*a* and the output shaft 22*b* and calculate the relative angle Δθ from Δθ=arctan(sin Δθ/cos Δθ).

With this configuration, it is possible to calculate both sin Δθ and cos Δθ and divide the calculated sin Δθ by cos Δθ to calculate the arctangent of the division value, and accordingly, the relative angle Δθ can be calculated. This allows the calculation of the torque even at the helix angle region exceeding the linear portion of sin Δθ. As a result, it is possible to handle the wider torque detection range. Further, even at the same torque detection range, the whole information on sin Δθ can be used, and thus, the resolution of the detected torque value can be enhanced. Since the relative angle Δθ can be calculated by one time calculation, i.e., the calculation of arctan(sin Δθ/cos Δθ), the more highly accurate torque value can be calculated.

The third target 80 has the first cylindrical body 80*a* and the third sinusoidal unit 80*b* formed to the circumference surface of the first cylindrical body 80*a* and having a sinusoidally changing shape in the circumferential direction in a plan view of the circumference surface. Further, the fourth target 81 has the second cylindrical body 81a and the fourth sinusoidal unit 81b provided to the circumference surface of the second cylindrical body 81a and having a sinusoidally changing shape along the circumferential direction in a plan view of the circumference surface. The seventh rotation angle sensor 82 is provided to face the circumference surface of the third target 80 such that a plurality of inductance elements (planar coils L1 to L4) of the seventh rotation angle sensor 82 face the third sinusoidal unit 80b. Further, the eighth rotation angle sensor 83 is provided to face the circumference surface of the fourth target 81 such that a plurality of inductance elements (planar coils L1 to L4) of the eighth rotation angle sensor 83 face the fourth sinusoidal unit 81b.

With this configuration, even if there is an insufficient space relative to, for example, the target in the axial direction, the rotation angle sensor can be provided in a radially facing manner.

The Twelfth Embodiment (Configuration)

While the eleventh relative angle detection device 800 of the eleventh embodiment includes the relative angle calculation unit 18, a relative angle detection device of the twelfth embodiment of the present invention has the sensor calculation unit 180, and the twelfth embodiment has the same configuration as that of the eleventh embodiment except that the torque calculation unit 19, based on the second relative angle $\Delta\theta_2$ output from the sensor calculation unit 180, calculates the steering torque Ts.

Hereinafter, components similar to those of the eleventh embodiment are denoted with the same reference numerals to appropriately omit the descriptions, and different components are described in details.

Figure 26:
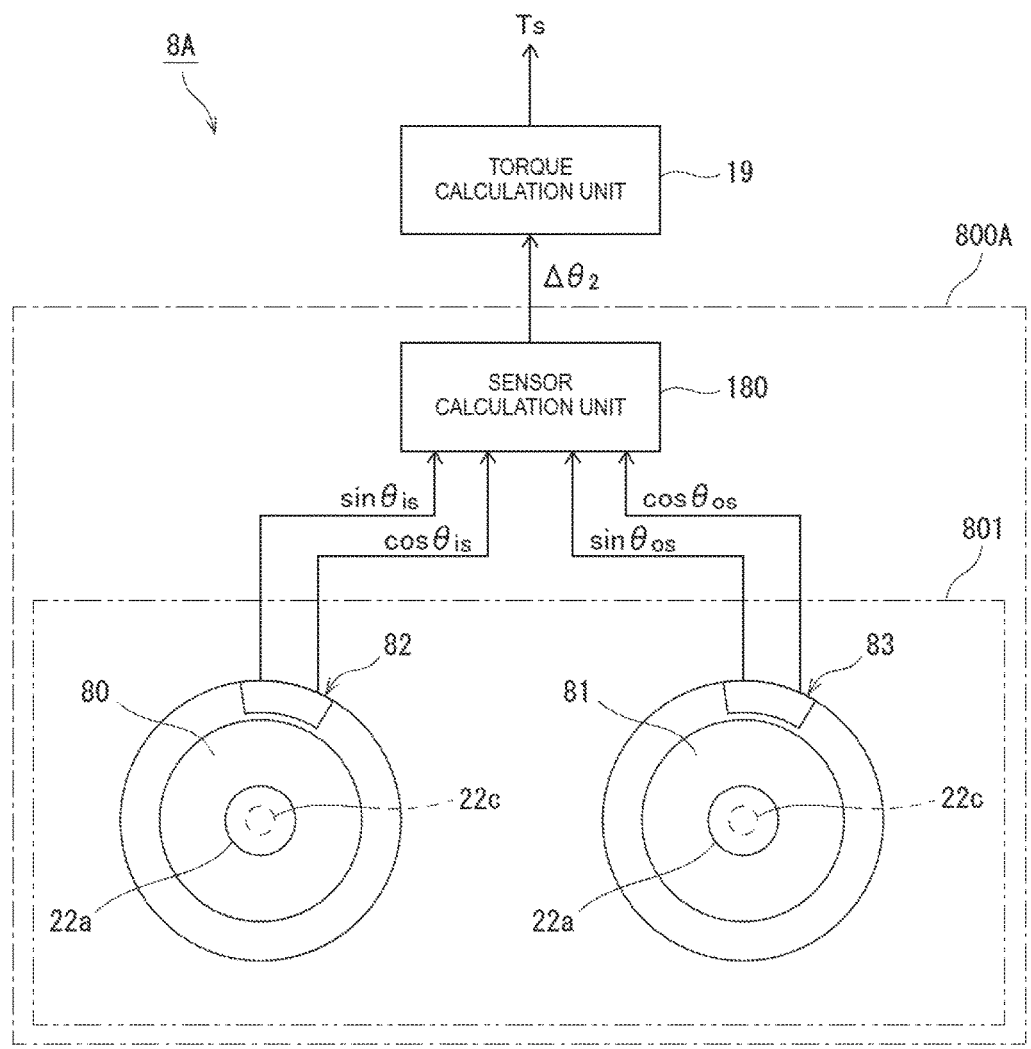
FIG. 26 is a drawing illustrating a configuration example of a twelfth torque sensor according to the twelfth embodiment of the present invention.

As illustrated in FIG. 26, a twelfth torque sensor 8A according to the twelfth embodiment includes a torque calculation unit 19 and a twelfth relative angle detection device 800A, and the twelfth relative angle detection device 800A includes the sixth sensor unit 801 and the sensor calculation unit 180.

In other words, the twelfth torque sensor 8A has the same configuration as that of the second torque sensor 1A of the second embodiment except for the inclusion of the sixth sensor unit 801 instead of the first sensor unit 101.

In the twelfth embodiment, the first sin signal sin θis, the first cos signal cos θis, the second sin signal sin θos and the second cos signal cos θos that are output from the seventh rotation angle sensor 82 and the eighth rotation angle sensor 83 are input to the second relative angle calculation unit 18A and the third relative angle calculation unit 18r in the sensor calculation unit 180.

As similar to the second embodiment, the second relative angle calculation unit 18A according to the twelfth embodiment, based on the first sin signal sin θis, the first cos signal cos θis, the second sin signal sin θos and the second cos signal cos θos that are input from the seventh rotation angle sensor 82 and the eighth rotation angle sensor 83, calculates the rotation angle θis of the input shaft 22a and the rotation angle θos of the output shaft 22b. Then, the second relative angle calculation unit, based on the difference value between the calculated rotation angle θis of the input shaft 22a and the rotation angle θos of the output shaft 22b, calculates the second relative angle $\Delta\theta_2$ as the relative angle between the input shaft 22a and the output shaft 22b. The calculated second relative angle $\Delta\theta_2$ is output to the torque calculation unit 19.

On the other hand, the third relative angle calculation unit 18r according to the twelfth embodiment, based on the first sin signal sin θis, the first cos signal cos θis, the second sin signal sin θos and the second cos signal cos θos that are input from the seventh rotation angle sensor 82 and the eighth rotation angle sensor 83, calculates the relative angle sine value sin $\Delta\theta$ and the relative angle cosine value cos $\Delta\theta$ in accordance with the above expressions (6) to (9). Further, the third relative angle calculation unit, based on the calculated relative angle sine value sin $\Delta\theta$ and the relative angle cosine value cos $\Delta\theta$, calculates the third relative angle $\Delta\theta$ref as the relative angle between the input shaft 22a and the output shaft 22b in accordance with the above expression (10).

As similar to the second embodiment, the abnormality determination unit 20 determines the abnormality based on the difference value between the third relative angle $\Delta\theta$ref calculated by the third relative angle calculation unit 18r and the second relative angle $\Delta\theta_2$ calculated by the second relative angle calculation unit 18A.

In the twelfth embodiment, the third target 80, i.e., the rotation angle θis of the input shaft 22a corresponds to the rotation angle $\theta_1$ in CLAIMS and the fourth target 81, i.e., the rotation angle θos of the output shaft 22b corresponds to the rotation angle $\theta_2$ in CLAIMS. The planar coils L1, L2, L3, and L4 correspond to the inductance elements in CLAIMS. Further, in the twelfth embodiment, the second relative angle $\Delta\theta_2$ corresponds to the first relative angle $\Delta\theta1$ in CLAIMS and the third relative angle $\Delta\theta$ref corresponds to the second relative angle $\Delta\theta2$ and the third relative angle $\Delta\theta$ref in CLAIMS.

(Effects of the Twelfth Embodiment)

The twelfth embodiment yields following effects in addition to the effects of the second embodiment.

The twelfth relative angle detection device 800A according to the twelfth embodiment includes the third target 80 having the ring-like third sinusoidal unit 80b having the axial width sinusoidally changing in the circumferential direction and configured to synchronously rotate with the input shaft 22a from between the coaxially arranged input shaft 22a and output shaft 22b. Further, the twelfth relative angle detection device includes the fourth target 81 having the ring-like fourth sinusoidal unit 81b having the axial width sinusoidally changing in the circumferential direction and configured to synchronously rotate with the output shaft 22b from between the input shaft 22a and the output shaft 22b. The twelfth relative angle detection device includes the seventh rotation angle sensor 82 including a plurality of inductance elements (planar coils L1 to L4) provided to a fixed side to face the third sinusoidal unit 80b with a predetermined gap therebetween, configured to detect the eddy current loss in accordance with the rotation angle θis of the third target 80, and output the first sin signal representing sin θis and the first cos signal representing cos θis. Further, the twelfth relative angle detection device includes the eighth rotation angle sensor 83 having a plurality of inductance elements (planar coils L1 to L4) provided to the fixed side to face the fourth sinusoidal unit 81b with a predetermined gap therebetween, configured to detect the eddy current loss in accordance with the rotation angle θos of the fourth target 81, and output the second sin signal representing sin θos and the second cos signal representing cos θos. The twelfth relative angle detection device includes the second relative angle calculation unit 18A configured to, based on the first sin signal sin θis and the first cos signal cos θis, calculate the rotation angle θis from θis=arctan(sin θis/cos θis), based on the second sin signal sin θos and the second cos signal cos θos, calculate the rotation angle θos from θos=arctan(sin θos/cos θos), and based on the difference value between the calculated rotation angle θis and the rotation angle θos, calculate the second relative angle $\Delta\theta_2$ as the relative angle between the input shaft 22a and the output shaft 22b.

With this configuration, it is possible to calculate both sin $\Delta\theta$ and cos $\Delta\theta$ and divide the calculated sin $\Delta\theta$ by cos $\Delta\theta$ to calculate the arctangent of the division value, and accordingly, the second relative angle $\Delta\theta_2$ can be calculated. This allows the calculation of the torque even at the helix angle region exceeding the linear portion of sin $\Delta\theta$. As a result, it is possible to handle the wider torque detection range. Further, even at the same torque detection range, the whole information on sin $\Delta\theta$ can be used, and thus, the resolution of the detected torque value can be enhanced. Since the second relative angle $\Delta\theta_2$ can be calculated by the small number of calculations, the more highly accurate torque value can be calculated.

In the twelfth relative angle detection device 800A according to the twelfth embodiment, the third target 80 includes the first cylindrical body 80a and the third sinusoidal unit 80b provided to the circumference surface of the first cylindrical body 80a and having a sinusoidally changing shape along the circumferential direction in a plan view of the circumference surface. The fourth target 81 includes the second cylindrical body 81a and the fourth sinusoidal unit 81b provided to the circumference surface of the second cylindrical body 81a and having a sinusoidally changing shape along the circumferential direction in a plan view of the circumference surface. The seventh rotation angle sensor 82 is provided to face the circumference surface of the third target 80 such that a plurality of inductance elements (planar coils L1 to L4) of the seventh rotation angle sensor 82 face the third sinusoidal unit 80b. Further, the eighth rotation angle sensor 83 is provided to face the circumference surface of the fourth target 81 such that a plurality of inductance elements (planar coils L1 to L4) of the eighth rotation angle sensor 83 face the fourth sinusoidal unit 81b.

With this configuration, even if there is an insufficient space relative to, for example, the target in the axial direction, the rotation angle sensor can be provided in the radially facing manner.

In the twelfth relative angle detection device 800A according to the twelfth embodiment, the seventh rotation angle sensor 82 and the eighth rotation angle sensor 83 are provided such that when the relative angle $\Delta\theta$ is 0°, the output of the seventh rotation angle sensor 82 and the output of the eighth rotation angle sensor 83 make the same phase. With this configuration, using the signals output from the seventh rotation angle sensor 82 and the eighth rotation angle sensor 83, the relative angle $\Delta\theta$ can be calculated easily and accurately.

The twelfth relative angle detection device 800A according to the twelfth embodiment includes: the third relative angle calculation unit 18r configured to, based on the first sin signal sin θis, the first cos signal cos θis, the second sin signal sin θos and the second cos signal cos θos, calculate sin $\Delta\theta$ and cos $\Delta\theta$ in accordance with the relative angle $\Delta\theta$ between the input shaft 22a and the output shaft 22b and calculate the third relative angle $\Delta\theta\text{ref}$ as the relative angle between the input shaft 22a and the output shaft 22b from $\Delta\theta\text{ref}=\arctan(\sin\Delta\theta/\cos\Delta\theta)$; and the abnormality determination unit 20 configured to determine the abnormality based on the difference value between the second relative angle $\Delta\theta_2$ calculated by the second relative angle calculation unit 18A and the third relative angle $\Delta\theta\text{ref}$ calculated by the third relative angle calculation unit 18r. With this configuration, the abnormality determination unit can detect the abnormality in the system, when the difference value between the second relative angle $\Delta\theta_2$ and the third relative angle $\Delta\theta\text{ref}$ calculated by a method different from that of the second relative angle $\Delta\theta_2$ is at or above the specified value set in advance.

Thirteenth Embodiment (Configuration)

The thirteenth embodiment of the present invention has a second sensor calculation unit 180' whose configuration is partially different instead of the sensor calculation unit 180 of the second embodiment, and the thirteenth embodiment has the same configuration as that of the second embodiment except that the torque calculation unit 19, based on the relative angle input from the second sensor calculation unit 180', calculates the steering torque Ts.

Hereinafter, components similar to those of the second embodiment are denoted with the same reference numerals to appropriately omit the descriptions, and different components are described in details.

While the second torque sensor 1A of the second embodiment includes the first relative angle detection device 100, an unillustrated thirteenth torque sensor 90 of the thirteenth embodiment includes a thirteenth relative angle detection device 102. While the second relative angle detection device 100A of the second embodiment includes the sensor calculation unit 180, the thirteenth relative angle detection device 102 of the thirteenth embodiment includes the second sensor calculation unit 180'.

Figure 27:
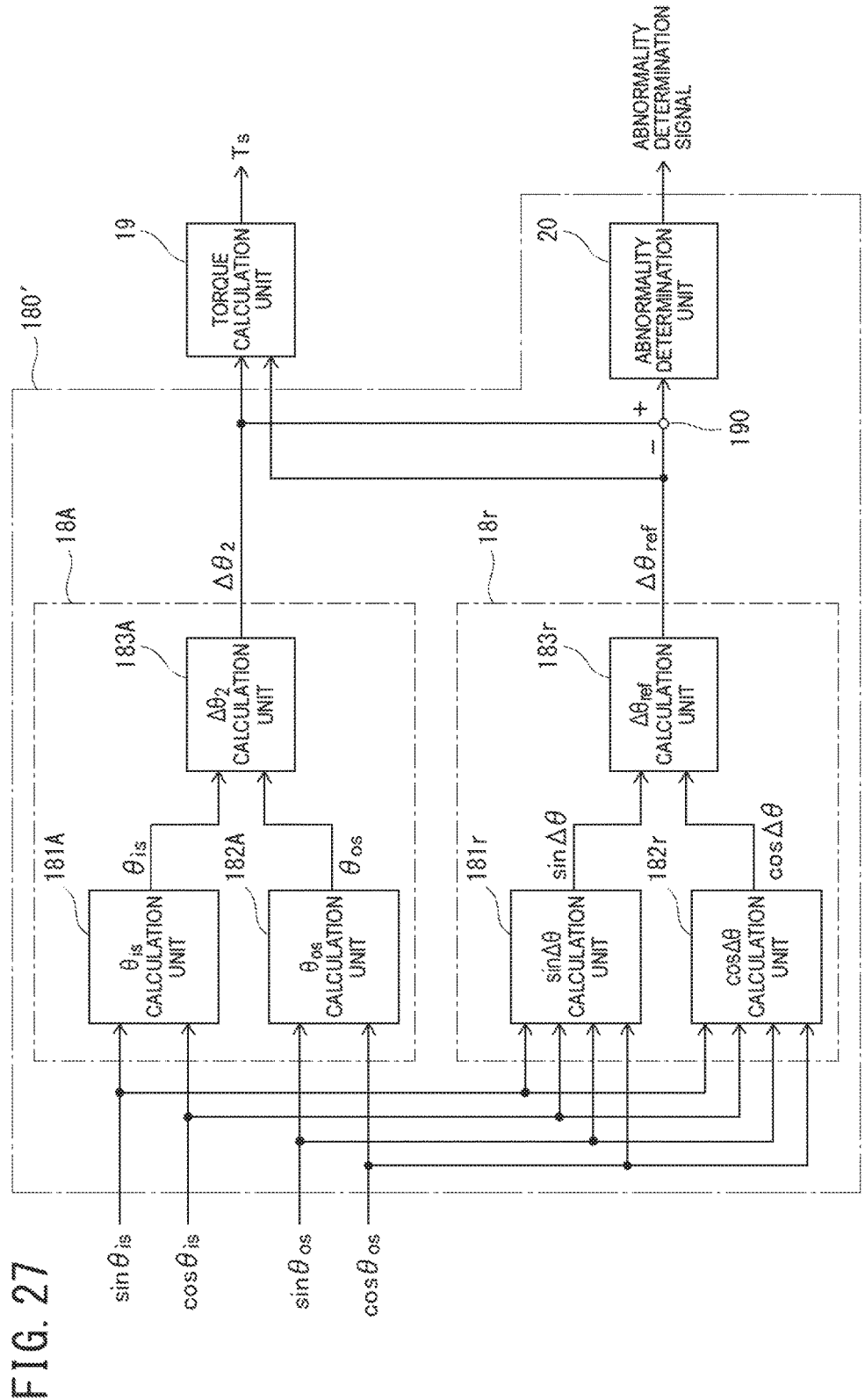
FIG. 27 is a block diagram illustrating a configuration example of a second sensor calculation unit according to a thirteenth embodiment of the present invention.

As illustrated in FIG. 27, the second sensor calculation unit 180' according to the thirteenth embodiment outputs the third relative angle $\Delta\theta\text{ref}$ calculated by the third relative angle calculation unit 18r, to the torque calculation unit 19 in addition to the first adder-subtracter 190. Other configurations except above are the same as those of the sensor calculation unit 180 of the second embodiment.

On the other hand, the torque calculation unit 19 according to the thirteenth embodiment, based on the second relative angle $\Delta\theta_2$ input from the second relative angle calculation unit 18A and the third relative angle $\Delta\theta\text{ref}$ input from the third relative angle calculation unit 18r, calculates the steering torque Ts. In other words, the torque calculation unit, based on the second relative angle $\Delta\theta_2$ and the third relative angle $\Delta\theta\text{ref}$ which are respectively calculated by different calculation methods, calculates the steering torque Ts. For example, the torque calculation unit calculates an average value $\Delta\theta\text{ave}$ of the second relative angle $\Delta\theta_2$ and the third relative angle $\Delta\theta\text{ref}$, and based on the calculated average value $\Delta\theta\text{ave}$, calculates the steering torque Ts.

In the thirteenth embodiment, the second relative angle $\Delta\theta_2$ corresponds to the first relative angle $\Delta\theta1$ in CLAIMS and Solution to Problem, and the third relative angle $\Delta\theta\text{ref}$ corresponds to the second relative angle $\Delta\theta2$ and the third relative angle $\Delta\theta\text{ref}$ in CLAIMS and Solution to Problem.

Configurations of the second sensor calculation unit 180' and the torque calculation unit 19 of the thirteenth embodiment are applicable to the second, the fourth, the sixth, the eighth, the tenth and the twelfth embodiments without limiting to the second embodiment.

(Effects of Thirteenth Embodiment)

The thirteenth embodiment yields following effects in addition to the effects of the second embodiment.

In the thirteenth relative angle detection device 102 of the thirteenth embodiment, the third relative angle calculation unit 18r outputs the calculated third relative angle Δθref to the torque calculation unit 19 in addition to the first adder-subtracter 190. The thirteenth torque sensor 90 according to the thirteenth embodiment, based on the second relative angle Δθ$_2$ input from the second relative angle calculation unit 18A and the third relative angle Δθref input from the third relative angle calculation unit 18r, calculates the steering torque Ts generated to the input shaft 22a and the output shaft 22b.

With this configuration, compared to a case of only using the second relative angle Δθ$_2$ as the relative angle, a highly accurate steering torque Ts can be calculated. For example, by calculating the average value Δθave of the second relative angle Δθ$_2$ and the third relative angle Δθref, the highly accurate relative angle can be calculated, and based on the average value Δθave, the more highly accurate steering torque Ts can be calculated.

Fourteenth Embodiment (Configuration)

The fourteenth embodiment of the present invention includes, instead of the sensor calculation unit 180 of the second embodiment, a third sensor calculation unit 180A whose configuration is partially different, and the fourteenth embodiment has the same configuration as that of the second embodiment except that the torque calculation unit 19, based on the relative angle input from the third sensor calculation unit 180A, calculates the steering torque Ts.

Hereinafter, components similar to those of the second embodiment are denoted with the same reference numerals to appropriately omit the descriptions, and different components are described in details.

A fourteenth torque sensor 91 of the fourteenth embodiment includes an unillustrated fourteenth relative angle detection device 103 while the second torque sensor 1A of the second embodiment includes the first relative angle detection device 100. The fourteenth relative angle detection device 103 of the fourteenth embodiment includes the third sensor calculation unit 180A while the second relative angle detection device 100A of the second embodiment includes the sensor calculation unit 180.

Figure 28:
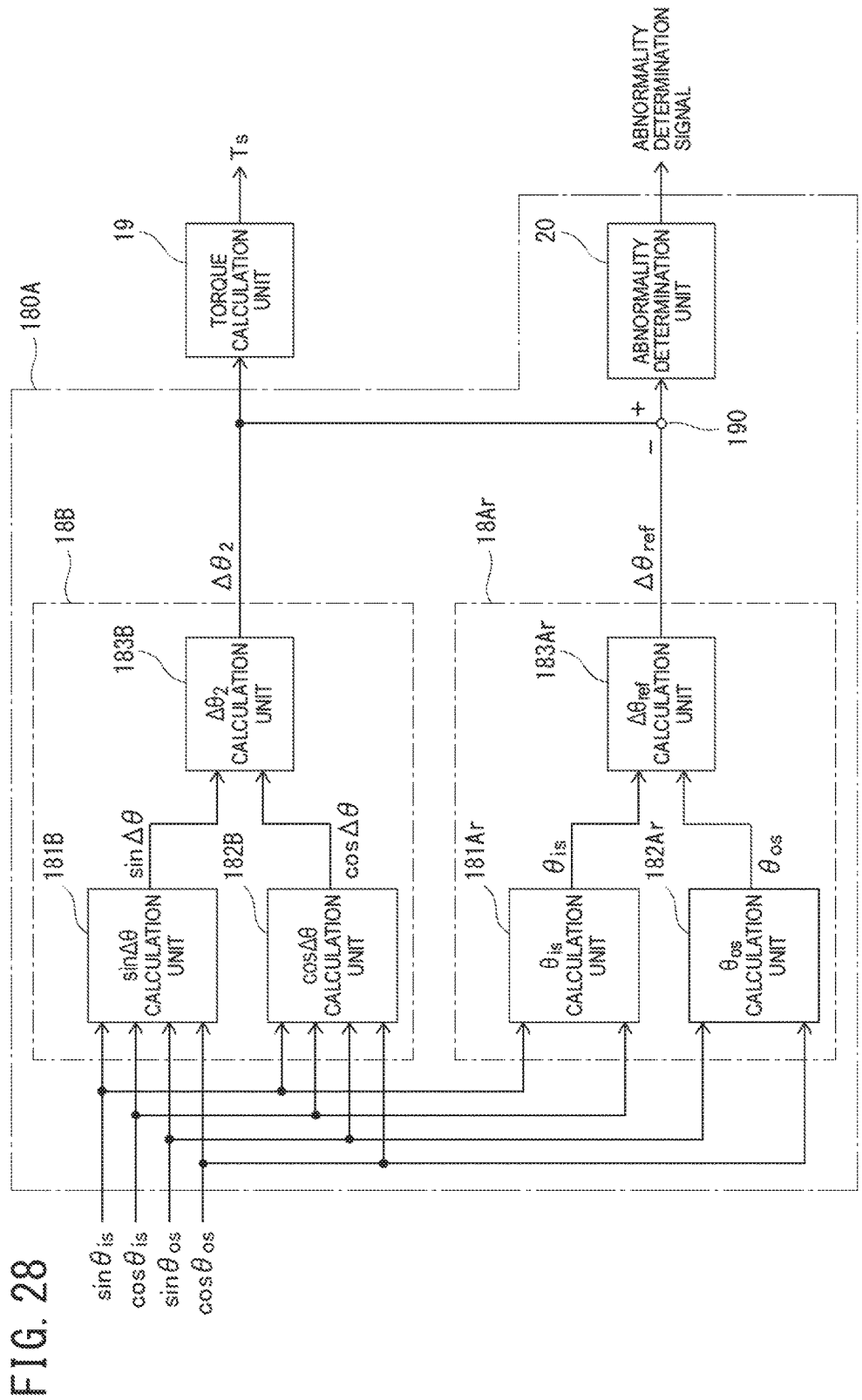
FIG. 28 is a block diagram illustrating a configuration example of a third sensor calculation unit according to a fourteenth embodiment of the present invention.

As illustrated in FIG. 28, the third sensor calculation unit 180A of the fourteenth embodiment includes a fourth relative angle calculation unit 18B and a fifth relative angle calculation unit 18Ar.

The fourth relative angle calculation unit 18B has the same configuration as that of the third relative angle calculation unit 18r of the second embodiment. Further, the fifth relative angle calculation unit 18Ar has the same configuration as that of the second relative angle calculation unit 18A of the second embodiment.

Specifically, as illustrated in FIG. 28, the fourth relative angle calculation unit 18B includes a relative angle sine value (sin Δθ in drawing) calculation unit 181B, a relative angle cosine value (cos Δθ in drawing) calculation unit 182B, and a second relative angle (Δθ$_2$ in drawing) calculation unit 183B. When, for example, the steering wheel 21 is steered and the input shaft 22a is rotated, and if it is assumed that the rotation angle θos of the output shaft 22b is fixed to a predetermined angle, and the rotation angle θis of the input shaft 22a changes, using the second relative angle Δθ$_2$ as the relative angle between the input shaft 22a and the output shaft 22b, followings can be represented: sin θis=sin(θos+Δθ$_2$) and cos θis=cos(θos+Δθ$_2$).

Accordingly, as similar to the relative angle sine value calculation unit 181r of the second embodiment, the relative angle sine value calculation unit 181B calculates the relative angle sine value sin Δθ in accordance with the above expressions (6) and (7). In the above expression (6), Δθref is replaced to Δθ$_2$.

Specifically, the relative angle sine value calculation unit 181B, in accordance with the above expression (6), adds cos(θos+Δθ$_2$) as the input first cos signal cos θis to the second input sin signal sin θos and squares the added value. Further, sin(θos+Δθ$_2$) as the input first sin signal sin θis is subtracted from the input second cos signal cos θos and then the subtraction value is squared. By summing the calculated square values, TMs is calculated. Next, in accordance with the above expression (7), the calculated TMs is divided by 2 to subtract the division value from 1, and accordingly, the relative angle sine value sin Δθ can be calculated. The calculated relative angle sine value sin Δθ is output to the second relative angle calculation unit 183B.

The relative angle cosine value calculation unit 182B, in accordance with the above expressions (8) and (9), calculates the relative angle cosine value cos Δθ. In the above expression (8), Δθref is replaced to Δθ$_2$.

Specifically, the relative angle cosine value calculation unit 182B, in accordance with the above expression (8), adds sin(θos+Δθ$_2$) as the input first sin signal sin θis to the input second sin signal sin θos and squares the added value. Further, cos(θos+Δθ$_2$) as the input first cos signal cos θis is added to the input second cos signal cos θos and the added value is squared. By summing the calculated square values, TMc is calculated. Next, in accordance with the above expression (9), the calculated TMc is divided by 2 and 1 is subtracted from the division value to calculate the relative angle cosine value cos Δθ. The calculated relative angle cosine value cos Δθ is output to the second relative angle calculation unit 183B.

The second relative angle calculation unit 183B, in accordance with the above expression (10), calculates the second relative angle Δθ$_2$. In the above expression (10), Δθref is replaced to Δθ$_2$.

Specifically, the second relative angle calculation unit 183B, based on the relative angle sine value sin Δθ input from the relative angle sine value calculation unit 181B and the relative angle cosine value cos Δθ input from the relative angle cosine value calculation unit 182B, in accordance with the above expression (10), divides the relative angle sine value sin Δθ by the relative angle cosine value cos Δθ and calculates the arctangent function of the division value so as to calculate the second relative angle Δθ$_2$ as the relative angle between the input shaft 22a and the output shaft 22b. The calculated second relative angle Δθ$_2$ is output to the torque calculation unit 19 and also to the first adder-subtracter 190.

The torque calculation unit 19 of the fourteenth embodiment, based on the second relative angle Δθ$_2$ input from the fourth relative angle calculation unit 18B, calculates the steering torque Ts.

On the other hand, as illustrated in FIG. 28, the fifth relative angle calculation unit 18Ar of the fourteenth embodiment includes an input shaft rotation angle (θis in drawing) calculation unit 181Ar, an output shaft rotation angle (θos in drawing) calculation unit 182Ar, and a third relative angle (Δθref in drawing) calculation unit 183Ar.

The input shaft rotation angle calculation unit 181Ar divides the input first sin signal sin θis by the first cos signal cos θis to calculate the arctangent function of the division value, and based on the arctangent function of the division value, i.e., θis=arctan(sin θis/cos θis), calculates the rotation angle θis of the input shaft 22*a*. The calculated rotation angle θis is output to the third relative angle calculation unit 183Ar.

The output shaft rotation angle calculation unit 182Ar divides the input second sin signal sin θos by the second cos signal cos θos to calculate the arctangent function of the division value, and based on the arctangent function of the division value, i.e., θos=arctan(sin θos/cos θos), calculates the rotation angle θos of the output shaft 22*b*. The calculated rotation angle θos is output to the third relative angle calculation unit 183Ar.

The third relative angle calculation unit 183Ar subtracts, from the rotation angle θis of the input shaft 22*a*, the rotation angle θos of the output shaft 22*b* to calculate the difference value, and based on the difference value, calculates the third relative angle Δθref as the relative angle between the input shaft 22*a* and the output shaft 22*b*. The calculated third relative angle Δθref is output to the first adder-subtracter 190.

The first adder-subtracter 190 of the fourteenth embodiment calculates the difference value between the second relative angle $\Delta\theta_2$ calculated by the second relative angle calculation unit 183B and the third relative angle Δθref calculated by the third relative angle calculation unit 183Ar. The calculated difference value is output to the abnormality determination unit 20.

When the absolute value of the difference value between the second relative angle $\Delta\theta_2$ and the third relative angle Δθref is at or above the specified value set in advance, the abnormality determination unit 20 of the fourteenth embodiment determines that the abnormality is present in the relative angle detection device.

In the fourteenth embodiment, the second relative angle $\Delta\theta_2$ corresponds to the second relative angle Δθ2 in CLAIMS and Solution to Problem, and the third relative angle Δθref corresponds to the first relative angle Δθ1 and the third relative angle Δθref in CLAIMS and Solution to Problem.

Configurations of the third sensor calculation unit 180A and the torque calculation unit 19 of the fourteenth embodiment are applicable to the second, the fourth, the sixth, the eighth, the tenth and the twelfth embodiments without limiting to the second embodiment.

(Effects of Fourteenth Embodiment)

The fourteenth embodiment yields following effects in addition to the effects of the second embodiment.

The fourteenth relative angle detection device 103 according to the fourteenth embodiment includes the fourth relative angle calculation unit 18B configured to, based on the first sin signal sin θis, the first cos signal cos θis, the second sin signal sin θos and the second cos signal cos θos, calculate sin Δθ and cos Δθ in accordance with the relative angle Δθ between the input shaft 22*a* and the output shaft 22*b*, and calculate the second relative angle $\Delta\theta_2$ based on Δθ=arctan (sin Δθ/cos Δθ).

The fourteenth torque sensor 91 according to the eighth embodiment, based on the second relative angle $\Delta\theta_2$ calculated by the fourth relative angle calculation unit 18B, calculates the steering torque Ts generated to the input shaft 22*a* and the output shaft 22*b*.

With this configuration, it is possible to calculate the torque even at the helix angle region exceeding the linear portion of sin Δθ. As a result, it is possible to handle the wider torque detection range. Further, even at the same torque detection range, the whole information on sin Δθ can be used, and thus, the resolution of the detected torque value can be enhanced. Since the second relative angle $\Delta\theta_2$ can be calculated by the small number of calculations, the more highly accurate torque value can be calculated.

The fourteenth relative angle detection device 103 of the fourteenth embodiment includes the fifth relative angle calculation unit 18Ar configured to, based on the first sin signal sin θis and the first cos signal cos θis, calculate the rotation angle θis from θis=arctan(sin θis/cos θis), based on the second sin signal sin θos and the second cos signal cos θos, calculate the rotation angle θos from θos=arctan(sin θos/cos θos), and based on the difference value between the rotation angle θis and the rotation angle θos, calculate the third relative angle Δθref between the input shaft 22*a* and the output shaft 22*b*. Additionally, the fourteenth relative angle detection device includes the abnormality determination unit 20 configured to determine the abnormality based on the difference value between the second relative angle $\Delta\theta_2$ calculated by the fourth relative angle calculation unit 18B and the third relative angle Δθref calculated by the fifth relative angle calculation unit 18Ar.

With this configuration, the abnormality determination unit can detect the abnormality in the system when the difference value between the second relative angle $\Delta\theta_2$ and the third relative angle Δθref calculated by a method different from that of the second relative angle $\Delta\theta_2$ is at or above the specified value set in advance.

Fifteenth Embodiment (Configuration)

The fifteenth embodiment of the present invention has a fourth sensor calculation unit 180A' whose configuration is partially different, instead of the third sensor calculation unit 180A of the fourteenth embodiment, and the fifteenth embodiment has the same configuration as that of the fourteenth embodiment except that the torque calculation unit 19, based on the relative angle input from the fourth sensor calculation unit 180A', calculates the steering torque Ts.

Hereinafter, components similar to those of the fourteenth embodiment are denoted with the same reference numerals to appropriately omit the descriptions, and different components are described in details.

An unillustrated fifteenth torque sensor 92 of the fifteenth embodiment includes a fifteenth relative angle detection device 104 while the fourteenth torque sensor 91 of the fourteenth embodiment includes the fourteenth relative angle detection device 103. The fifteenth relative angle detection device 104 of the fifteenth embodiment includes the fourth sensor calculation unit 180A' while the fourteenth relative angle detection device 103 of the fourteenth embodiment includes the third sensor calculation unit 180A.

Figure 29:
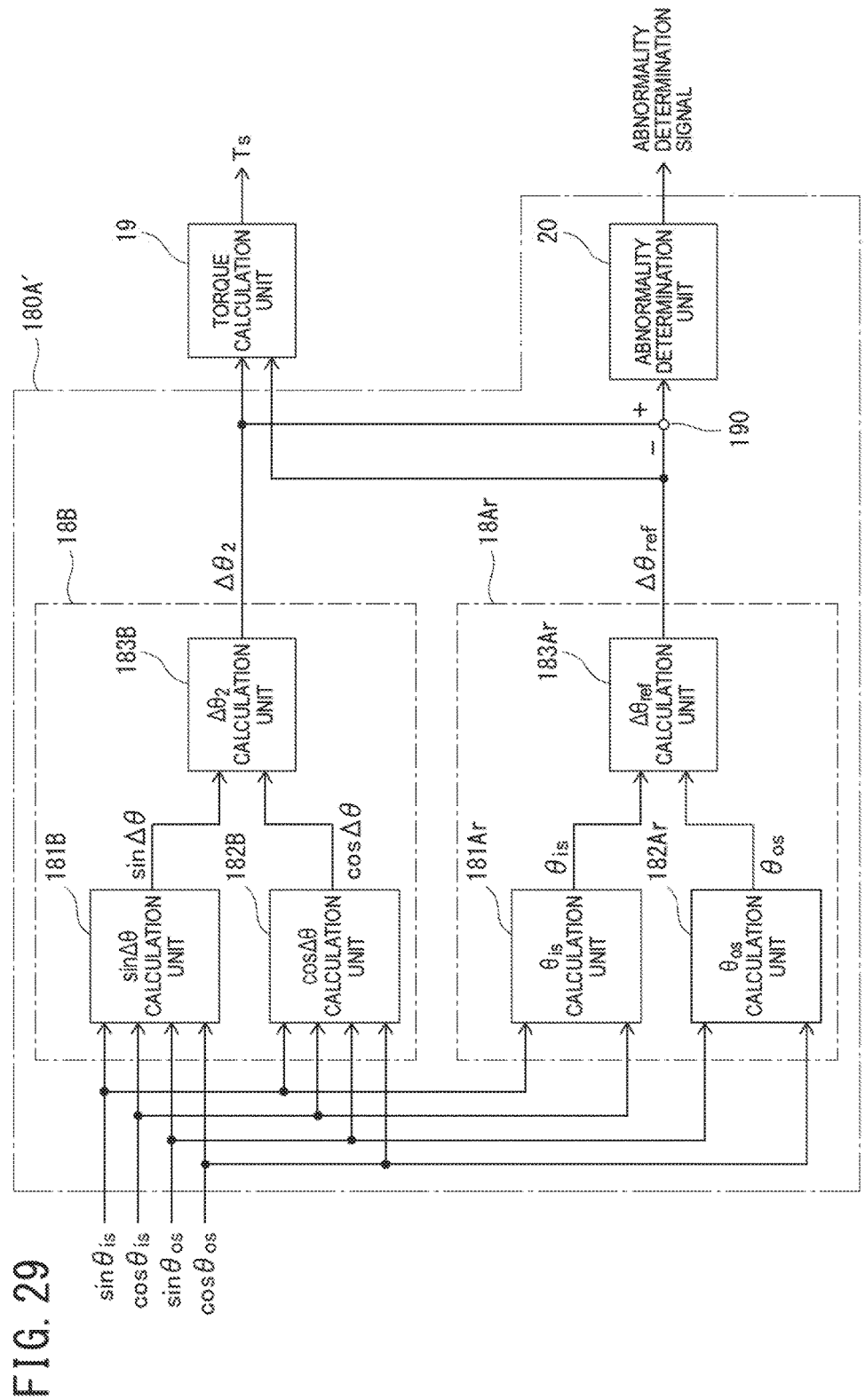
FIG. 29 is a block diagram illustrating a configuration example of a fourth sensor calculation unit of a fifteenth embodiment of the present invention.

As illustrated in FIG. 29, the fourth sensor calculation unit 180A' of the fifteenth embodiment outputs, the third relative angle Δθref calculated by the fifth relative angle calculation unit 18Ar, to the first adder-subtracter 190 and also to the torque calculation unit 19. Other configurations except above are the same as those of the third sensor calculation unit 180A of the fourteenth embodiment.

On the other hand, the torque calculation unit 19 of the fifteenth embodiment, based on the second relative angle $\Delta\theta_2$ input from the fourth relative angle calculation unit 18B and the third relative angle Δθref input from the fifth relative angle calculation unit 18Ar, calculates the steering torque Ts. In other words, the steering torque Ts is calculated from the second relative angle $\Delta\theta_2$ and the third relative angle Δθref which are respectively calculated by different calculation methods. For example, the average value Δθave of the second relative angle $\Delta\theta_2$ and the third relative angle $\Delta\theta$ref is calculated, and based on the average value $\Delta\theta$ave, the steering torque Ts is calculated.

In the fifteenth embodiment, the second relative angle $\Delta\theta_2$ corresponds to the second relative angle $\Delta\theta2$ in CLAIMS and Solution to Problem and the third relative angle $\Delta\theta$ref corresponds to the first relative angle $\Delta\theta1$ and the third relative angle $\Delta\theta$ref in CLAIMS and Solution to Problem. Configurations of the fourth sensor calculation unit 180A' and the torque calculation unit 19 of the fifteenth embodiment are applicable to the second, the fourth, the sixth, the eighth, the tenth and the twelfth embodiments without limiting to the second embodiment.

(Effects of Fifteenth Embodiment)

The fifteenth embodiment yields following effects in addition to the effects of the fourteenth embodiment. In the fifteenth relative angle detection device 104 of the fifteenth embodiment, the third relative angle $\Delta\theta$ref calculated by the fifth relative angle calculation unit 18Ar is output to the first adder-subtracter 190 and also to the torque calculation unit 19. The fifteenth torque sensor 92 according to the fifteenth embodiment, based on the second relative angle $\Delta\theta_2$ input from the second relative angle calculation unit 18A and the third relative angle $\Delta\theta$ref input from the third relative angle calculation unit 18r, calculates the steering torque Ts generated to the input shaft 22a and the output shaft 22b.

With this configuration, compared to a case of only using the second relative angle $\Delta\theta_2$ as the relative angle, the highly accurate steering torque Ts can be calculated. For example, by calculating the average value $\Delta\theta$ave of the second relative angle $\Delta\theta_2$ and the third relative angle $\Delta\theta$ref, the more highly accurate relative angle can be calculated, and based on the average value $\Delta\theta$ave, the more highly accurate steering torque Ts can be calculated.

Sixteenth Embodiment (Configuration)

The sixteenth embodiment of the present invention has a fifth sensor calculation unit 180B whose configuration is partially different, instead of the sensor calculation unit 180 of the second embodiment, and the sixteenth embodiment has the same configuration as that of the second embodiment except that the torque calculation unit 19, based on the relative angle input from the fifth sensor calculation unit 180B, calculates the steering torque Ts.

Hereinafter, components similar to those of the second embodiment are denoted with the same reference numerals to appropriately omit the descriptions, and different components are described in details.

A sixteenth torque sensor 93 of the sixteenth embodiment includes a sixteenth relative angle detection device 105 (not illustrated in drawings), while the second torque sensor 1A of the second embodiment includes the second relative angle detection device 100A. The sixteenth relative angle detection device 105 of the sixteenth embodiment includes the fifth sensor calculation unit 180B while the second relative angle detection device 100A of the second embodiment includes the sensor calculation unit 180.

Figure 30:
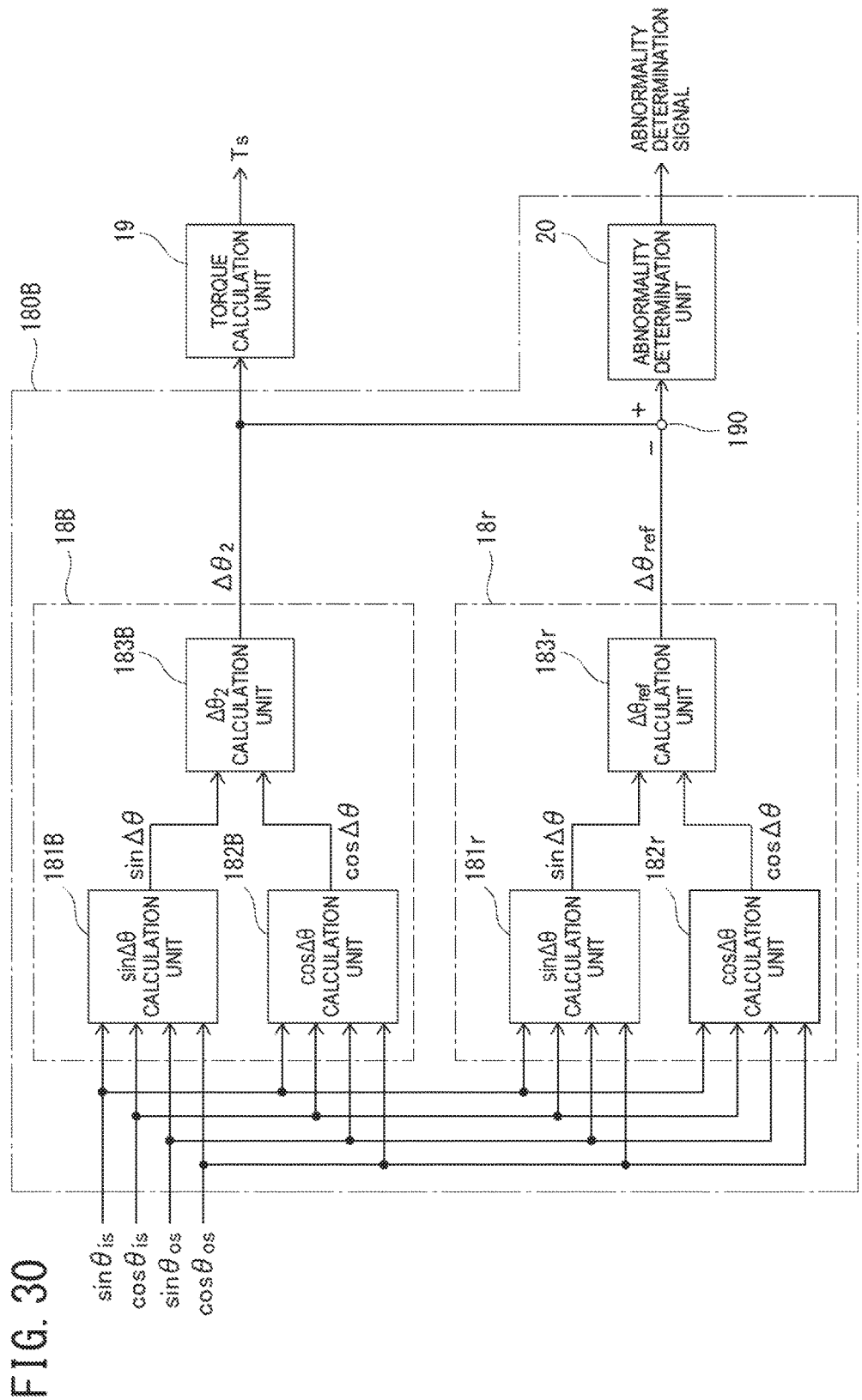
FIG. 30 is a block diagram illustrating a configuration example of a fifth sensor calculation unit according to a sixteenth embodiment of the present invention.

As illustrated in FIG. 30, the fifth sensor calculation unit 180B of the sixteenth embodiment includes the fourth relative angle calculation unit 18B of the fourteenth embodiment and the third relative angle calculation unit 18r of the second embodiment.

As similar to the fourteenth embodiment, the fourth relative angle calculation unit 18B of the sixteenth embodiment, based on the input first sin signal sin $\theta$is, the first cos signal cos $\theta$is, the second sin signal sin $\theta$os and the second cos signal cos $\theta$os, calculates the relative angle sine value sin $\Delta\theta$ and the relative angle cosine value cos $\Delta\theta$ in accordance with the above expressions (6) to (9) in which $\Delta\theta$ref is replace to $\Delta\theta$. Further, based on the calculated relative angle sine value sin $\Delta\theta$ and the relative angle cosine value cos $\Delta\theta$, the second relative angle $\Delta\theta_2$ is calculated in accordance with the above expression (10) in which $\Delta\theta$ref is replaced to $\Delta\theta_2$. The calculated second relative angle $\Delta\theta_2$ is output to the torque calculation unit 19 and the first adder-subtracter 190.

The torque calculation unit 19 of the sixteenth embodiment, based on the second relative angle $\Delta\theta_2$ input from the fourth relative angle calculation unit 18B, calculates the steering torque Ts.

On the other hand, as similar to the second embodiment, the third relative angle calculation unit 18r of the sixteenth embodiment, based on the input first sin signal sin $\theta$is, the first cos signal cos $\theta$is, the second sin signal sin $\theta$os and the second cos signal cos $\theta$os, calculates the relative angle sine value sin $\Delta\theta$ and the relative angle cosine value cos $\Delta\theta$ in accordance with the above expressions (6) to (9). Further, from the calculated relative angle sine value sin $\Delta\theta$ and the relative angle cosine value cos $\Delta\theta$, in accordance with the above expression (10), the third relative angle $\Delta\theta$ref is calculated. The calculated third relative angle $\Delta\theta$ref is output to the first adder-subtracter 190.

The first adder-subtracter 190 of the sixteenth embodiment calculates the difference value between the second relative angle $\Delta\theta_2$ calculated by the second relative angle calculation unit 183B and the third relative angle $\Delta\theta$ref calculated by the third relative angle calculation unit 183r. The calculated difference value is output to the abnormality determination unit 20.

The abnormality determination unit 20 of the sixteenth embodiment determines that the abnormality is present in the relative angle detection device when the absolute value of the difference value between the second relative angle $\Delta\theta_2$ and the third relative angle $\Delta\theta$ref is at or above the specified value set in advance.

In the sixteenth embodiment, the third relative angle $\Delta\theta$ref corresponds to any one of a plurality of second relative angles $\Delta\theta2$ and the third relative angle $\Delta\theta$ref in CLAIMS and Solution to Problem. Further, the second relative angle $\Delta\theta_2$ corresponds to the remaining second relative angles $\Delta\theta2$ among the plurality of second relative angle $\Delta\theta2$ in CLAIMS and Solution to Problem.

Configurations of the fifth sensor calculation unit 180B and the torque calculation unit 19 of the sixteenth embodiment are applicable to the second, the fourth sixth, the eighth, the tenth and the twelfth embodiments without limiting to the second embodiment.

(Effects of Sixteenth Embodiment)

The sixteenth embodiment yields following effects in addition to the effects of the second embodiment.

The sixteenth relative angle detection device 105 of the sixteenth embodiment includes: the first multipolar ring magnet 10 having different magnetic poles alternately and equally distributed in the circumferential direction and configured to synchronously rotate with the input shaft 22a from between the coaxially arranged input shaft 22a and output shaft 22b; the second multipolar ring magnet 11 having different magnetic poles alternately and equally distributed in the circumferential direction and configured to synchronously rotate with the output shaft 22b from between the input shaft 22a and the output shaft 22b; the first rotation angle sensor 12 configured to detect the magnetic flux in accordance with the rotation angle $\theta$is of the first multipolar ring magnet 10 and output the first sin signal sin θis and the first cos signal cos θis: the second rotation angle sensor 13 configured to detect the magnetic flux in accordance with the rotation angle θos of the second multipolar ring magnet 11 and output the second sin signal sin θos and the second cos signal cos θos; and the fourth relative angle calculation unit 18B configured to, based on the first sin signal sin θis, the first cos signal cos θis, the second sin signal sin θos and the second cos signal cos θos, calculate sin Δθ and cos Δθ in accordance with the relative angle Δθ between the input shaft 22a and the output shaft 22b and calculate the second relative angle $\Delta\theta_2$ from Δθ=arctan(sin Δθ/cos Δθ).

With this configuration, it is possible to divide the first sin signal sin θis by the first cos signal cos θis and calculate the arctangent function of the division value to calculate the rotation angle θis; divide the second sin signal sin θos by the second cos signal cos θos and calculate the arctangent function of the division value to calculate the rotation angle θos; and based on the difference value between the calculated rotation angle θis and the rotation angle θos, calculate the second relative angle $\Delta\theta_2$ as the relative angle between the input shaft 22a and the output shaft 22b. This allows the calculation of the torque even at the helix angle region exceeding the linear portion of sin Δθ. As a result, it is possible to handle the wider torque detection range. Further, even at the same torque detection range, the whole information on sin Δθ can be used, and thus, the resolution of the detected torque value can be enhanced. Further, since the second relative angle $\Delta\theta_2$ can be calculated by the small number of calculations, the more highly accurate torque value can be calculated.

The sixteenth relative angle detection device 105 of the sixteenth embodiment includes: the third relative angle calculation unit 18r configured to, based on the first sin signal sin θis, the first cos signal cos θis, the second sin signal sin θos and the second cos signal cos θos, calculate sin Δθ and cos Δθ in accordance with the relative angle Δθ between the input shaft 22a and the output shaft 22b and calculate the third relative angle Δθref from Δθref=arctan (sin Δθ/cos Δθ); and the abnormality determination unit 20 configured to determine the abnormality based on the difference value between the second relative angle $\Delta\theta_2$ calculated by the fourth relative angle calculation unit 18B and the third relative angle Δθref calculated by the third relative angle calculation unit 18r.

With this configuration, the abnormality determination unit can detect the abnormality in the system when the difference value between the second relative angle $\Delta\theta_2$ and the third relative angle Δθref calculated by a method same as that of the second relative angle $\Delta\theta_2$ is at or above the specified value set in advance. This allows the reduction in errors which are caused by different calculation methods.

In the sixteenth relative angle detection device 105 of the sixteenth embodiment, the third relative angle calculation unit 18r and the fourth relative angle calculation unit 18B, in accordance with the above expressions (6) and (7), calculate the relative angle sine value sin Δθ and in accordance with the above expressions (8) and (9), calculate the relative angle cosine value cos Δθ. With this configuration, using the signals output from the first rotation angle sensor 12 and the second rotation angle sensor 13, the relative angle sine value sin Δθ and the relative angle cosine value cos Δθ can be calculated easily and accurately.

The sixteenth torque sensor 93 according to the sixteenth embodiment includes: the sixteenth relative angle detection device 105 of the sixteenth embodiment configured to detect the second relative angle $\Delta\theta_2$ between the input shaft 22a and the output shaft 22b connected via the torsion bar 22c; and the torque calculation unit 19 configured to, based on the second relative angle $\Delta\theta_2$, calculate the steering torque Ts generated to the input shaft 22a and the output shaft 22b. With this configuration, functions and effects similar to those of the sixteenth relative angle detection device 105 can be obtained.

Seventeenth Embodiment (Configuration)

The seventeenth embodiment of the present invention has a sixth sensor calculation unit 180B' whose configuration is partially different instead of the fifth sensor calculation unit 180B of the sixteenth embodiment, and the seventeenth embodiment has the same configuration as that of the sixteenth embodiment except that the torque calculation unit 19, based on the relative angle input from the sixth sensor calculation unit 180B', calculates the steering torque Ts.

Hereinafter, components similar to those of the sixteenth embodiment are denoted with the same reference numerals to appropriately omit the descriptions, and different components are described in details.

A seventeenth torque sensor 94 of the seventeenth embodiment includes a seventeenth relative angle detection device 106 (not illustrated in drawings) while the sixteenth torque sensor 93 of the sixteenth embodiment includes the sixteenth relative angle detection device 105. The seventeenth relative angle detection device 106 of the seventeenth embodiment includes the sixth sensor calculation unit 180B' while the sixteenth relative angle detection device 105 of the sixteenth embodiment includes the fifth sensor calculation unit 180B.

Figure 31:
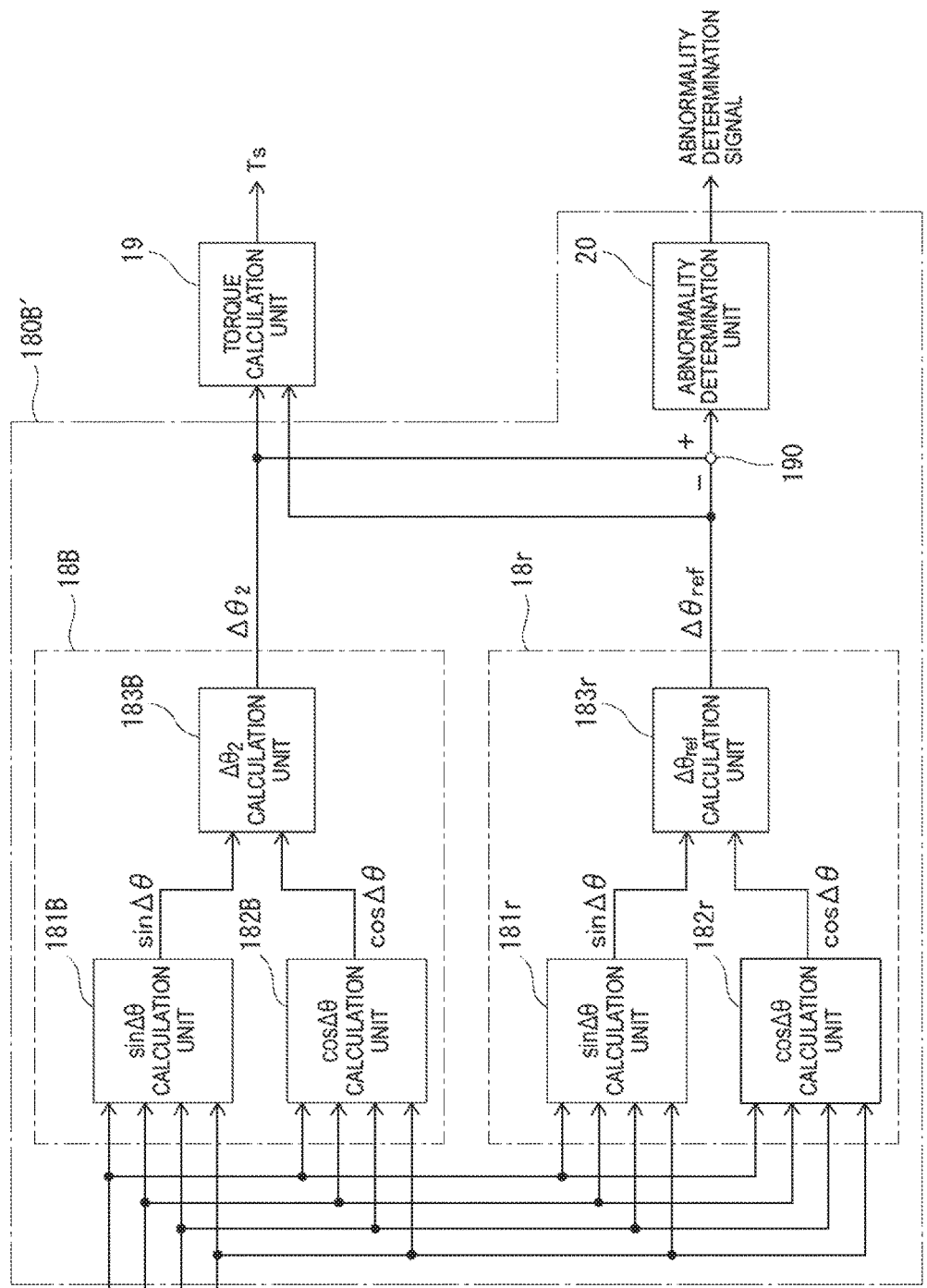
FIG. 31 is a block diagram illustrating a configuration example of a sixth sensor calculation unit according to a seventeenth embodiment of the present invention.

As illustrated in FIG. 31, the sixth sensor calculation unit 180B' of the seventeenth embodiment outputs the third relative angle Δθref calculated by the third relative angle calculation unit 18r to the first adder-subtracter 190 and also to the torque calculation unit 19. Other configurations except above are the same as those of the fifth sensor calculation unit 180B of the sixteenth embodiment.

On the other hand, the torque calculation unit 19 of the seventeenth embodiment, based on the second relative angle $\Delta\theta_2$ input from the fourth relative angle calculation unit 18B and the third relative angle Δθref input from the third relative angle calculation unit 18r, calculates the steering torque Ts. In other words, from the second relative angle $\Delta\theta_2$ and the third relative angle Δθref which are respectively calculated by the same calculation method, the steering torque Ts is calculated. For example, the average value Δθave of the second relative angle $\Delta\theta_2$ and the third relative angle Δθref is calculated, and from the average value Δθave, the steering torque Ts is calculated.

In the seventeenth embodiment, the third relative angle Δθref corresponds to any one of second relative angle Δθ2 among a plurality of second relative angles Δθ2, and the third relative angle Δθref in CLAIMS and Solution to Problem. Further, the second relative angle $\Delta\theta_2$ corresponds to the remaining second relative angles Δθ2 among a plurality of second relative angles Δθ2 in CLAIMS and Solution to Problem.

Configurations of the sixth sensor calculation unit 180B' and the torque calculation unit 19 of the seventeenth embodiment are applicable to the second, the fourth sixth, the eighth, the tenth and the twelfth embodiments without limiting to the second embodiment.

(Effects of Seventeenth Embodiment)

The seventeenth embodiment yields following effects in addition to the effects of the sixteenth embodiment.

In the seventeenth relative angle detection device 106 of the seventeenth embodiment, the third relative angle calculation unit 18r outputs, the calculated third relative angle Δθref to the first adder-subtracter 190 and also to the torque calculation unit 19. The seventeenth torque sensor 94 detects the second relative angle Δθ$_2$ between the input shaft 22a and the output shaft 22b connected via the torsion bar 22c, and the third relative angle Δθref, and based on the detected second relative angle Δθ$_2$ and the third relative angle Δθref, calculates the steering torque Ts generated to the input shaft 22a and the output shaft 22b.

With this configuration, compared to a case of only using the second relative angle Δθ$_2$ as the relative angle, the highly accurate steering torque Ts can be calculated. For example, by calculating the average value Δθave of the second relative angle Δθ$_2$ and the third relative angle Δθref, the more highly accurate relative angle can be calculated and based on the average value Δθave, the more highly accurate steering torque Ts can be calculated.

Eighteenth Embodiment (Configuration)

The eighteenth embodiment of the present invention has a seventh sensor calculation unit 180C whose configuration is partially different instead of the sensor calculation unit 180 of the second embodiment, and the eighteenth embodiment has the same configuration as that of the second embodiment except that the torque calculation unit 19, based on the relative angle input from the seventh sensor calculation unit 180C, calculates the steering torque Ts.

Hereinafter, components similar to those of the second embodiment are denoted with the same reference numerals to appropriately omit the descriptions, and different components are described in details.

An eighteenth torque sensor 95 of the eighteenth embodiment includes an eighteenth relative angle detection device 107 (not illustrated in drawing) while the second torque sensor 1A of the second embodiment includes the second relative angle detection device 100A. The eighteenth relative angle detection device 107 of the eighteenth embodiment includes the seventh sensor calculation unit 180C while the second relative angle detection device 100A of the second embodiment includes the sensor calculation unit 180.

Figure 32:
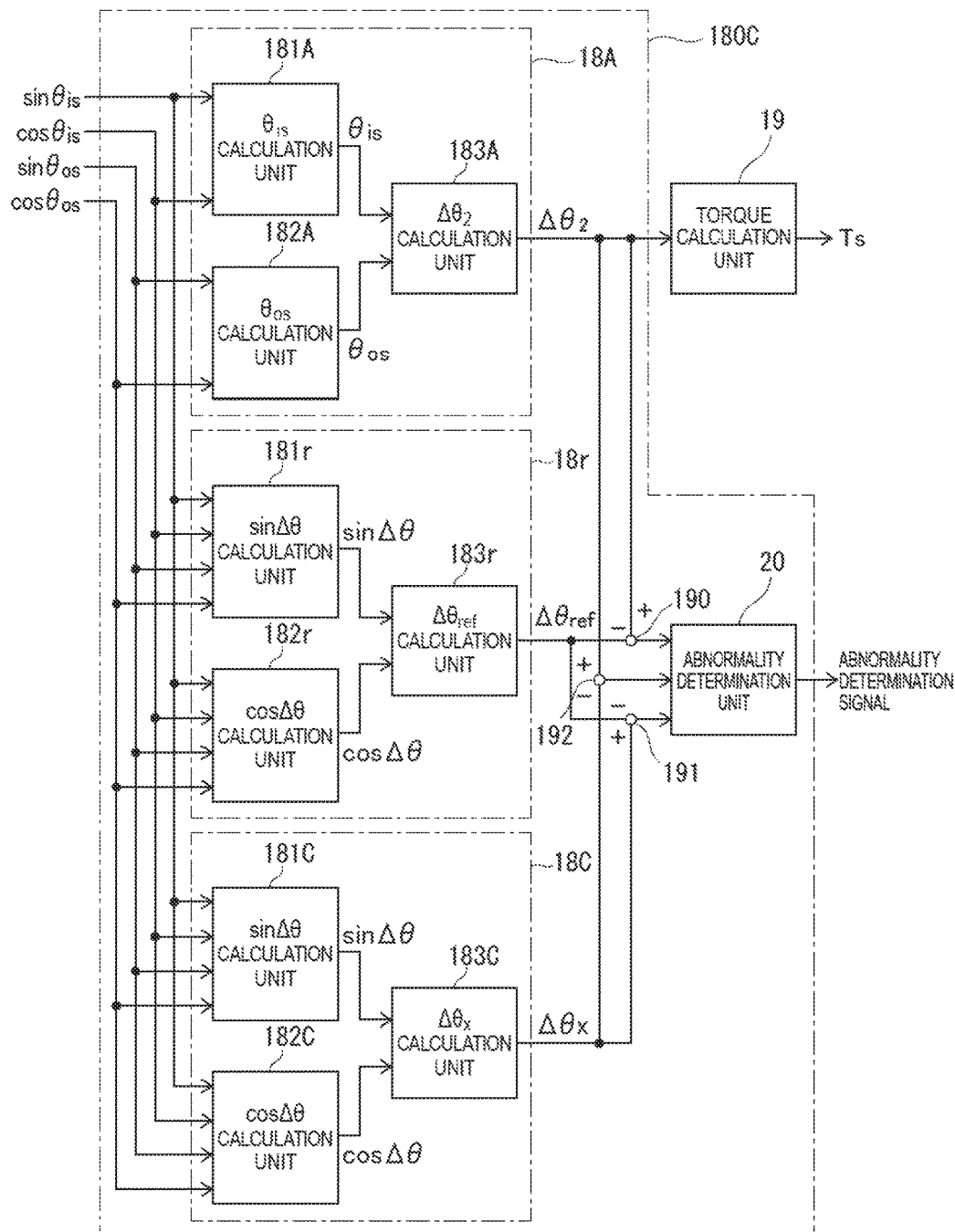
FIG. 32 is a block diagram illustrating a configuration example of a seventh sensor calculation unit according to an eighteenth embodiment of the present invention.

As illustrated in FIG. 32, the seventh sensor calculation unit 180C of the eighteenth embodiment is different from the sensor calculation unit 180 of the second embodiment in that a sixth relative angle calculation unit 18C, a second adder-subtracter 191, and a third adder-subtracter 192 are added.

The second relative angle calculation unit 18A of the eighteenth embodiment calculates the second relative angle Δθ$_2$ by a calculation method similar to that of the second embodiment. The calculated second relative angle Δθ$_2$ is output to the first adder-subtracter 190 and the third adder-subtracter 192.

The third relative angle calculation unit 18r of the eighteenth embodiment calculates the third relative angle Δθref by a calculation method similar to that of the second embodiment. The calculated third relative angle Δθref is output to the first adder-subtracter 190 and the second adder-subtracter 191.

On the other hand, the sixth relative angle calculation unit 18C of the eighteenth embodiment has the same configuration as that of the third relative angle calculation unit 18r of the second embodiment.

Specifically, as illustrated in FIG. 32, the sixth relative angle calculation unit 18C includes a relative angle sine value (sin Δθ in drawing) calculation unit 181C, a relative angle cosine value (cos Δθ in drawing) calculation unit 182C, and a fourth relative angle (Δθx in drawing) calculation unit 183C.

As similar to the relative angle sine value calculation unit 181r of the second embodiment, the relative angle sine value calculation unit 181C, in accordance with the above expressions (6) and (7), calculates the relative angle sine value sin Δθ. In the above expression (6), Δθref is replaced to Δθx.

Specifically, the relative angle sine value calculation unit 181C, in accordance with the above expression (6), adds cos(θos+Δθx) as the input first cos signal cos θis to the input second sin signal sin θos and squares the added value. Further, sin(θos+Δθx) as the input first sin signal sin θis is subtracted from the input second cos signal cos θos, and the subtraction value is squared. By summing the calculated square values, TMs is calculated. Next, in accordance with the above expression (7), the calculated TMs is divided by 2, and the division value is subtracted from 1 to calculate the relative angle sine value sin Δθ. The calculated relative angle sine value sin Δθ is output to the fourth relative angle calculation unit 183C.

The relative angle cosine value calculation unit 182C, in accordance with the above expressions (8) and (9), calculates the relative angle cosine value cos Δθ. In the above expression (8), Δθref is replaced to Δθx.

Specifically, the relative angle cosine value calculation unit 182C, in accordance with the above expression (8), adds sin(θos+Δθx) as the input first sin signal sin θis to the input second sin signal sin θos and squares the added value. Further, cos(θos+Δθx) as the input first cos signal cos θis is added to the input second cos signal cos θos and the added value is squared. By summing the calculated square values, TMc is calculated. Next, in accordance with the above expression (9), the calculated TMc is divided by 2, and 1 is subtracted from the division value to calculate the relative angle cosine value cos Δe. The calculated relative angle cosine value cos Δθ is output to the fourth relative angle calculation unit 183C.

The fourth relative angle calculation unit 183C, in accordance with the above expression (10), calculates the fourth relative angle Δθx. In the above expression (10), Δθref is replaced to Δθx.

Specifically, the fourth relative angle calculation unit 183C, based on the relative angle sine value sin Δθ input from the relative angle sine value calculation unit 181C and the relative angle cosine value cos Δθ input from the relative angle cosine value calculation unit 182C, in accordance with the above expression (10), divides the relative angle sine value sin Δθ by the relative angle cosine value cos Δθ and calculates the arctangent function of the division value so as to calculate the fourth relative angle Δθx as the relative angle between the input shaft 22a and the output shaft 22b. The calculated fourth relative angle Δθx is output to the second adder-subtracter 191 and the third adder-subtracter 192.

The torque calculation unit 19 of the eighteenth embodiment, based on the second relative angle Δθ$_2$ input from the second relative angle calculation unit 18A, calculates the steering torque Ts.

The first adder-subtracter 190 of the eighteenth embodiment calculates a first difference value between the second relative angle $\Delta\theta_2$ calculated by the second relative angle calculation unit 183A and the third relative angle $\Delta\theta$ref calculated by the third relative angle calculation unit 183*r*. The calculated first difference value is output to the abnormality determination unit 20.

On the other hand, the second adder-subtracter 191 of the eighteenth embodiment calculates a second difference value between the third relative angle $\Delta\theta$ref calculated by the third relative angle calculation unit 183*r* and the fourth relative angle $\Delta\theta$x calculated by the fourth relative angle calculation unit 183C. The calculated second difference value is output to the abnormality determination unit 20.

The third adder-subtracter 192 of the eighteenth embodiment calculates a third difference value between the second relative angle $\Delta\theta_2$ calculated by the second relative angle calculation unit 183A and the fourth relative angle $\Delta\theta$x calculated by the fourth relative angle calculation unit 183C. The calculated third difference value is output to the abnormality determination unit 20.

The abnormality determination unit 20 of the eighteenth embodiment determines the abnormality based on the first difference value between the second relative angle $\Delta\theta_2$ and the third relative angle $\Delta\theta$ref, the second difference value between the third relative angle $\Delta\theta$ref and the fourth relative angle $\Delta\theta$x, and the third difference value between the second relative angle $\Delta\theta_2$ and the fourth relative angle $\Delta\theta$x. For example, the abnormality determination unit determines that the abnormality is present in the relative angle detection device if the absolute value of any one of the difference values is at or above the specified value set in advance, and determines that the relative angle detection device is normal if all difference values are less than the specified value.

In the eighteenth embodiment, the third relative angle $\Delta\theta$ref corresponds to the third relative angle $\Delta\theta$ref which is either one of the first relative angle $\Delta\theta1$ and the second relative angle $\Delta\theta2$ (in this case, second relative angle $\Delta\theta2$) in CLAIMS and Solution to Problem.

Further, in the eighteenth embodiment, the second relative angle $\Delta\theta_2$ and the fourth relative angle $\Delta\theta$x correspond to the remaining relative angle of the first relative angle $\Delta\theta1$ and the second relative angle $\Delta\theta2$ in CLAIMS and Solution to Problem.

Configurations of the seventh sensor calculation unit 180C and the torque calculation unit 19 of the eighteenth embodiment are applicable to the second, the fourth, the sixth, the eighth, the tenth and the twelfth embodiments without limiting to the second embodiment.

(Effects of Eighteenth Embodiment)

The eighteenth embodiment yields following effects in addition to the effects of the second embodiment.

The eighteenth relative angle detection device 107 of the eighteenth embodiment includes: the first multipolar ring magnet 10 having different magnetic poles alternately and equally distributed in the circumferential direction and configured to synchronously rotate with the input shaft 22*a* from between the coaxially arranged input shaft 22*a* and output shaft 22*b*; the second multipolar ring magnet 11 having different magnetic poles alternately and equally distributed in the circumferential direction and configured to synchronously rotate with the output shaft 22*b* from between the input shaft 22*a* and the output shaft 22*b*; the first rotation angle sensor 12 configured to detect the magnetic flux in accordance with the rotation angle $\theta$is of the first multipolar ring magnet 10 and output the first sin signal sin $\theta$is and the first cos signal cos $\theta$is; the second rotation angle sensor 13 configured to detect the magnetic flux in accordance with the rotation angle $\theta$os of the second multipolar ring magnet 11 and output the second sin signal sin $\theta$os and the second cos signal cos $\theta$os; and the second relative angle calculation unit 18A configured to, based on the first sin signal sin $\theta$is and the first cos signal cos $\theta$is, calculate the rotation angle $\theta$is from $\theta$is=arctan(sin $\theta$is/cos $\theta$is), based on the second sin signal sin $\theta$os and the second cos signal cos $\theta$os, calculate the rotation angle $\theta$os from $\theta$os=arctan(sin $\theta$os/cos $\theta$os), and based on the difference value between the rotation angle $\theta$is and the rotation angle $\theta$os, calculate the second relative angle $\Delta\theta_2$ between the input shaft 22*a* and the output shaft 22*b*.

With this configuration, it is possible to divide the first sin signal sin $\theta$is by the first cos signal cos $\theta$is and calculate the arctangent function of the division value to calculate the rotation angle $\theta$is; divide the second sin signal sin $\theta$os by the second cos signal cos $\theta$os and calculate the arctangent function of the division value to calculate the rotation angle $\theta$os; and based on the difference value between the calculated rotation angle $\theta$is and the rotation angle $\theta$os, calculate the second relative angle $\Delta\theta_2$ between the input shaft 22*a* and the output shaft 22*b*. This allows the calculation of the torque even at the helix angle region exceeding the linear portion of sin $\Delta\theta$. As a result, it is possible to handle the wider torque detection range. Further, even at the same torque detection range, the whole information on sin $\Delta\theta$ can be used, and thus, the resolution of the detected torque value can be enhanced. Since the second relative angle $\Delta\theta_2$ can be calculated by the small number of calculations, the more highly accurate torque value can be calculated.

The eighteenth relative angle detection device 107 of the eighteenth embodiment includes: the third relative angle calculation unit 18*r* configured to, based on the first sin signal sin $\theta$is, the first cos signal cos $\theta$is, the second sin signal sin $\theta$os and the second cos signal cos $\theta$os, calculate sin $\Delta\theta$ and cos $\Delta\theta$ in accordance with the relative angle $\Delta\theta$ between the input shaft 22*a* and the output shaft 22*b* and calculate the third relative angle $\Delta\theta$ref from $\Delta\theta$ref=arctan (sin $\Delta\theta$/cos $\Delta\theta$); the sixth relative angle calculation unit 18C configured to, based on the first sin signal sin $\theta$is, the first cos signal cos $\theta$is, the second sin signal sin $\theta$os and the second cos signal cos $\theta$os, calculate sin $\Delta\theta$ and cos $\Delta\theta$ in accordance with the relative angle $\Delta\theta$ between the input shaft 22*a* and the output shaft 22*b* and calculate the fourth relative angle $\Delta\theta$x from $\Delta\theta2$=arctan(sin $\Delta\theta$/cos $\Delta\theta$); and the abnormality determination unit 20 configured to determine the abnormality based on the first difference value between the second relative angle $\Delta\theta_2$ calculated by the second relative angle calculation unit 18A and the third relative angle $\Delta\theta$ref calculated by the third relative angle calculation unit 18*r*, the second difference value between the third relative angle $\Delta\theta$ref calculated by the third relative angle calculation unit 18*r* and the fourth relative angle $\Delta\theta$x calculated by the sixth relative angle calculation unit 18C, and the third difference value between the second relative angle $\Delta\theta_2$ calculated by the second relative angle calculation unit 18A and the fourth relative angle $\Delta\theta$x calculated by the sixth relative angle calculation unit 18C.

With this configuration, the abnormality determination unit can detect the abnormality in the system when, for example, the first difference value between the second relative angle $\Delta\theta_2$ and the third relative angle $\Delta\theta$ref calculated by a method different from that of the second relative angle $\Delta\theta_2$ is at or above the specified value set in advance, when the second difference value between the third relative angle $\Delta\theta$ref and the fourth relative angle $\Delta\theta$x calculated by a method same as that of the third relative angle Δθref is at or above the specified value, or when the third difference value between the second relative angle $\Delta\theta_2$ and the fourth relative angle Δθx is at or above the specified value. On the other hand, the abnormality determination unit can determine that the system is normal when all difference values are less than the specified value. Further, by comparing three difference values, i.e., the first difference value, the second difference value and the third difference value, the abnormality determination unit can determine which relative angle calculation unit includes the abnormality.

In the eighteenth relative angle detection device 107 of the eighteenth embodiment, the third relative angle calculation unit 18r and the sixth relative angle calculation unit 18C, in accordance with the above expressions (6) and (7), calculate the relative angle sine value sin Δθ and in accordance with the above expressions (8) and (9), calculate the relative angle cosine value cos Δθ. With this configuration, using the signals output from the first rotation angle sensor 12 and the second rotation angle sensor 13, the relative angle sine value sin Δθ and the relative angle cosine value cos Δθ can be calculated easily and accurately.

Nineteenth Embodiment (Configuration)

The nineteenth embodiment of the present invention includes an eighth sensor calculation unit 180C' whose configuration is partially different instead of the seventh sensor calculation unit 180C of the eighteenth embodiment, and the nineteenth embodiment has the same configuration as that of the eighteenth embodiment except that the torque calculation unit 19, based on the relative angle input from the eighth sensor calculation unit 180C', calculates the steering torque Ts.

Hereinafter, components similar to those of the eighteenth embodiment are denoted with the same reference numerals to appropriately omit the descriptions, and different components are described in details.

A nineteenth torque sensor 96 of the nineteenth embodiment includes a nineteenth relative angle detection device 108 (not illustrated in drawing), while the eighteenth torque sensor 95 of the eighteenth embodiment includes the eighteenth relative angle detection device 107. The nineteenth relative angle detection device 108 of the nineteenth embodiment includes the eighth sensor calculation unit 180C' while the eighteenth relative angle detection device 107 of the eighteenth embodiment includes the seventh sensor calculation unit 180C.

Figure 33:
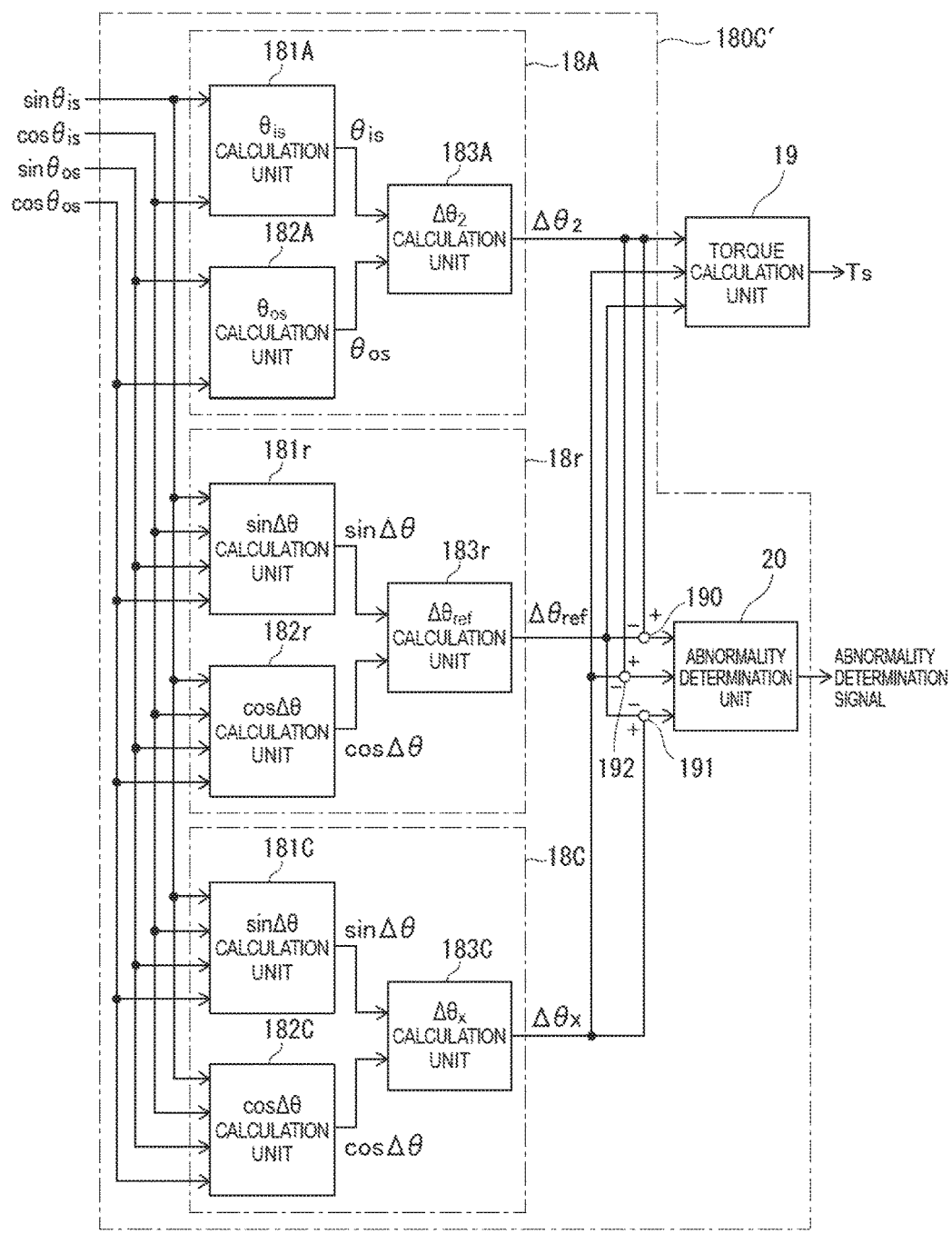
FIG. 33 is a block diagram illustrating a configuration example of an eighth sensor calculation unit according to a nineteenth embodiment of the present invention.

As illustrated in FIG. 33, the eighth sensor calculation unit 180C' of the nineteenth embodiment outputs the third relative angle Δθref calculated by the third relative angle calculation unit 18r to the first adder-subtracter 190 and also to the torque calculation unit 19. Additionally, the fourth relative angle Δθx calculated by the sixth relative angle calculation unit 18C is output to the second adder-subtracter 191 and also to the torque calculation unit 19. Other configurations except above are same as those of the seventh sensor calculation unit 180C of the eighteenth embodiment.

On the other hand, the torque calculation unit 19 of the nineteenth embodiment calculates the steering torque Ts based on the second relative angle $\Delta\theta_2$ input from the second relative angle calculation unit 18A, the third relative angle Δθref input from the third relative angle calculation unit 18r, and the fourth relative angle Δθx input from the sixth relative angle calculation unit 18C. In other words, the steering torque Ts is calculated based on the second relative angle $\Delta\theta_2$, the third relative angle Δθref calculated by a calculation method different from that of the second relative angle $\Delta\theta_2$, and the fourth relative angle Δθx calculated by a calculation method same as that of the third relative angle Δθref. For example, the average value Δθave of the second relative angle $\Delta\theta_2$, the third relative angle Δθref, and the fourth relative angle Δθx is calculated and based on the average value Δθave, the steering torque Ts is calculated.

In the nineteenth embodiment, the third relative angle Δθref corresponds to the third relative angle Δθref which is either one of the first relative angle Δθ1 and the second relative angle Δθ2 (in this case, second relative angle Δθ2) in CLAIMS and Solution to Problem.

Further, in the nineteenth embodiment, the second relative angle $\Delta\theta_2$ and the fourth relative angle Δθx correspond to the remaining relative angle from between the first relative angle Δθ1 and the second relative angle Δθ2 in CLAIMS and Solution to Problem.

Configurations of the eighth sensor calculation unit 180C' and the torque calculation unit 19 of the nineteenth embodiment are applicable to the second, the fourth, the sixth, the eighth, the tenth and the twelfth embodiments without limiting to the second embodiment.

(Effects of Nineteenth Embodiment)

The nineteenth embodiment yields following effects in addition to the effects of the eighteenth embodiment.

In the nineteenth relative angle detection device 108 of the nineteenth embodiment, the third relative angle calculation unit 18r outputs the calculated third relative angle Δθref to the first adder-subtracter 190 and also to the torque calculation unit 19. Additionally, the sixth relative angle calculation unit 18C outputs the calculated fourth relative angle Δθx to the second adder-subtracter 191 and also to the torque calculation unit 19. Then, the eighteenth torque sensor 95 of the thirteenth embodiment calculates the steering torque Ts generated to the input shaft 22a and the output shaft 22b based on the second relative angle $\Delta\theta_2$ input from the second relative angle calculation unit 18A, the third relative angle Δθref input from the third relative angle calculation unit 18r, and the fourth relative angle Δθx input from the sixth relative angle calculation unit 18C.

With this configuration, compared to a case of only using the second relative angle $\Delta\theta_2$ as the relative angle, the highly accurate steering torque Ts can be calculated. For example, by calculating the average value Δθave of the second relative angle $\Delta\theta_2$, the third relative angle Δθref, and the fourth relative angle Δθx, the more highly accurate relative angle can be calculated, and based on the average value Δθave, the more highly accurate steering torque Ts can be calculated.

(Variation)

In the seventh and eighth embodiments, the first code wheel 60 and the second code wheel 61 are configured such that a plurality of slits are provided in the vicinity of the outer periphery of the plate surface in the circumferential direction and the light receiving unit receives the light from the light source transmitting through the slits, but the configuration is not limited thereto. For example, the first code wheel 60 and the second code wheel 61 may be configured such that the annular thin plate is formed from a non-reflective member, reflective members having the same shape as that of the slit are provided in the vicinity of the outer periphery of the plate surface in the circumferential direction instead of the slits, and light receiving unit receives the reflected light of the light from the light source entering the reflective member.

In the seventh and eighth embodiments, the first sin optical sensor 64 and the first cos optical sensor 65 are provided to the pitches of the slits 60s while shifting the phase by 90° of the electric angle (having phase difference of 90°) and the second sin optical sensor 66 and the second cos optical sensor 67 are provided to the pitches of the slits 61s while shifting the phase by 90° of the electric angle (having phase difference of 90°). Without limiting to this configuration, two slit rows having the same pitch are provided in the radial direction, and the other slit row may be provided relative to a slit row such that the phase is shifted by 90° of the electric angle in the radial direction (having phase difference of 90°). If this configuration is adopted, for example, two optical sensors are aligned in the radial direction to make the same phase and the optical sensors are arranged such that the light from the light source transmitting through the slit is receivable relative to each slit row. However, due to the installation problem, the sensor of the inner diameter side may not have a U-shape, and thus, change in the configuration of the sensor is needed.

The first to fourth embodiments have a configuration in which two magnetic sensors, i.e., the first sin magnetic sensor and the first cos magnetic sensor output the first sin signal and the first cos signal, and two magnetic sensors, i.e., the second sin magnetic sensor and the second cos magnetic sensor output the second sin signal and the second cos signal, but a configuration is not limited thereto. For example, a single first magnetic sensor may output the first sin signal and the first cos signal, and a single second magnetic sensor may output the second sin signal and the second cos signal.

In the ninth and tenth embodiments, the first and second sinusoidal units 70b and 71b are formed to the ends at the outer diameter side of the first and second annular conductors 70a and 71a, but a configuration is not limited thereto. For example, another configuration may be adopted such as pasting the ring-like conductor pattern having the radial width sinusoidally changing in the circumferential direction to an axial end face of the cylindrical body (not limited to conductor) that synchronously rotates with the input shaft 22a or the output shaft 22b.

The eleventh and twelfth embodiments are configured such that the third and fourth sinusoidal units 80b and 81b are provided to the circumference surfaces of the first and second cylindrical bodies 80a and 81a, but a configuration is not limited thereto. For example, the third and fourth sinusoidal units 80b and 81b may be provided to the inner circumferential surfaces of the first and second cylindrical bodies 80a and 81a. If this configuration is adopted, the seventh and eighth rotation angle sensors 82 and 83 are also provided at the insides of the first and second cylindrical bodies 80a and 81a.

In each embodiment, descriptions are given by taking a configuration in which the EPS control unit 34 is fixed/supported to/by the housing of the electric motor 33, but a configuration is not limited thereto, and another configuration may be adopted in which separately an EPS control unit is provided to a position different from the housing of the electric motor 33.

In each embodiment, descriptions are given by taking a configuration in which the electric motor 33 is formed from a three-phase brushless motor, but a configuration is not limited thereto, and other configurations may be adopted in which the electric motor 33 is formed from the brushless motor of 4-phase or more or formed from the brush motor.

In each embodiment, descriptions are given by taking a configuration in which the present invention is applied to a column-assist type electric power steering device, but a configuration is not limited thereto, and for example, the present invention may be applied to a rack-assist type electric power steering device or a pinion-assist type electric power steering device.

This application claims priority based on Japanese Patent Application No. P2015-129165 (filed on Jun. 26, 2015), P2015-167193 (filed on Aug. 26, 2015), P2016-113839 (filed on Jun. 7, 2016) and P2016-113840 (filed on Jun. 7, 2016), the disclosure of which is incorporated herein in its entirety.

Here, descriptions are given with reference to the limited number of embodiments, but a scope of rights is not limited thereto, and modifications of each embodiment based on above descriptions is obvious to a person skilled in the art.

REFERENCE SIGNS LIST 1,1A . . . First and second torque sensor
2 . . . Electric power steering device
3 . . . Vehicle
4,4A . . . Third and fourth torque sensor
5,5A . . . Fifth and sixth torque sensor
6, 6A . . . Seventh and eighth torque sensor
7,7A . . . Ninth and tenth torque sensor
8,8A . . . Eleventh and twelfth torque sensor
10 . . . First multipolar ring magnet
11 . . . Second multipolar ring magnet
12 . . . First rotation angle sensor
13 . . . Second rotation angle sensor
14 . . . First sin magnetic sensor
15 . . . First cos magnetic sensor
16 . . . Second sin magnetic sensor
17 . . . Second cos magnetic sensor
18 . . . Relative angle calculation unit
18A, 18r, 18B, 18Ar, 18C . . . Second, third, fourth, fifth and sixth relative angle calculation units
19 . . . Torque calculation unit
21 . . . Steering wheel
22 . . . Steering shaft
22a . . . Input shaft
22b . . . Output shaft
22c . . . Torsion bar
40 . . . Third multipolar ring magnet
41 . . . Fourth multipolar ring magnet
50 . . . First resolver
51 . . . Second resolver
52 . . . First rotor
53 . . . First stator
54 . . . Second rotor
55 . . . Second stator
56 . . . Excitation signal supply unit
60 . . . First code wheel
61 . . . Second code wheel
62 . . . Third rotation angle sensor
63 . . . Fourth rotation angle sensor
64 . . . First sin optical sensor
65 . . . First cos optical sensor
66 . . . Second sin optical sensor
67 . . . Second cos optical sensor
70 . . . First target
70b . . . First sinusoidal unit
71 . . . Second target
71b . . . Second sinusoidal unit
72 . . . Fifth rotation angle sensor
73 . . . Sixth rotation angle sensor
L1-L4 . . . Planar coils 80 . . . Third target
80b . . . Third sinusoidal unit
81 . . . Fourth target
81b . . . Fourth sinusoidal unit
82 . . . Seventh rotation angle sensor
83 . . . Eighth rotation angle sensor
100,100A . . . First and second relative angle detection devices
101 . . . First sensor unit
102 to 108 . . . Thirteenth to nineteenth relative angle detection devices
400,400A . . . Third and fourth relative angle detection devices
401 . . . Second sensor unit
500,500A . . . Fifth and sixth relative angle detection devices
501 . . . Third sensor unit
600, 600A . . . Seventh and eighth relative angle detection devices
601 . . . Fourth sensor unit
700,700A . . . Ninth and tenth relative angle detection devices
701 . . . Fifth sensor unit
800, 800A . . . Eleventh and twelfth relative angle detection devices
801 . . . Sixth sensor unit

The invention claimed is:

1. A relative angle detection device comprising:
a first multipolar ring magnet having different magnetic poles alternately and equally distributed in a circumferential direction and configured to synchronously rotate with a first rotation axis from between the coaxially arranged first rotation axis and a second rotation axis;
a second multipolar ring magnet having different magnetic poles alternately and equally distributed in a circumferential direction and configured to synchronously rotate with the second rotation axis from between the first rotation axis and the second rotation axis;
a first rotation angle sensor configured to detect a magnetic flux in accordance with a rotation angle $\theta_1$ of the first multipolar ring magnet and output a first sin signal representing sin $\theta_1$ and a first cos signal representing cos $\theta_1$;
a second rotation angle sensor configured to detect a magnetic flux in accordance with a rotation angle $\theta_2$ of the second multipolar ring magnet and output a second sin signal representing sin $\theta_2$ and a second cos signal representing cos $\theta_2$;
a plurality of relative angle calculation units configured to, based on the first sin signal, the first cos signal, the second sin signal and the second cos signal, calculate a relative angle $\Delta\theta$ between the first rotation axis and the second rotation axis; and wherein
the plurality of relative angle calculation units include:
one or more first relative angle calculation unit configured to, based on the first sin signal and the first cos signal, calculate the rotation angle $\theta_1$, based on the second sin signal and the second cos signal, calculate the rotation angle $\theta_2$, and based on a difference value between the rotation angle $\theta_1$ and the rotation angle $\theta_2$, calculate a first relative angle $\Delta\theta1$ between the first rotation axis and the second rotation axis; and
one or more second relative angle calculation unit configured to, based on the first sin signal, the first cos signal, the second sin signal and the second cos signal, calculate sin $\Delta\theta$ and cos $\Delta\theta$ in accordance with a relative angle $\Delta\theta$ between the first rotation axis and the second rotation axis, and from $\Delta\theta2=\arctan(\sin \Delta\theta/\cos \Delta\theta)$, calculate a second relative angle $\Delta\theta2$ between the first rotation axis and the second rotation axis;
the relative angle detection device comprising:
an abnormality determination unit configured to determine an abnormality based on a difference value between a third relative angle $\Delta\theta$ref which is either one of the first relative angle $\Delta\theta1$ calculated by the first relative angle calculation unit and the second relative angle $\Delta\theta2$ calculated by the second relative angle calculation unit and a remaining relative angle from between the first relative angle $\Delta\theta1$ and the second relative angle $\Delta\theta2$.

2. The relative angle detection device according to claim 1, wherein
the first multipolar ring magnet and the second multipolar ring magnet are configured such that a part of a circumference surface is magnetized to alternately different magnetic poles in a circumferential direction;
the first rotation angle sensor is provided such that a detection unit of a magnetic flux of the first rotation angle sensor faces a pole face formed to a circumference surface of the first multipolar ring magnet; and
the second rotation angle sensor is provided such that a detection unit of a magnetic flux of the second rotation angle sensor faces a pole face formed to a circumference surface of the second multipolar ring magnet.

3. The relative angle detection device according to claim 1, wherein
the first multipolar ring magnet and the second multipolar ring magnet are configured such that a part of an axial end face is magnetized to alternately different magnetic poles in a circumferential direction;
the first rotation angle sensor is provided such that a detection unit of a magnetic flux of the first rotation angle sensor faces a pole face formed to the axial end face of the first multipolar ring magnet; and
the second rotation angle sensor is provided such that a detection unit of a magnetic flux of the second rotation angle sensor faces a pole face formed to the axial end face of the second multipolar ring magnet.

4. The relative angle detection device according to claim 1, wherein
the first rotation angle sensor includes a first sin magnetic sensor configured to output the first sin signal and a first cos magnetic sensor configured to output the first cos signal, both provided to a pitch of a magnetic pole of the first multipolar ring magnet while having a phase difference of 90° of an electrical angle; and
the second rotation angle sensor includes a second sin magnetic sensor configured to output the second sin signal and a second cos magnetic sensor configured to output the second cos signal, both provided to a pitch of a magnetic pole of the second multipolar ring magnet while having a phase difference of 90° of an electrical angle.

5. A relative angle detection device comprising:
a first rotor having an outer circumference provided with a plurality of teeth at regular intervals and configured to synchronously rotate with a first rotation axis from between the coaxially arranged first rotation axis and a second rotation axis;
a second rotor having different magnetic poles alternately and equally distributed in a circumferential direction and configured to synchronously rotate with the second rotation axis from between the first rotation axis and the second rotation axis;

a first stator concentrically arranged with the first rotor at an outside of the first rotor, having a plurality of poles equally distributed in an inner circumference, and including an armature winding obtained by winding a coil around each pole;

a second stator concentrically arranged with the second rotor at an outside of the second rotor, having a plurality of poles equally distributed in an inner circumference, and including an armature winding obtained by winding a coil around each pole;

an excitation signal supply unit configured to supply, to the coil, an excitation signal; and a plurality of relative angle calculation units configured to calculate a relative angle $\Delta\theta$ between the first rotation axis and the second rotation axis based on a first sin signal representing $\sin\theta_1$ and a first cos signal representing $\cos\theta_1$ in accordance with a rotation angle $\theta_1$ of the first rotor output from the coil of the first stator supplied with the excitation signal and a second sin signal representing $\sin\theta_2$ and a second cos signal representing $\cos\theta_2$ in accordance with a rotation angle $\theta_2$ of the second rotor output from the coil of the second stator supplied with the excitation signal and is; and wherein the plurality of relative angle calculation units include:

one or more first relative angle calculation unit configured to, based on the first sin signal and the first cos signal, calculate the rotation angle $\theta_1$, based on the second sin signal and the second cos signal, calculate the rotation angle $\theta_2$, and based on a difference value between the rotation angle $\theta_1$ and the rotation angle $\theta_2$, calculate a first relative angle $\Delta\theta 1$ between the first rotation axis and the second rotation axis; and one or more second relative angle calculation unit configured to, based on the first sin signal, the first cos signal, the second sin signal and the second cos signal, calculate $\sin\Delta\theta$ and $\cos\Delta\theta$ in accordance with a relative angle $\Delta\theta$ between the first rotation axis and the second rotation axis, and from $\Delta\theta 2=\arctan(\sin\Delta\theta/\cos\Delta\theta)$, calculate a second relative angle $\Delta\theta 2$ between the first rotation axis and the second rotation axis;

the relative angle detection device comprising:

an abnormality determination unit configured to determine an abnormality based on a difference value between a third relative angle $\Delta\theta\text{ref}$ which is either one of the first relative angle $\Delta\theta 1$ calculated by the first relative angle calculation unit and the second relative angle $\Delta\theta 2$ calculated by the second relative angle calculation unit, and a remaining relative angle from between the first relative angle $\Delta\theta 1$ and the second relative angle $\Delta\theta 2$.

6. A relative angle detection device comprising:

a first code wheel including a plurality of slits formed in a circumferential direction at regular intervals and configured to synchronously rotate with a first rotation axis from between the coaxially arranged first rotation axis and a second rotation axis;

a second code wheel including a plurality of slits formed in a circumferential direction at regular intervals and configured to synchronously rotate with the second rotation axis from between the first rotation axis and the second rotation axis;

a first rotation angle sensor including a light source and a light receiving unit configured to receive light obtained by emission light from the light source transmitting through the slit of the first code wheel and output a first sin signal representing $\sin\theta_1$ and a first cos signal representing $\cos\theta_1$ in accordance with a rotation angle $\theta_1$ of the first code wheel;

a second rotation angle sensor including a light source and a light receiving unit configured to receive light obtained by emission light from the light source transmitting through the slit of the second code wheel and output a second sin signal representing $\sin\theta_2$ and a second cos signal representing $\cos\theta_2$ in accordance with a rotation angle $\theta_2$ of the second code wheel;

a plurality of relative angle calculation units configured to, based on the first sin signal, the first cos signal, the second sin signal and the second cos signal, calculate a relative angle $\Delta\theta$ between the first rotation axis and the second rotation axis;

the plurality of relative angle calculation units include:

one or more first relative angle calculation unit configured to, based on the first sin signal and the first cos signal, calculate the rotation angle $\theta_1$, based on the second sin signal and the second cos signal, calculate the rotation angle $\theta_2$, and based on a difference value between the rotation angle $\theta_1$ and the rotation angle $\theta_2$, calculate a first relative angle $\Delta\theta 1$ between the first rotation axis and the second rotation axis; and one or more second relative angle calculation unit, based on the first sin signal, the first cos signal, the second sin signal and the second cos signal, calculate $\sin\Delta\theta$ and $\cos\Delta\theta$ in accordance with a relative angle $\Delta\theta$ between the first rotation axis and the second rotation axis, and from $\Delta\theta 2=\arctan(\sin\Delta\theta/\cos\Delta\theta)$, calculate a second relative angle $\Delta\theta 2$ between the first rotation axis and the second rotation axis;

the relative angle detection device comprising:

an abnormality determination unit configured to determine an abnormality based on a difference value between a third relative angle $\Delta\theta\text{ref}$ which is either one of the first relative angle $\Delta\theta 1$ calculated by the first relative angle calculation unit and the second relative angle $\Delta\theta 2$ calculated by the second relative angle calculation unit and a remaining relative angle from between the first relative angle $\Delta\theta 1$ and the second relative angle $\Delta\theta 2$.

7. A relative angle detection device comprising:

a first target including a ring-like first conductor having a radial or axial width sinusoidally changing along a circumferential direction and configured to synchronously rotate with a first rotation axis from between the coaxially arranged first rotation axis and a second rotation axis;

a second target including a ring-like second conductor having a radial or axial width sinusoidally changing in a circumferential direction and configured to synchronously rotate with the second rotation axis from between the first rotation axis and the second rotation axis;

a first rotation angle sensor including a plurality of inductance elements provided to a fixed side to face the first conductor with a predetermined gap, and configured to detect an eddy current loss in accordance with a rotation angle $\theta_1$ of the first target, and output a first sin signal representing $\sin\theta_1$ and a first cos signal representing $\cos\theta_1$;

a second rotation angle sensor including a plurality of inductance elements provided to a fixed side to face the second conductor with a predetermined gap, configured to detect an eddy current loss in accordance with a rotation angle $\theta_2$ of the second target, and output a second sin signal representing sin $\theta_2$ and a second cos signal representing cos $\theta_2$; and a plurality of relative angle calculation units configured to, based on the first sin signal, the first cos signal, the second sin signal and the second cos signal, calculate a relative angle $\Delta\theta$ between the first rotation axis and the second rotation axis;

the plurality of relative angle calculation units include:

one or more first relative angle calculation unit configured to, based on the first sin signal and the first cos signal, calculate the rotation angle $\theta_1$, based on the second sin signal and the second cos signal, calculate the rotation angle $\theta_2$, and based on a difference value between the rotation angle $\theta_1$ and the rotation angle $\theta_2$, calculate a first relative angle $\Delta\theta1$ between the first rotation axis and the second rotation axis; and one or more second relative angle calculation unit configured to, based on the first sin signal, the first cos signal, the second sin signal and the second cos signal, calculate sin $\Delta\theta$ and cos $\Delta\theta$ in accordance with a relative angle $\Delta\theta$ between the first rotation axis and the second rotation axis, and from $\Delta\theta2$=arctan(sin $\Delta\theta$/cos $\Delta\theta$), calculate a second relative angle $\Delta\theta2$ between the first rotation axis and the second rotation axis;

the relative angle detection device comprising:

an abnormality determination unit configured to determine an abnormality based on a difference value between a third relative angle $\Delta\theta$ref which is either one of the first relative angle $\Delta\theta1$ calculated by the first relative angle calculation unit and the second relative angle $\Delta\theta2$ calculated by the second relative angle calculation unit, and a remaining relative angle from between the first relative angle $\Delta\theta1$ and the second relative angle $\Delta\theta2$.

8. The relative angle detection device according to claim 7, wherein:

the first conductor is formed to have a shape in which an end at an outer diameter side of a first annular conductor sinusoidally changes in a plan view from an axial direction;

the second conductor is formed to have a shape in which an end at an outer diameter side of a second annular conductor sinusoidally changes in a plan view from an axial direction;

the first rotation angle sensor is provided to face an axial end face of the first target such that the plurality of inductance elements of the first rotation angle sensor face a sinusoidal unit of the first conductor; and the second rotation angle sensor is provided to face an axial end face of the second target such that the plurality of inductance elements of the second rotation angle sensor face a sinusoidal unit of the second conductor.

9. The relative angle detection device according to claim 7, wherein:

the first target includes a first cylindrical body and the first conductor is provided to a circumference surface of the first cylindrical body to have a sinusoidally changing shape along a circumferential direction in a plan view of the circumference surface;

the second target includes a second cylindrical body and the second conductor is provided to a circumference surface of the second cylindrical body to have a sinusoidally changing shape along a circumferential direction in a plan view of the circumference surface;

the first rotation angle sensor is provided to face a circumference surface of the first target such that the plurality of inductance elements of the first rotation angle sensor face the first conductor; and, the second rotation angle sensor is provided to face a circumference surface of the second target such that the plurality of inductance elements of the second rotation angle sensor face the second conductor.

10. The relative angle detection device according to claim 1, wherein the first rotation angle sensor and the second rotation angle sensor are provided such that when the relative angle $\Delta\theta$ is 0°, an output of the first rotation angle sensor and an output of the second rotation angle sensor make a same phase.

11. The relative angle detection device according to claim 5, wherein the first stator and the second stator are provided such that when the relative angle $\Delta\theta$ is 0°, an output of a coil of the first stator and an output of a coil of the second stator make a same phase.

12. The relative angle detection device according to claim 6, wherein the first rotation angle sensor and the second rotation angle sensor are provided such that when the relative angle $\Delta\theta$ is 0°, an output of the first rotation angle sensor and an output of the second rotation angle sensor make a same phase.

13. The relative angle detection device according to claim 1, wherein using the sin $\theta_1$ as sin($\theta_2+\Delta\theta2$) and the cos $\theta_1$ as cos($\theta_2+\Delta\theta2$) respectively, the second relative angle calculation unit, based on below expressions (5) and (6), calculates the sin $\Delta\theta$ and based on below expressions (7) and (8), calculates the cos $\Delta\theta$, $$TMs=(\sin \theta_2+\cos(\theta_2+\Delta\theta2))^2+(\cos \theta_2-\sin(\theta_2+\Delta\theta2))^2 \quad (5)$$

$$\sin \Delta\theta=-TMs/2+1 \quad (6)$$

$$TMc=(\sin \theta_2+\sin(\theta_2+\Delta\theta2))^2+(\cos \theta_2+\cos(\theta_2+\Delta\theta2))^2 \quad (7)$$

$$\cos \Delta\theta=TMc/2-1 \quad (8)$$

14. A torque sensor comprising:

the relative angle detection device according to claim 1 configured to detect a relative angle $\Delta\theta$ between an input shaft and an output shaft connected via a torsion bar; and a torque calculation unit, configured to based on the relative angle $\Delta\theta$, calculate a torque generated to the input shaft and the output shaft.

15. A torque sensor comprising:

the relative angle detection device according to claim 1 configured to detect a first relative angle $\Delta\theta1$ and a second relative angle $\Delta\theta2$ between an input shaft and an output shaft connected via a torsion bar; and a torque calculation unit configured to, based on at least the first relative angle $\Delta\theta1$ from between the detected first relative angle $\Delta\theta1$ and the second relative angle $\Delta\theta2$, calculate a torque generated to the input shaft and the output shaft.

16. An electric power steering device comprising:

the torque sensor according to claim 14.

17. A vehicle comprising:

the electric power steering device according to claim 16.

* * * * *